United States Patent [19]

Anderson

[11] Patent Number: 5,005,418

[45] Date of Patent: Apr. 9, 1991

[54] THREE DIMENSIONAL IMAGING DEVICE USING ELLIPSOIDAL BACKPROJECTION

[76] Inventor: Forrest L. Anderson, P.O. Box 1400, Bernalillo, N. Mex. 87004

[21] Appl. No.: 480,324

[22] Filed: Feb. 12, 1990

Related U.S. Application Data

[63] Continuation-in-part of Ser. No. 221,534, Jul. 19, 1988, abandoned, which is a continuation-in-part of Ser. No. 106,577, Oct. 7, 1987, abandoned, which is a continuation-in-part of Ser. No. 858,696, May 2, 1986, Pat. No. 4,706,499.

[51] Int. Cl.$^5$ .............................. G01N 29/04
[52] U.S. Cl. ........................... 73/625; 73/626
[58] Field of Search ................. 73/625, 626, 603, 606, 73/628, 597; 128/660.01, 660.1, 661.01, 661.1, 662.01–662.06, 663.01; 367/14, 58, 113, 117, 69, 72; 378/70, 86, 87; 250/308, 369, 370.09; 342/179

[56] References Cited

U.S. PATENT DOCUMENTS

| | | | |
|---|---|---|---|
| Re. 30,397 | 9/1980 | King | 128/660 |
| 3,676,584 | 7/1972 | Plakas | 73/628 |
| 3,717,843 | 2/1973 | Farrah et al. | 73/606 |
| 3,918,025 | 11/1975 | Koskikawa et al. | 367/110 |
| 4,023,175 | 5/1977 | Brown et al. | 367/113 |
| 4,074,564 | 2/1978 | Anderson | 73/641 |
| 4,119,939 | 10/1978 | Katakura | 367/113 |
| 4,131,022 | 12/1978 | Mezerich | 73/625 |
| 4,208,731 | 6/1980 | Desbrandes | 367/90 |
| 4,325,257 | 4/1982 | Kino et al. | 73/626 |
| 4,332,016 | 5/1982 | Berntsen | 73/628 |
| 4,351,035 | 9/1982 | Buchanar et al. | 367/14 |
| 4,395,907 | 8/1983 | Steinberg et al. | 128/660 |
| 4,506,327 | 3/1985 | Tam | 358/111 |
| 4,688,430 | 8/1987 | Anderson | 73/625 |
| 4,706,499 | 11/1987 | Anderson | 73/625 |

OTHER PUBLICATIONS

S. Bennett et al., "A Real Time Synthetic Aperture Digital Imaging System", Acoustical Imaging, vol. 10, 1982.

K. Liang et al. "A Three Dimensional Synthetic Focus System" Acoustical Imaging, vol. 10, 1982.

P. Corl et al., "A Digital Synthetic Focus System" Acoustical Imaging, vol. 8, 1980.

R. Koppelman "Three Dimensional Acoustic Imaging" Acoustical Imaging, vol. 8, 1980.

B. Hildebrand "An Analysis of Pulsed Ultrasonic Arrays", Acoustical Imaging, vol. 8, 1980.

(List continued on next page.)

*Primary Examiner*—Hezron E. Williams
*Assistant Examiner*—Louis M. Arana

[57] ABSTRACT

A method and device for imaging three dimensions with a single pulse of energy is described. An embodiment is disclosed which uses a single monopolar transmitted pulse which radiates through a wide solid angular volume. Echoes caused by objects in this volume are detected by a large diameter, sparse circular array of receiver elements. The time history of each element is stored in a digital memory. A reconstruction processor uses this stored time history to reconstruct an image of the reflecting objects. A simple time of flight algorithm, based on Huygens principle, is used in the reconstruction. The algorithm automatically takes into account transmitted wave front curvature and makes no approximations such as fresnel or fraunhofer in the reconstruction. A circular array of receiver elements can be used, which is axicon, and is focused throughout the imaged volume. A perspective processor controls the reconstruction processor such that the volumetric image may be viewed from various perspectives. Tomographic image may be selected from the image volume at various positions and orientations. The perspective processor controls the reconstruction process such that the reconstructed points may be accumulated, summed and thus integrated so that a threee dimensional volume may be viewed on a two dimensional display.

26 Claims, 18 Drawing Sheets

OTHER PUBLICATIONS

K. Liang et al., "A 50 MHz Synthetic Focus System" Acoustical Imaging, vol. 11, 1982.

G. Sackman et al., "Acoustical Imaging in Marine Sediment . . . ", Acoustical Imaging, vol. 11, 1982.

S. A. Johnson et al., "Digital Computer Study of a Real Time Post Processing . . .", Acoustical Imaging, vol. 8, 1975.

K. Nitadori "An Experimental Underwater Acoustic Imaging System . . . " Acoustical Imaging, vol. 8, 1980.

K. Nitadori "Synthetic Aperture Approach to Multibeam Scanning" Acoustical Imaging, vol. 6, 1975.

S. Linzer et al., "Ultrasonic Reflectivity Imaging in Three Dimensions" IEEE Trans. on Biomedical Eng., vol. BME 28, 1981.

O. Tretiak "Time Domain Diffraction Tomography" Acoustical Imaging, vol. 14, 1985.

A. P. Anderson "Synthetic Aperture Tomographic Imaging for Ultrasonic Diagnostics", Acoustical Imaging, vol. 12, 1982.

V. G. Romanov "Integral Geometry and Inverse Problems for. . . ", Springer Tracts in Natural Philosophy, vol. 26, 1974.

D. K. Max "Ultrasonic Reflection Tomography with a Transmitter–Receiver System", Acoustical Imaging, vol. 15, 1987.

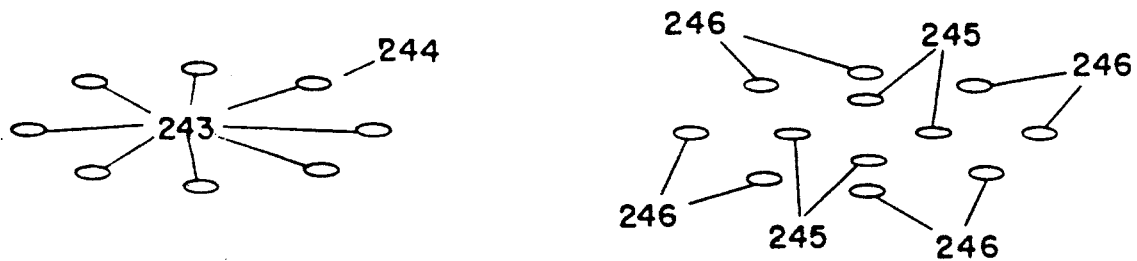
FIG — 12
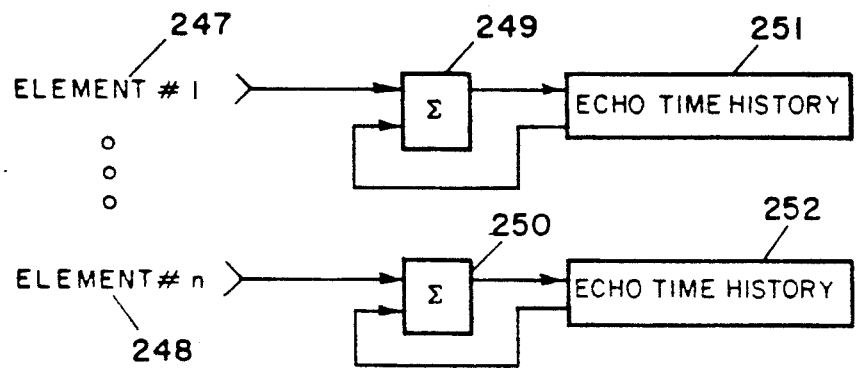
FIG — 13
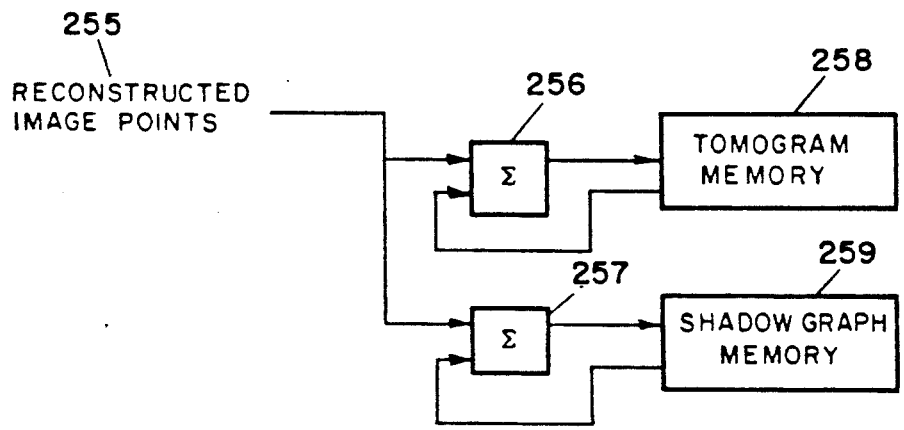
FIG — 14

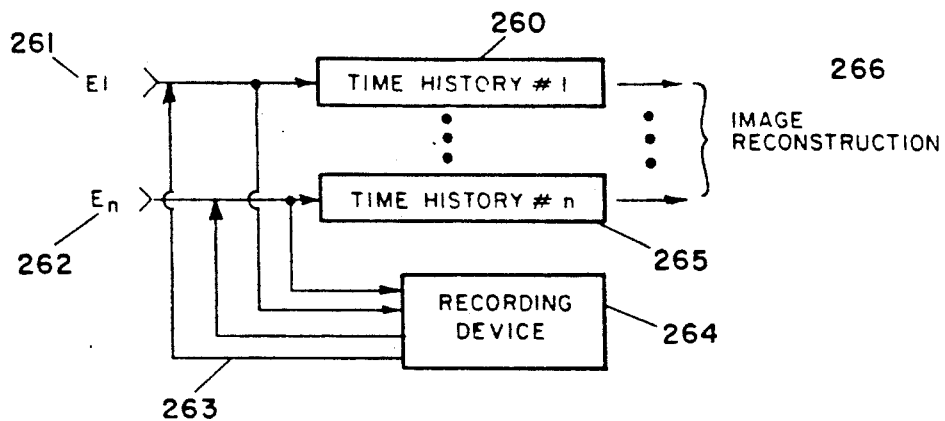
FIG—15
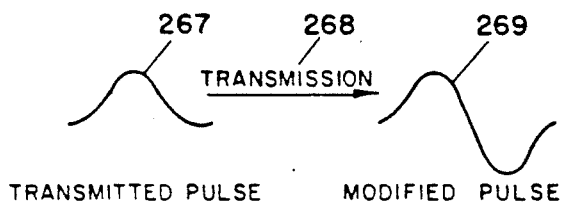
TRANSMITTED PULSE     MODIFIED PULSE
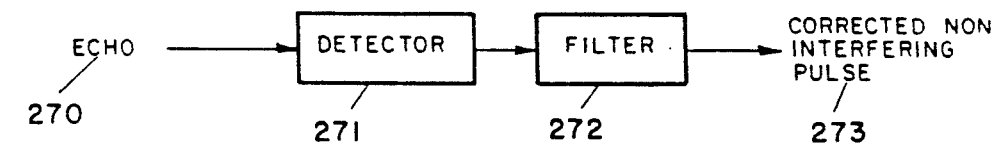
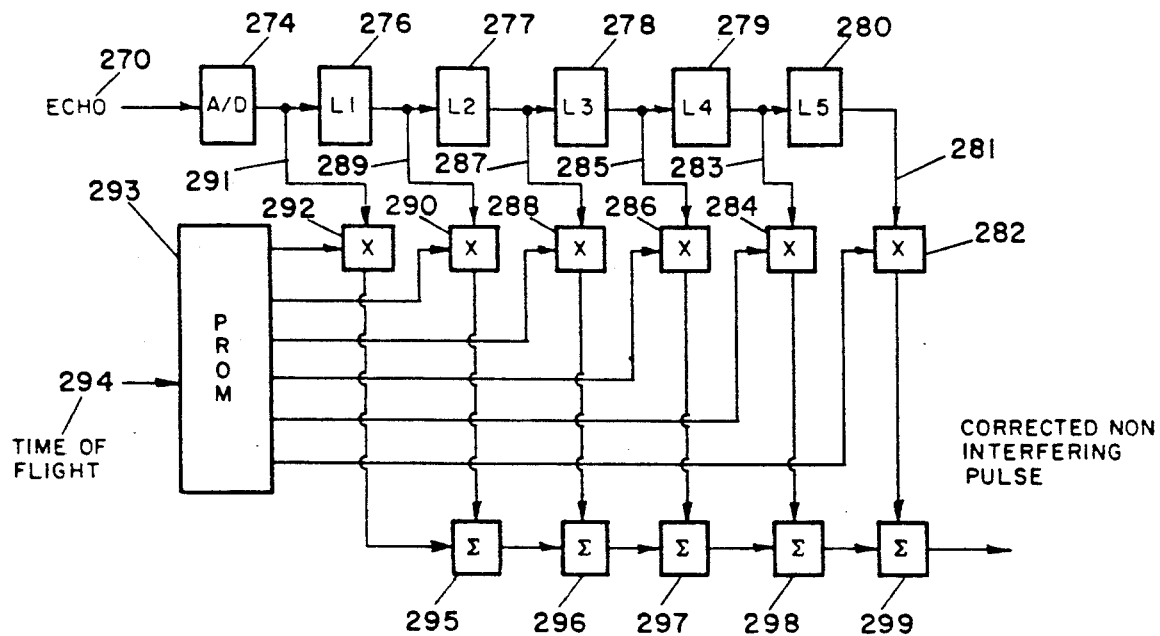
FIG—16

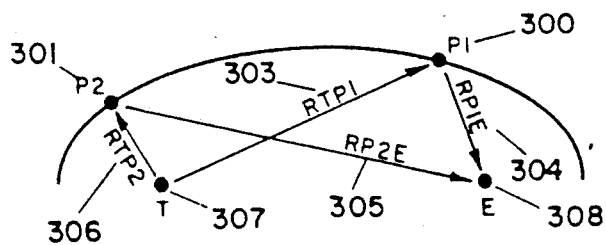
FIG—17
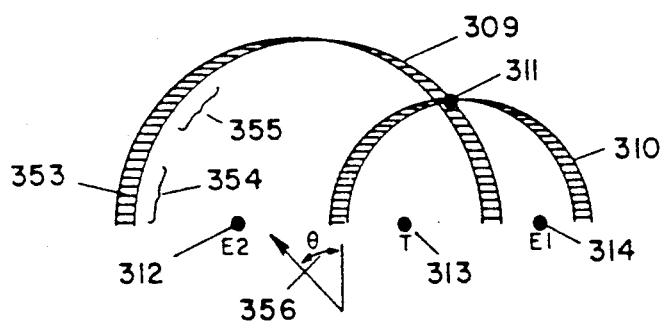
FIG—18
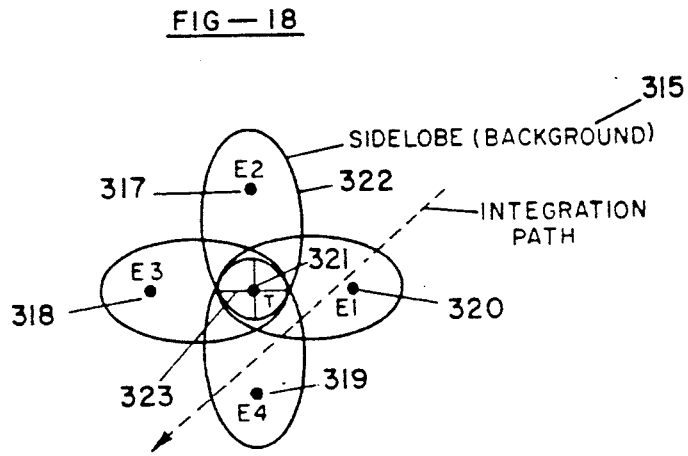
FIG—19
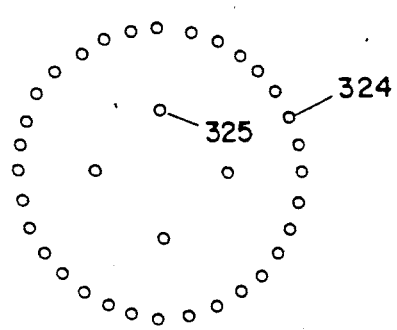
FIG—20

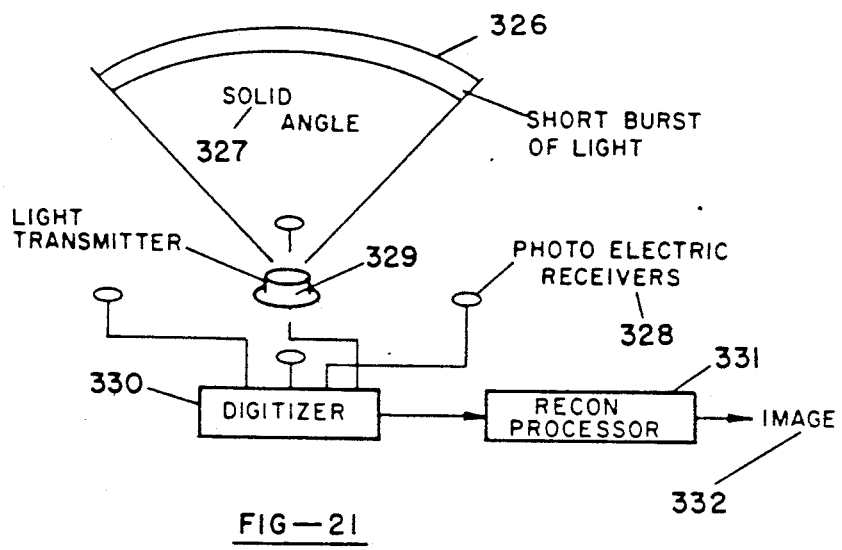
FIG—21
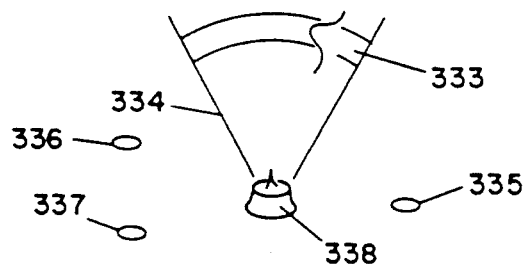
FIG—22
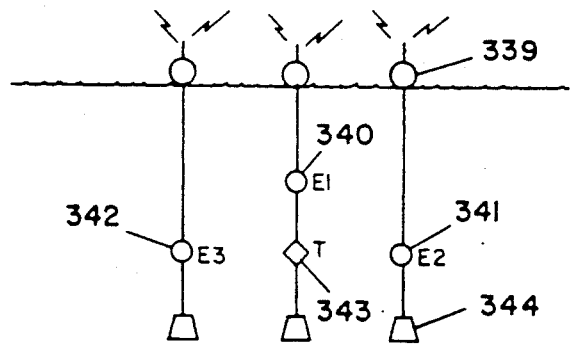
FIG—23
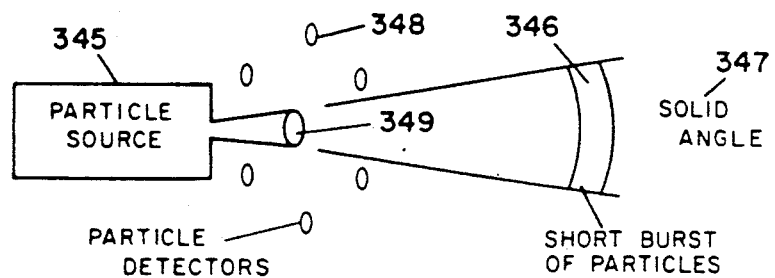
FIG—24

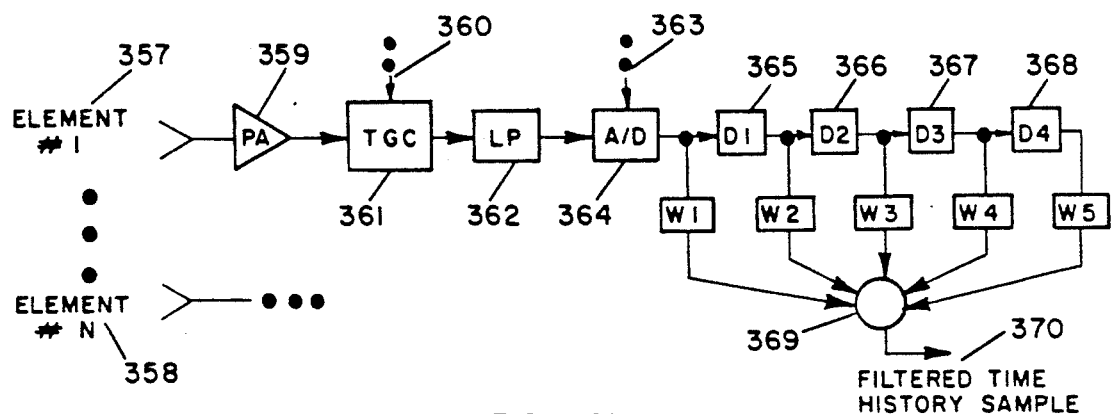
FIG — 25
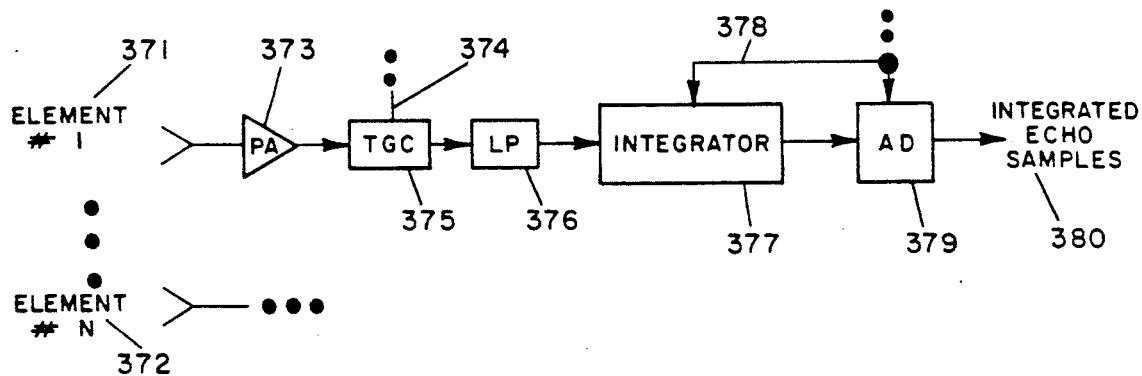
FIG — 26
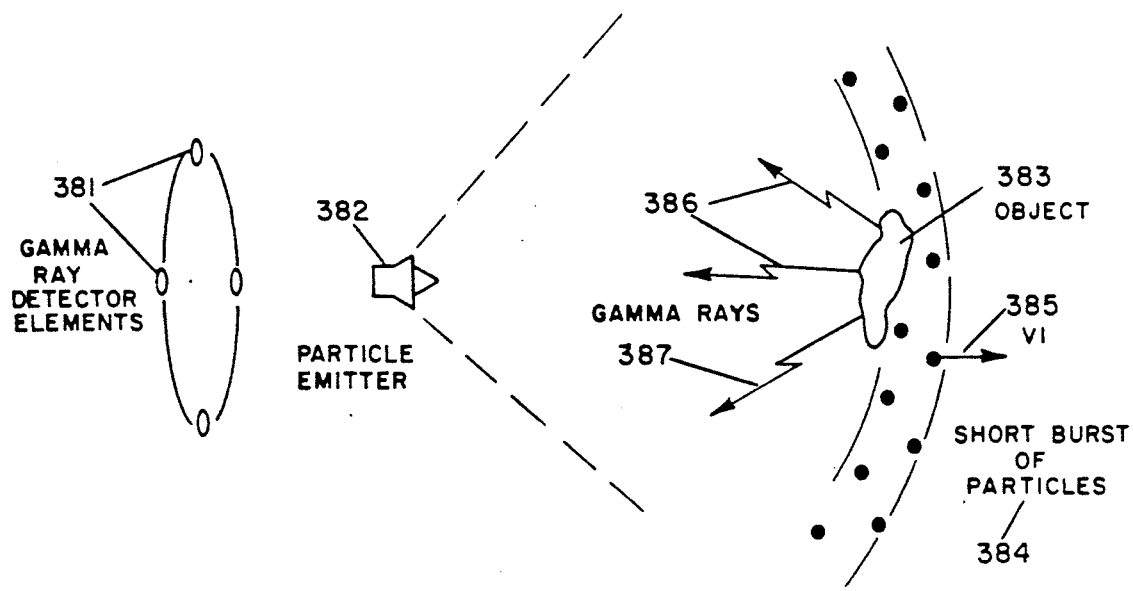
FIG — 27

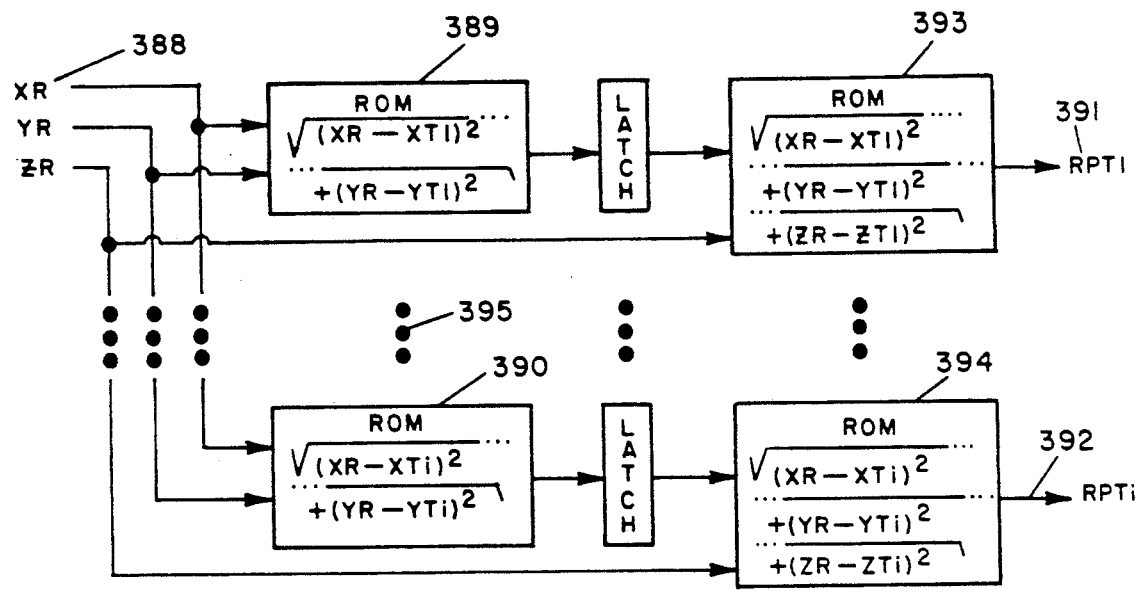
FIG—28
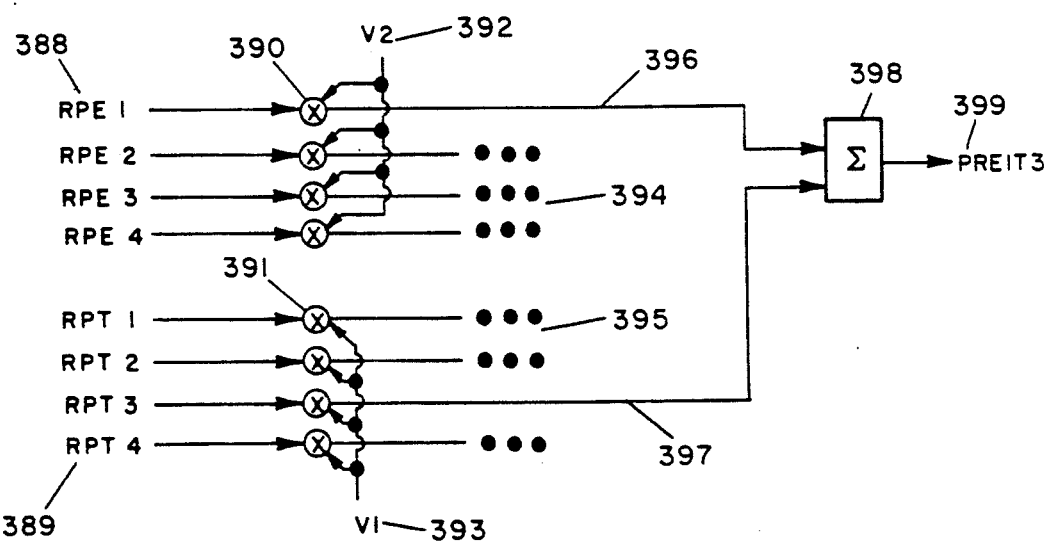
FIG—29

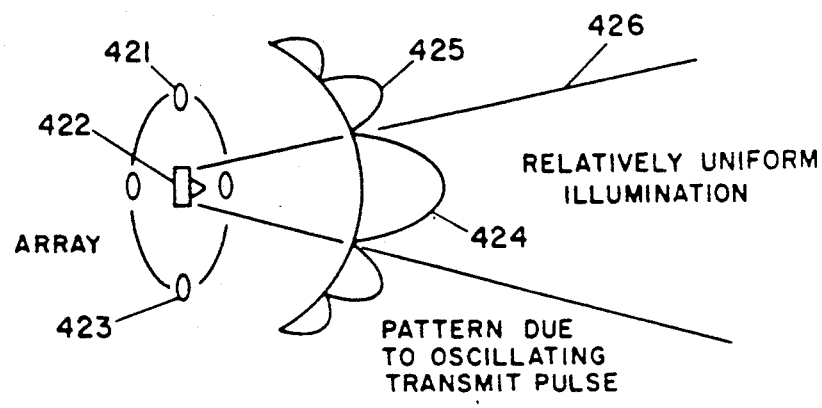
FIG—33
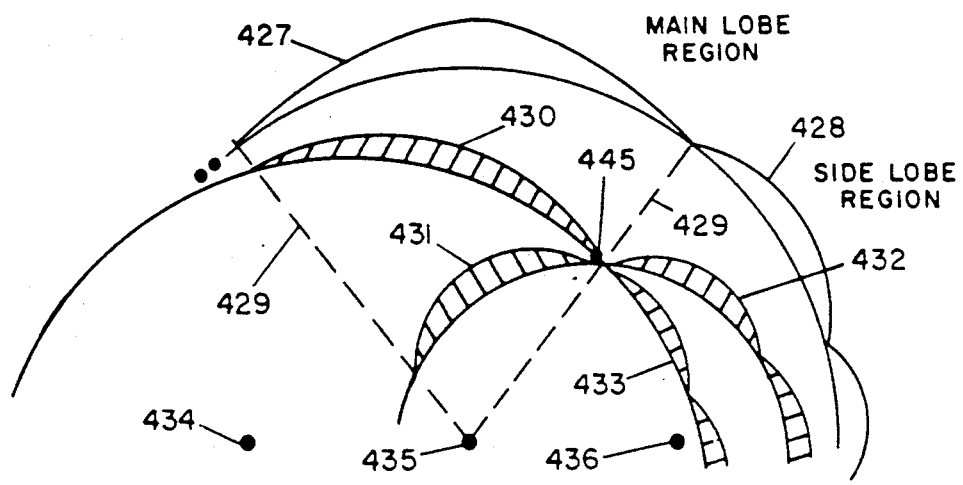
FIG—34
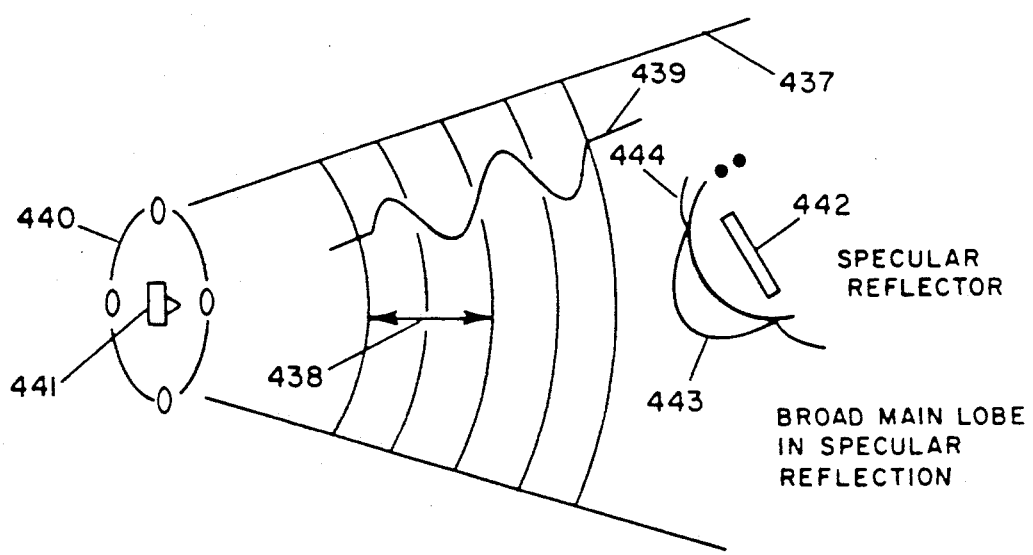
FIG—35

THREE DIMENSIONAL IMAGING DEVICE USING ELLIPSOIDAL BACKPROJECTION

CROSS-REFERENCES TO RELATED APPLICATIONS

This application is a continuation in part of copending application Ser. No. 07/221,534 filed July 19, 1988, now abandoned, which is a continuation in part of No. 07/106,577 filed Oct. 7, 1987 now abandoned which is a continuation in part of Ser. No. 858,696, filed May 2, 1986, now U.S. Pat. No. 4,706,499 and is also related to application No. 07/086,588 filed Aug. 17, 1987 which is a continuation in part of U.S. Pat. No. 4,688,430 filed Nov. 19, 1985.

This application is also related to copending application Nos. 221,534, 221,501, 106577, and 287,590. Said patents and any patents issued on said patent applications are hereby incorporated by reference.

COPYRIGHT NOTICE

A portion of the disclosure of this patent contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

This invention relates to the three dimensional imaging of objects using a single pulse of energy or a reduced number of pulses of energy.

2. Description of the Prior Art

A previous patent, No. 4,688,430, describes a smaller machine. However in that application the reconstruction process was carried out in two geometrical steps. In the first step the image was resolved with respect to each of two angular directions originating at the transmitting transducer. In the second step the ranges along each two dimensional angular direction are resolved. This requires a complicated mathematical algorithm to be implemented in the reconstruction hardware, and in addition, mathematical approximations to the wavefield geometry may be required.

The previous patent essentially uses spherical coordinates originating at the center of the transmitting transducer. This yields a lateral resolution that is very small near the the transducer but grows larger as the distance from the transducer increases. However, a large aperture formed by a sparse array is capable of producing relatively uniform resolution for ranges equal to several diameters of the array. The previous patent shows an intermediate memory called the data memory which is used to store the three dimensional reconstructed field of reflecting objects. This is an intermediate memory since it must be further processed into a tomographic image or a two dimensional view through a three dimensional field of objects. The present invention can reconstruct tomograms or two dimensional views through three dimensional fields directly from the stored time history of the receiver elements. This increases the processing speed and reduces the amount of electronics by eliminating the requirements for an intermediate memory.

The final display will most likely be in rectangular coordinates whereas the previous approach reconstructs in spherical coordinates. This results in complex electronics being required in the implementation of the machine.

The transmitted wavefield from a small transducer emitting a pulse will approximate an expanding sphere at locations several diameters away from the transducer. This must be taken into account by the reconstruction processor or image degradation will occur. The previous approach makes no explicit provision for this and it would be hard to implement in such a two step reconstruction technique. The implementation would require look up tables or computation circuits for each reconstruction point and each receiver element. This would be hard to implement in real time and would use a large amount of electronics.

Pat. No. 4,706,499 describes a device which uses a round trip time of flight algorithm which automatically takes into account the curved nature of the wavefront propagating away from the transmitter. In addition no Fraunhofer or Fresnel approximations are made since the algorithm is essentially a Huygens wavelet based approach. It requires only the computation of the distance from the transmitter to the reconstruction point and computation of the distance from the reconstruction point to each receiver element.

However, there are further improvements and modifications that can be made.

The time history memories can be eliminated by a reconstruction technique that immediately sums or combines echo samples as they are sampled into the appropriate reconstruction locations (or voxels) in the 3D memory containing the reconstruction three dimensional image.

The 3D memory can be eliminated by combining the echo samples as they are sampled into the appropriate pixels in the tomographic image and the shadowgraph image. (The shadowgraph image is the 3D memory data integrated along a specified viewing perspective vector to provide a two dimensional view through a three dimensional volume)

Multiple redundant transmitted pulses may be used to reconstruct a single image whereby the image signal to noise ratio is improved. The term "redundant" is used since only one transmitted pulse is necessary for the reconstruction of a three dimensional image.

Multiple transmitters may be used with the redundant transmitted pulses to reduce the sidelobe levels. These transmitters are to be spatially offset from one another. The receiver elements may be used as the multiple transmitters or separate transmitting elements may be used. The echoes from the multiple transmitters may be summed, or combined in another manner, in time history memories or separate images may be reconstructed from each different transmitters echoes and the resulting images combined or summed. The later may be done in the absence of time history memories.

Recording devices may be added to record the echo time histories from a number of sequential transmitted pulses. At a later time the recording then can be played back through the machine allowing image reconstruction to take place. The resulting "real time" 3D image can be viewed from various viewing perspectives and tomograms may be extracted from various positions and orientations.

If oscillations occur in the transmitted pulse, the image can be degraded. Several techniques may be used to compensate for or accommodate this.

The reconstruction technique described in Pat. No. 4,706,499 is essentially the backprojection of the echo samples over ellipsoids of revolution as will be more fully described in this application. The backprojections may be weighted as a function of the reconstruction point position to compensate for transmitter or receiver radiation patterns and other phenomena.

The sparse receiver array, by the addition of elements, may be made into a more nearly continuous array which when arranged in a circle would be a phased annulus or adjustable axicon. This sort of receive array normally has very high sidelobes but when used with a noninterfering transmitted pulse and ellipsoidal backprojection has acceptable sidelobe levels. The addition of redundant pulsing and multiple transmitters further reduces the sidelobe level.

In forming shadowgraphs by integration (two dimensional views through three dimensional volumes), the sidelobes are integrated and the relative sidelobe level is degraded. After a three dimensional image is created of a volume containing many point reflectors, the sidelobes create a more or less continuous background level. If this background level is subtracted out (or truncated) before the shadowgraphs are created, the relative sidelobe level will not be degraded as much.

Another method of reducing sidelobe levels is to use a nonlinear form of combination in the reconstruction process (as contrasted with only using addition). For example, the echo samples may be multiplied together. The samples could be logarithmically compressed and then added together. The samples could be, first, applied to a comparator, being compared with a reference value, thus being converted to binary values, and then be combined using logic operations such as conjunction, alternation (disjunction) or more complex compound logical operations. The samples could be first compressed using the square root, then added, the results then could be decompressed by squaring.

Nonlinear combination could be useful when the three dimensional volume to be imaged contains only a few sparsely spaced objects.

The class of types of transmitted pulses that the imaging system may use can be broadened to include any type of pulse with a sharply peaked autocorrelation function that has a small value except when the shift variable is near zero. These types of pulses can be non interfering or purposes of this application as there is little constructive interference and grating lobes will not be formed when using a sparse array. A wideband noise pulse is an example. This type of pulse also can propagate relatively uniformly through a wide solid angle. Further discussion of these types of pulses may be found in "Random Data:Analysis and Measurement Procedures" by Bendat and Piersol.

SUMMARY

This invention will provide a three dimensional image after transmitting a single pulse (or reduced number of pulses) of energy using the echoes received by a sparse array of receiver elements.

It will image a three dimensional volume in real time or near real time and provide a means of reconstructing a three dimensional image of objects using echoes resulting from the transmission of a single pulse of energy while avoiding grating lobes and other interference effects when using a sparse array of receiver elements.

It uses a reconstruction technique based on the speed of propagation of elementary wavelets generated by the transmitter and reflecting points on objects. Each echo sample at each receiver element represents the integral of the imaged object field over an ellipsoid of revolution. Thus the echo samples are projections of the field of objects over ellipsoids of revolution. Reconstruction is done by backprojection of these projections. The backprojection algorithm is simple and fast. Various filters may be applied to the echo samples before backprojection. These filters can sharpen the image, reduce the sidelobe levels, or compensate for propagation phenomena.

Some additional objects of this invention are:

To illuminate or insonify a wide angular volume uniformly with the transmission of a single pulse of energy.

To provide a means of viewing three dimensional data on a two dimensional display.

To provide a means for reconstructing an image which provides relatively uniform resolution throughout the imaged volume.

To use a simple reconstruction method which uses one geometrical step.

To use a reconstruction method which is based on rectangular coordinates.

To reconstruct the image of objects causing echoes directly from the stored time history of echoes received at each element of the receiver array.

To use a reconstruction algorithm which uses the combined distances from the transmitter to the reconstruction point and from the reconstruction point to the receiver element as a basis for reconstruction.

To reconstruct three dimensional images and tomographic images from the array element time histories without the use of large intermediate memories.

To use a reconstruction algorithm which can reconstruct points in any order within the insonified three dimensional volume and thus facilitate the reconstruction of variously oriented volumes and tomograms viewed from various perspectives.

To use a reconstruction algorithm which inherently takes into account the wavefront curvature of the transmitted pulse.

To use a reconstruction algorithm which makes no Fresnel, Fraunhofer, or similar approximations.

Further objects and advantages of this invention will become apparent from consideration of the drawings and descriptions of the preferred embodiment.

BRIEF DESCRIPTION OF THE DRAWINGS

FIG. 12 shows multiple transmitters.
FIG. 13 shows multiple redundant pulses/summing into echo time history memories.
FIG. 14 shows multiple redundant pulses/summing into image pixels.
FIG. 15 shows an echo recording device.
FIG. 16 shows oscillation compensation.
FIG. 17 shows the echo geometry.
FIG. 18 shows echo and reconstruction geometry for two receiver elements.
FIG. 19 shows Echo and reconstruction geometry for four receiver elements.
FIG. 20 shows an axicon array.
FIG. 21 shows a lidar embodiment.
FIG. 22 shows a radar embodiment.
FIG. 23 shows a sonar embodiment.
FIG. 24 shows a particle beam embodiment.
FIG. 25 shows time history filtering.
FIG. 26 shows echo sample integration/blip imaging.
FIG. 27 shows different transmit and echo velocities.
FIG. 28 shows reconstruction address generation for multiple transmitters.
FIG. 29 shows different transmit and echo velocities and the method of time history address generation.
FIG. 33 shows the transmission of an oscillating pulse.
FIG. 34 shows backprojection image reconstruction using an oscillating transmitted pulse.
FIG. 35 shows quasi specular reflection with an oscillating transmitted pulse.

DESCRIPTION OF THE PREFERRED EMBODIMENT

Description Of The Preferred Embodiment—medical ultrasound

Figure 1:
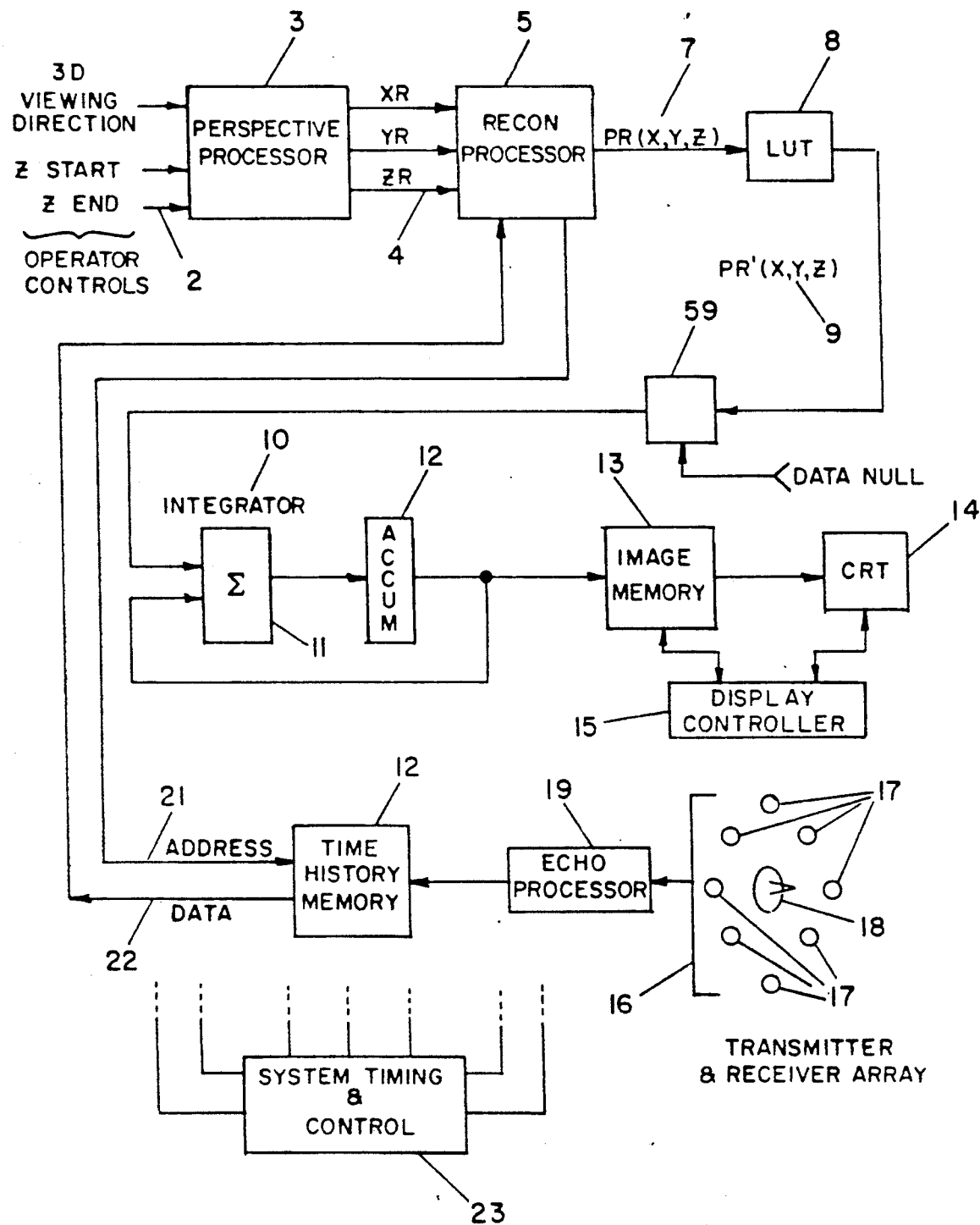
FIG. 1 shows a block diagram of the single pulse imaging system.
Figure 2:
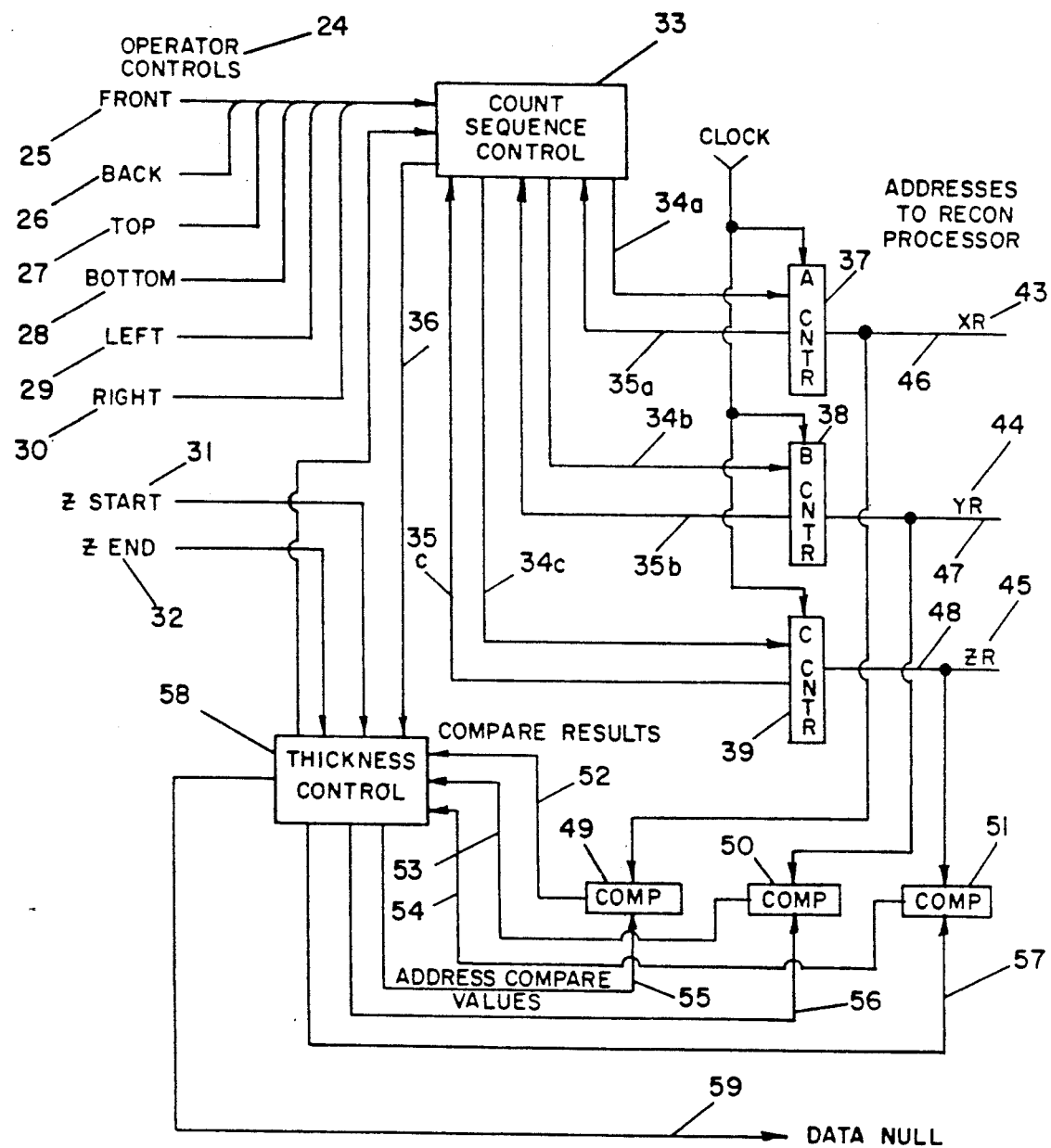
FIG. 2 shows a block diagram of the perspective processor which controls the reconstruction sequence to generate three dimensional or tomographic views from user selectable perspectives.

The apparatus described herein is a means of imaging three dimensions with the transmission and reception of a single pulse of ultrasonic energy. FIG. 1 is a system block diagram. A single transmitting element (18) is located at the center of a sparse circular array (17) of receiver elements. The transmitter emits a single unipolar pulse of energy. An example of the method of generration of such a pulse, and experimental results can be found in "Electronic Circuit for High Frequency and Broad Band Ultrasonic Pulse Echo Operation" by Platte et al in Ultrasonics 1987 vol 25 March. A multicycle pulse may be used if the echoes are converted to unipolar pulses by rectification at the receiver elements before further processing occurs. A multicycle pulse may also be used without rectification if certain other criterion are met. These criterion are discussed later. Also a wideband noise like pulse may be used. The pulse shape may be a half cycle sinusoid, a gaussian pulse or any other monopolar pulse. A gaussian shape is efficient in that it contains a relatively small higher harmonic content. If a single cycle or multicycle pulse is used with a small transmitter element, a wide solid angle may be insonified uniformly. Then these pulses may be considered noninterfering or relatively noninterfering pulses for the purpose of insonification of the imaged volume and for the purposes of this application. This is illustrated in Pat. No. 4,688,430. Most mediums to be imaged attenuate higher frequencies more than lower frequencies. The ratio of the diameter of the transmitter to the length of the transmitted pulse determines the size of the solid angle that will be insonified uniformly. In other embodiments a transmitter which is large compared with the pulse length may be used if it is curved (or defocused) so that the radiated pulse is spherical. With a large transmitter the edge waves must be attenuated or otherwise accomodated.

As the pulse propagates away from the transmitter, objects in its path will generate echoes that propagate back toward the receiver array. These echoes are detected by the elements (17) of the receiver array. Because a unipolar pulse is used, the receiver array elements may be spaced far apart creating a large sparse aperture which will have better lateral resolution than the same number of elements configured into a dense array. With a unipolar pulse (or any non interfering pules) no grating lobes will occur.

A sparse array is an array of elements that, for the purposes of this application, are placed no closer together that one half the spatial length of the transmitted pulse.

The echoes detected at each receiver element are amplified, processed and digitized by the echo processor (19) and then stored in time history memory (12). They may also be stored in an external memory such as a disk drive for later use. These echo samples are projections over ellipsoids of revolution of the imaged objects as is shown in FIGS. 17,18,19.

A pulse is generated by the transmitter. It propagates though the object field as an expanding spherical surface of radius RTP (FIG. 17-303,306). As the surface encounters points in objects (FIG. 17-300,301), wavelets of radius RPE (FIG. 17-304,305) are generated which propagate back toward the receiver elements (FIG. 17-308, FIG. 18-312,314, FIG. 19-317,318,319,320). These are echoes which are detected by the receiver elements and recorded in the time history memories (FIG. 1-12). The elapsed time from pulse transmission to an echo sample defines the round trip distance, RTP+RPE, from transmitter to reflecting point and back to the receiver element (FIG. 17-303,304). There are numerous points which can contribute to a particular echo sample. These points, specifically, are all of the points which lie on an ellipsoid of revolution with the foci being the transmitter and the particular receiver element (FIG. 17-302). The eccentricity is determined by the round trip distance which is also equal to the major axis. Therefore each echo sample from each receiver element represents a projection of the object field over an ellipsoid of revolution (FIG. 17-302, FIG. 18-309,310, FIG. 19-322).

System timing and control (23) synchronizes, controls and coordinates the various elements of the imaging apparatus. The perspective processor (3) is responsive to the operator controls (2) which determine the direction or perspective from which the final image will be viewed. The perspective processor also allows the operator to determine the thickness of the three dimensional volume which will be viewed on the final two dimensional display (14). This is done by removing front portions and rear portions of the image in a direction orthogonal to the viewing screen (14). The thickness of the portions to be removed are determined by the z start and z end operator controls (2). By using these controls the image may be reduced to a tomogram located at any position orthogonal to the viewing screen. The three dimensional viewing direction is also an operator control (2) and allows the imaged volume to be viewed from the front, back, top, bottom, right side, or left side. This, in conjunction with the z start and z end controls, allow viewing of the imaged volume from six different directions and also allow viewing volumetric images of various thicknesses, positions and orientations in addition to tomographic images of various positions and orientations. The perspective processor (3) sequences the three dimensional reconstruction points (4) that are fed to the recon processor (5). It does this in such a manner that fixed sequences of reconstructed points (7) may be summed by the integrator (10) and the results stored in the accumulator (12) to form one pixel at a time of the final two dimensional view through the three dimensional volume.

The look up table (8) provides a means for shading the two dimensional view through the three dimensional volume so that a front to back gray scale perspective is formed. The look up table can also be used for other image processing functions by programming its contents with other values. The look up table mapped, reconstructed points (9) are fed to the integrator (10). The adder (11) sums these points with the data in the accumulator (12) and replaces the data in the accumulator with the results. This process constitutes a weighted integration of the reconstructed three dimensional volume in a direction orthogonal to the screen of the final two dimensional display (14). The integrated three dimensional data sequences each form one pixel in the two dimensional image memory (13). The data in this memory is converted to a composite video signal by the display controller (15) and is used to drive the cathode ray tube circuits (14).

DETAILED DESCRIPTION OF THE PREFERRED EMBODIMENT

Figure 3:
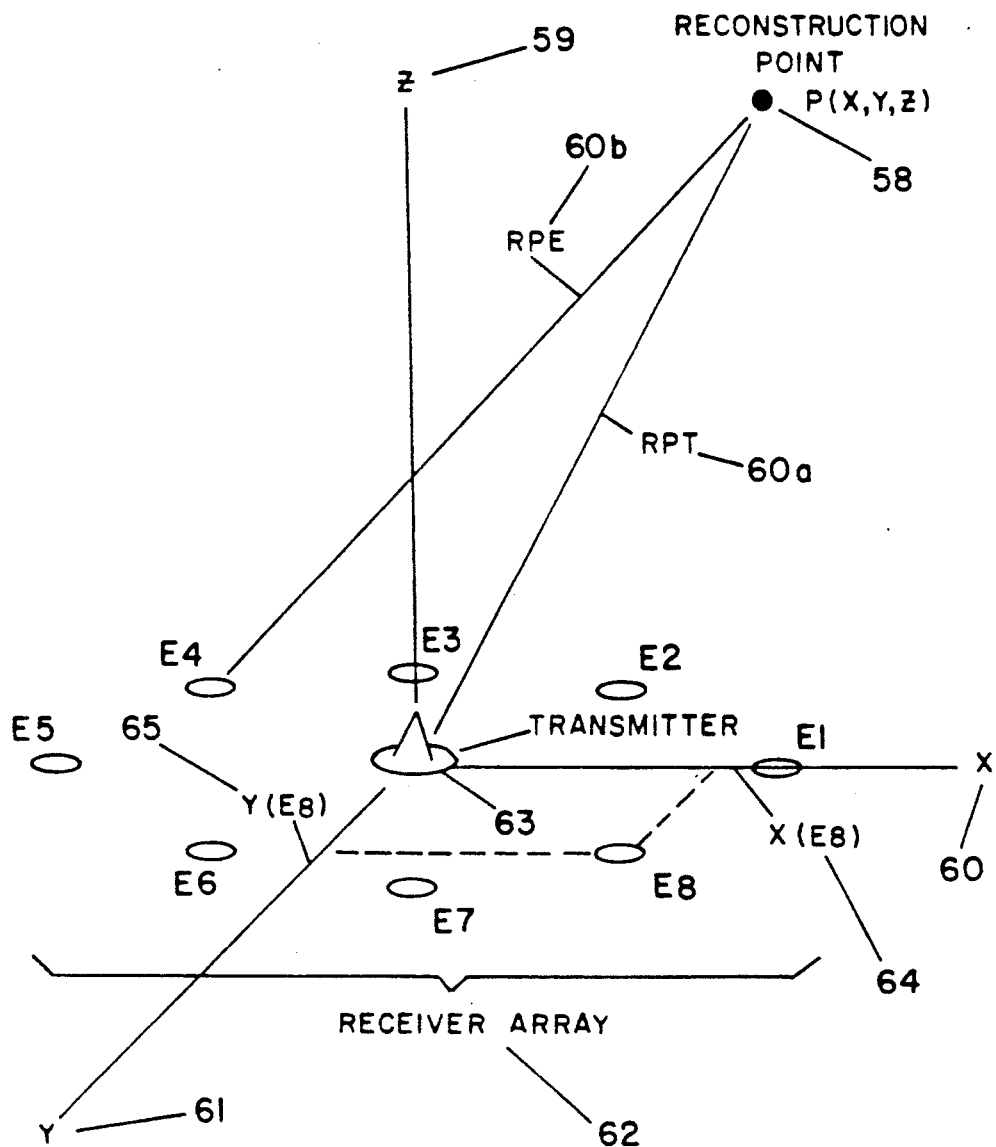
FIG. 3 shows the reconstruction geometry including transmitter and receiver and also the particular point to be reconstructed.

FIG. 3 is a drawing of the reconstruction geometry. The receiver array is in the x y plane and consists of a sparse array of receiver elements (62) evenly spaced on the circumference of a circle. Thus in this embodiment the receiver is an axicon constructed with a sparse array. The transmitter (63) is located at the origin of the x y z coordinate system and transmits a pulse in the z direction. An example reconstruction point is shown at (58). RPE (60b) represents the distance that an echo must travel from the reconstruction point (58) to receiver element E4. RPT (60a) represents the distance that an acoustic pulse must travel from the transmitter (63) to the reconstruction point (58). The sum of RPE and RPT defines the eccentricity of an ellipse of revolution, FIG. 17-302.

Figure 6:
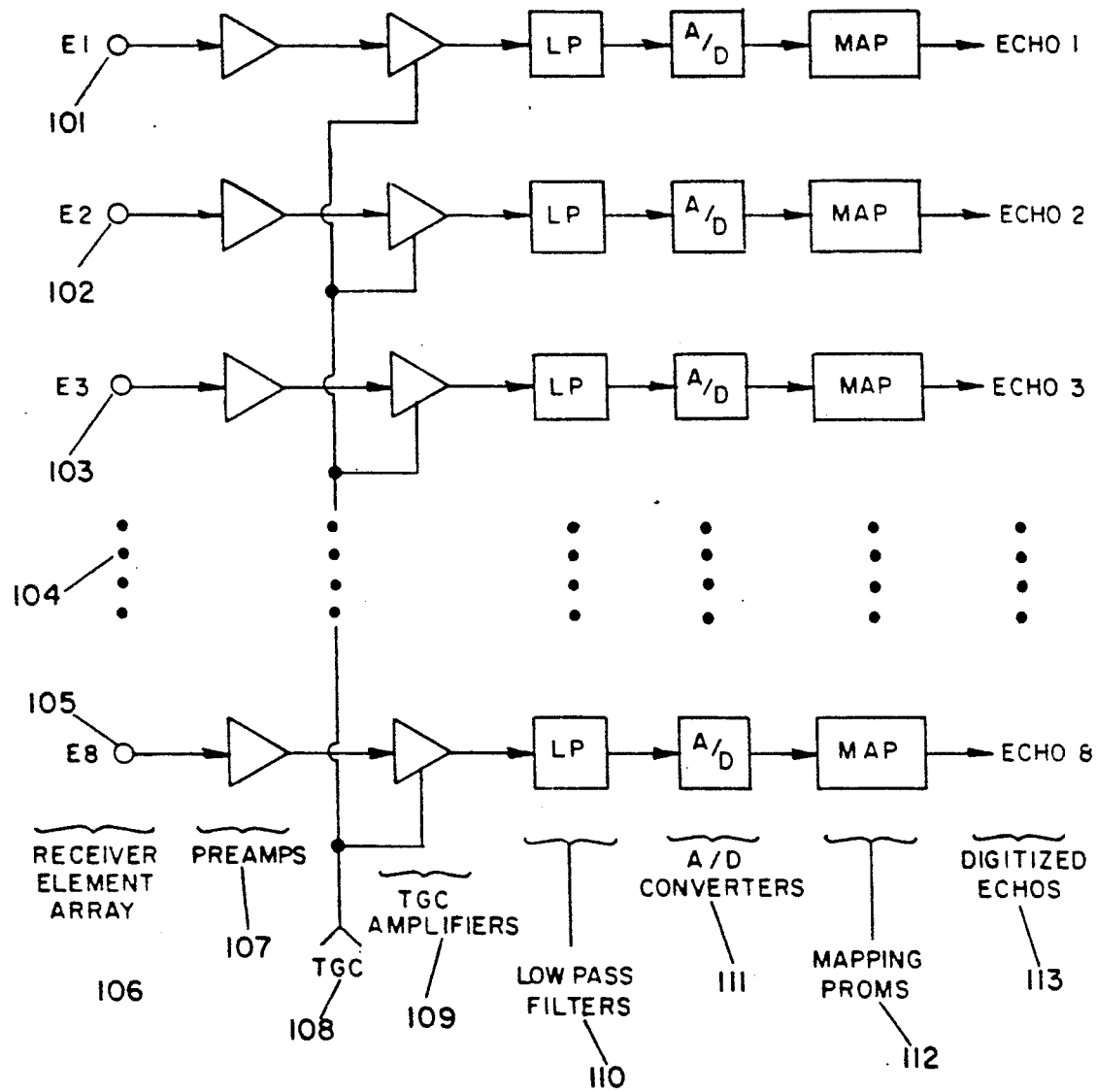
FIG. 6 shows the echo processor which first receives the echo data from the receiver elements.

FIG. 6 shows the echo processor which receives echo data from the receiver arrays elements (106). The preamplifiers (107) increase the magnitude of the echoes to reduce the effects of noise further along in the system. The time gain compensation amplifiers (109) provide a time varying gain to compensate for attenuation in the imaged medium which is a function of the echoes time of flight. The tgc input (108) consists of an adjustable ramp which increases the gain for echoes coming from reflectors further away from the receiver array. The low pass filters (110) are necessary to prevent aliasing. The analog to digital converters (111) convert the echoes to digital samples. The mapping proms (112) can be used for various types of dynamic range compression or expansion while the data is in sampled wavefield form. The output signals are the digitized echo samples (113). Each sample represents a projection of the object field over an ellipsoid of revolution, refer to FIG. 17,18,19.

FIG. 1 (19) shows the time history memory which receives the processed and digitized echo data from the echo processor. This memory consists of two alternating memories, one being read into while the other is being read out of. The data in the memory is a sampled and processed, but geometrically distorted, replica of the time history of the wavefield incident on the surface of the receiver array.

FIG. two is a block diagram of the perspective processor. The perspective processor controls the direction from which the three dimensional imaged volume is viewed. It also controls the thickness of the tomographic images and their location within the imaged volume and, in addition, the thickness of the tomogram. The count sequence control (33) accepts inputs from the operator controls (24) and configures the counter control lines (34a), (35), (34b), (35b), (34c), (35c) to the address sequence counters (37), (38), (39). It does this such that the correct sequence of reconstruction point addresses (43), (44), (45) are fed to the recon processor. The counter control lines configure the counters in count up or count down mode, preset them to the correct value, and determine the interconnection of the carry in and carry out signals. The thickness control (58) accepts z start (31) and z end (32) operator controls and monitors the counter values (46), (47), (48) by loading comparison values (55), (56), (57) into the comparators (49), (50, (51). If the counter values are outside the range as determined by the zstart (31) and z end (32) controls it activates the data null signal (59) which causes data values of zero to be fed into the integrator FIG. 1, (59), (10).

Figure 4:
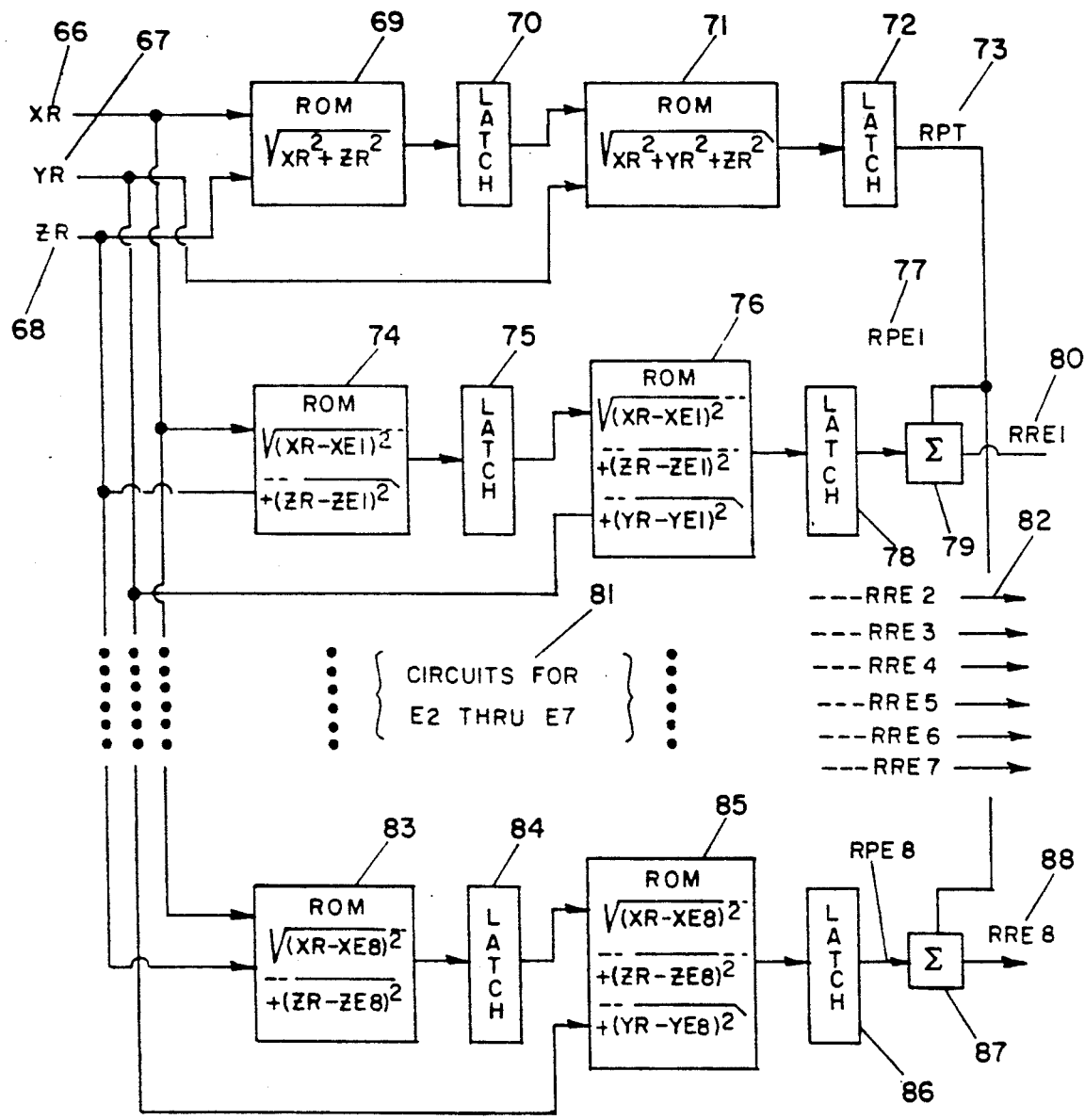
FIG. 4 shows the reconstruction address generator which takes the reconstruction point coordinates as an input and computes the appropriate time history addresses as outputs.
Figure 5:
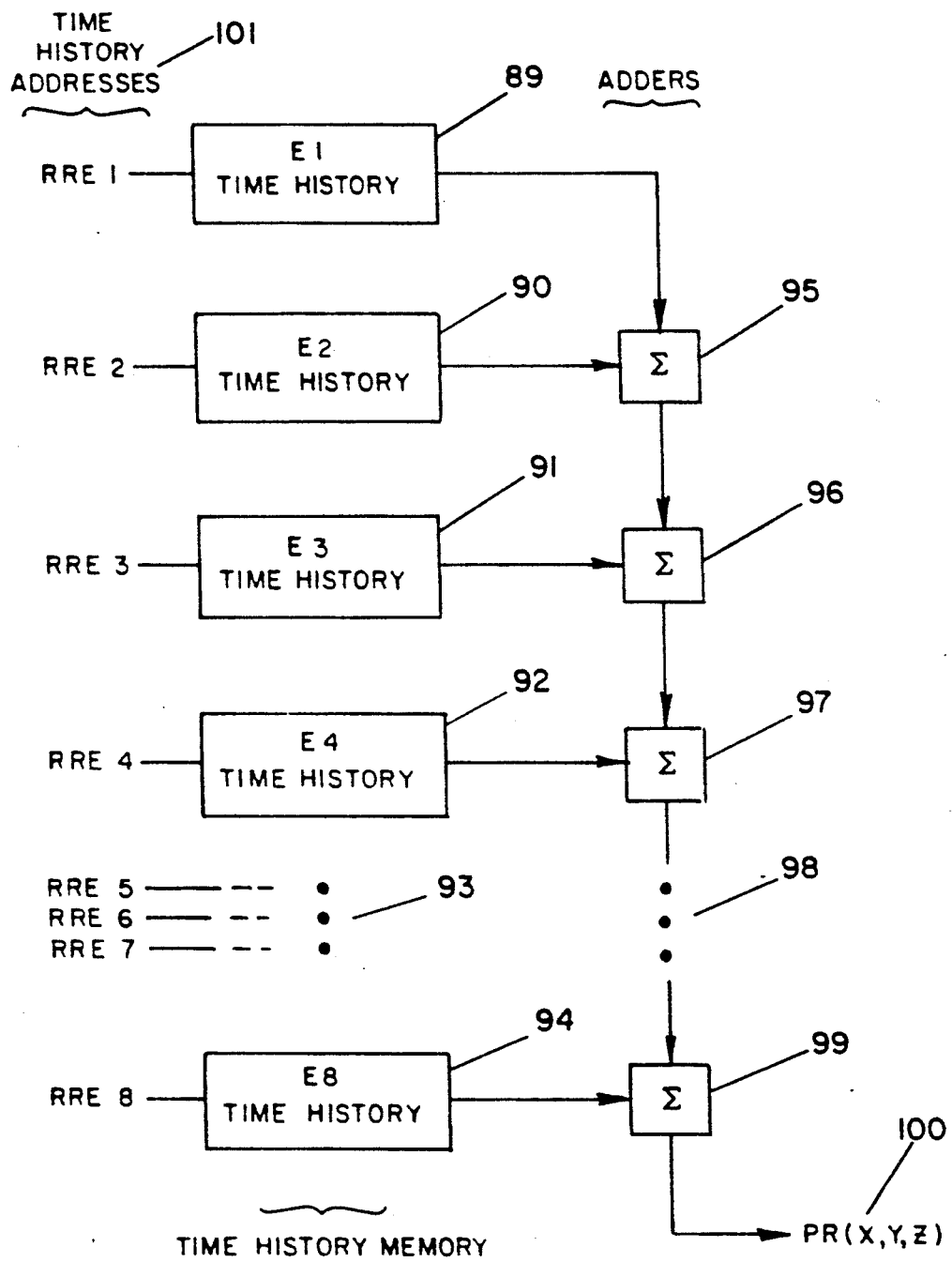
FIG. 5 shows the reconstruction summer which sums the appropriate time history data together to reconstruct an object field point.

FIG. 4 is a block diagram of the reconstruction address generator. The reconstruction address generator sends a steam of addresses to the reconstruction summer (FIG. 5) which controls the way in which the time history memory data (FIG. 1 -12) is summed to reconstruct image points. The reconstruction algorithm is implemented in hardware by programmable logic and is a parallel pipelines structure. For each point to be reconstructed in the three dimensional volume (xr,yr,zr) (66,67,68) the recon address generator computes the appropriate addresses for the recon summer (FIG. 5). Given the reconstruction point coordinates and the time of flight, or equivalently (within a constant factor, the total travel distance), the distance from the transducer to the point rpt (73) is computed by the two programmed roms (69, 71). To minimize rom size the first rom computes the distance to xr,zr and the second rom takes this distance and the zr coordinate and computes the final distance rpt. The rest of the rom circuitry is used to compute the distances from the reconstruction point to each of the receiver elements. Their are eight sets of roms similar to the two roms (74, 76). Each set is programmed to compute the distance for one of the eight receiver elements e1 through e8 (FIG. 3). The first rom of each rom pair computes the distance projected in the x z plane and the second rom takes this distance along with the y coordinate of the reconstruction point and computes the final distance rpe (77). The summers (79, 87) sum two the distances together to form the total distance from transmitter to reconstruction point to receiver element for each receiver element in the receiver array. This combined distance defines the major axis of an ellipse of revolution upon which lie the points responsible for echoes which make up a single echo sample. Then, each sample at each receiver element has a total travel time and total travel distance associated (FIG. 17-303,304,305,306) with it which defines the eccentricity of the ellipse (FIG. 17-302, FIG. 18-309,310, FIG. 19-322). The coordinates of the particular receiver element and the coordinates of the transmitter define the locations of the two foci (FIG. 17-307,308, FIG. 18-312,313,314, FIG. 19-317,318,319,320,321). Thus each sample from each receiver element has a unique ellipse of revolution associated with it. The sample represents the surface integral of the object field over this ellipse.

The speed of sound is used as a scale factor in producing the output addresses (80, 82, 88) which are sent to the reconstruction summer (FIG. 5). The round trip distance divided by propagation velocity divided by the sample interval gives the sample location in the time history memory. The separate rom pairs for each element form the parallel architecture whereas the latches (70, 72, 75, 77, 84, 86) form a pipelines architecture in that the reconstruction speed is governed by the single slowest element in the circuit rather than by a sum of circuit element delays.

FIG. 5 shows the reconstruction summer (recon summer) which adds the appropriate time history data together to reconstruct each image point. The time history addresses (101) are generated by the reconstruction address generator (FIG. 4) and cause the appropriate data to be accessed in each elements time history memory (89, 90, 91, 92, 93, 94). This data is summed by the adders (95, 96, 97, 98, 99) to form the reconstructed point pr(x,y,z) (100).

This reconstruction summation process constitutes the backprojection of time history samples over ellipsoids of revolution (FIGS. 18,19) in the same manner that the time history samples represented projections of the object field over ellipsoids of revolution. It is the inverse of the original sampling process. The eccentricity of the back projected ellipsoids is determined by the distance from transmitter to reconstruction point and back to the particular receiver element from which the time history was generated (FIG. 17-303,305). The foci of the ellipsoids are the locations of the transmitter and the particular receivers (FIG. 19-317,318,319,320,321). The reconstructed point and its sidelobe structure is the summation of backprojected ellipsoids from each of the receiver elements, refer to FIG. 19. The image of a single point gives the system point spread function. The point spread function for this imaging system varies with reconstruction point location. The system is not isoplanatic. However, if the method of combining echo samples is addition, the system is linear. Then the resultant image is the convolution of the spatially varying point spread function with a perfect image of the objects in the imaged 3D volume.

FIG. 1 which is a system block diagram shows the integrator (10), the image memory (13), the crt display (14), and the display controller (15). These components function together to provide a display of the three dimensional imaged volume or selected tomographic images. The integrator receives reconstructed points from the reconstruction processor (5) in a sequence consisting of subsequences such that the summation of each subsequence forms one pixel for the two dimensional display. Each pixel then represents a view along a line through a three dimensional volume. The integrator forms these subsequence summations by using results fed back from the accumulator (12). The resulting pixels are placed in the appropriate locations in the image memory (13). The image memory consists of two alternating memories, one in read mode and one in write mode. The display controller (15) forms a composite video signal using the data in image memory and the video synchronization signals. This video signal is fed to the cathode ray tube (14).

Description Of The Second Embodiment—lidar

Refer to FIG. 21

This imaging system uses a circular very sparse array of light detector elements (335,336,337) with a light emitter (338) located near the center. The emitter generates a very short pulse of light (333) which propagates outward through a wide solid angle (334). Objects in the path of the propagating pulse reflect light back toward the detector array. Each element in the detector array consists of a light collector and a light detector. The collector redirects the incident light on to the detector. The detector converts the light to an electric signal which is recorded as a function of time in the elements time history memory. The image reconstruction is performed as described in the preferred embodiment.

Description Of The Third Embodiment—underwater sonar

Refer to FIG. 23

This system uses a vertical sparse array of sonobouys (340,341,342) as a receiver array. The buoys are anchored (344) in place. The transmitter is an acoustic projector (343) located near the center of the array. The transmitter generates a short monopolar pulse which propagates outward through a wide solid angle. Objects in its path cause echoes which propagate back toward the receiver array which convert them to electric signals (339) which are transmitted back to a remotely located image reconstruction system. There they are recorded in the individual elements time history memories. Image reconstruction follows the description in the preferred embodiment with modifications for a different propagation velocity and different geometry.

Description Of The Fourth Embodiment—particle imaging

Refer to FIG. 24

This embodiment uses a short pulse of particles (346) to reconstruct a three dimensional image. The receiver array is an approximately circular, very sparse array of particle detectors (348). The transmitter is a particle emitter (349) located inside or outside of the receiver array. The transmitter generates very short burst of particles (346) which propagate out through a wide solid angle (347) with uniform velocity. Elastic collisions with objects in the path of the propagating pulse cause particles to be reflected back toward the receiver array. The particle detectors in the receiver array generate electric signals proportional to the number of incident particles. These signals are recorded as a function of time in the individual elements time history memories. Image reconstruction takes place as described in the preferred embodiment.

Description Of The Fifth Embodiment—radar

Refer to FIG. 22

This imaging system uses echoes caused by the transmission of a single radar pulse (333) to reconstruct a three dimensional image. The receiver is an approximately circular, very sparse array of radar antennas (335,336,337). An electromagnetic transmitter (338) is located inside or outside of the array. The transmitter generates a monopolar or multicycle pulse (333) which propagates out through a wide solid angle (334). Objects in its path cause echoes which propagate back toward the receiver array. The echoes are detected at the individual elements and rectified and filtered if a multicycle pulse was used. They are converted to electric signals which are recorded in each individual element's time history memory. Image reconstruction occurs as described in the preferred embodiment.

Elimination of the Time History Memories

Figure 7:
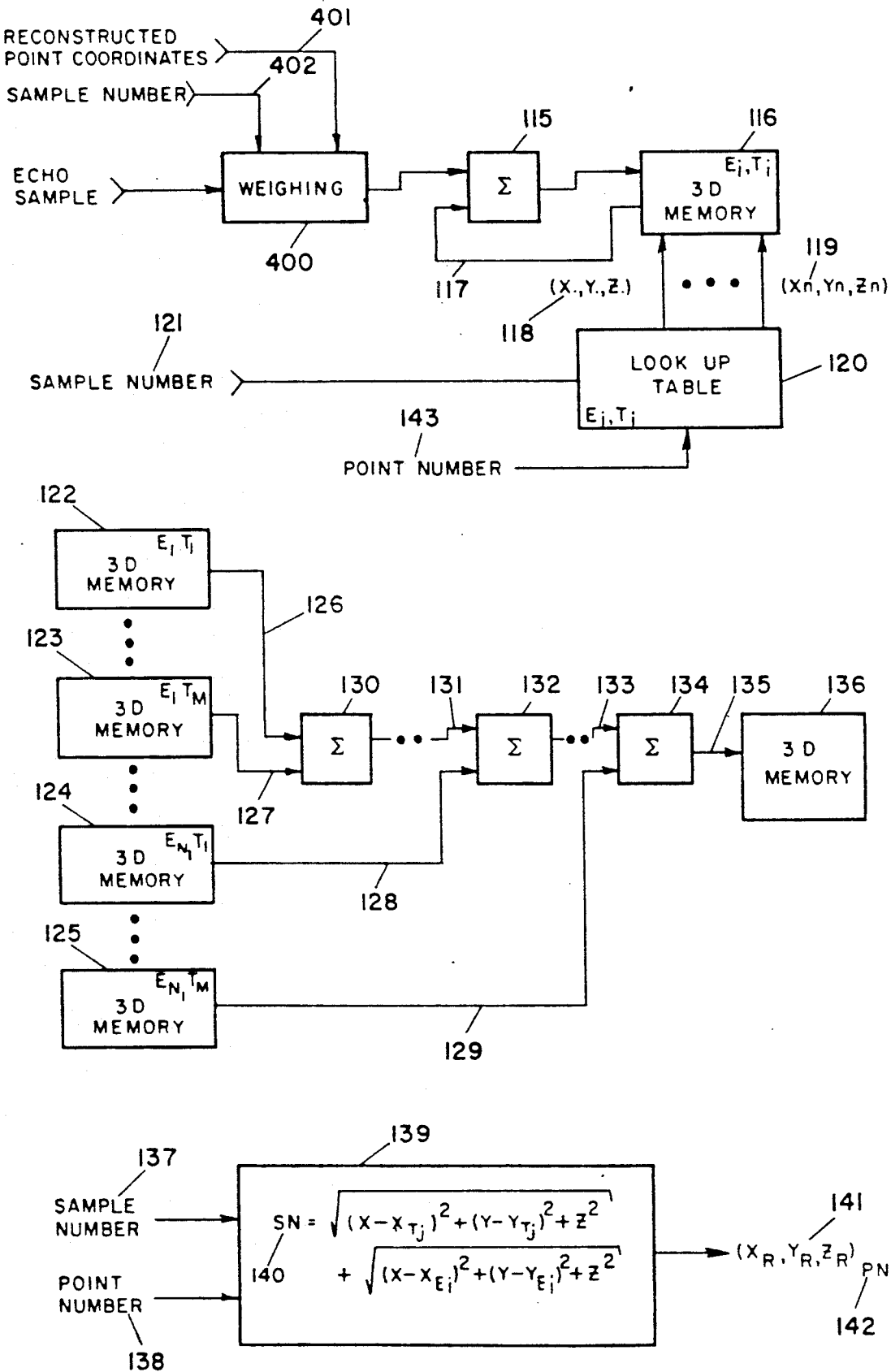
FIG. 7 shows time history memory elimination.

Refer to FIG. 7

The object is to sum echo samples immediately, as they are sampled, into the appropriate reconstruction points. This constitutes the immediate backprojection of the echo samples over ellipsoids in the 3D image memory. If this is done, no time history memory is required.

Since the image reconstruction comprises backprojection of the echo samples over ellipsoids, the reconstructed image is the superposition of ellipsoids, one for each echo sample collected. As the echo samples are taken, they may immediately be summed into the appropriate voxels in the 3D image memory. Each echo sample will be summed into every voxel intersected by the ellipsoid associated the sample. This requires circuitry (and/or a ROM look up table) which uses the equation of the ellipsoid (for example see "Calculus with Analytic Geometry" Johnson and Kiokemeister) to compute the appropriate voxel addresses.

Each echo sample (114) is summed by the adder (115) into the appropriate voxel (117) in the 3D memory (116). In the illustrated implementation there is a separate 3D memory for each receiver/transmitter combination (Ei,Tj). This provides maximum reconstruction rates, but may require too much electronics if there are many receiver/transmitter elements. A single common memory may be used if it is multiplexed or time shared by echo samples from different receiver elements.

The look up table (120) controls the voxel addresses (118,119) for the 3D memory. Since there are several voxels into which a given echo sample will be summed, the point number input (143,138) selects among the several voxels allowing the sample to be summed into each of them in sequence. The contents of the lookup table is determined by the equation (140) which gives the points on an ellipsoid given the sample number (121,137) and the transmitter/receiver elements coordinates.

The individual 3D memories (122,123,124,125) voxels (126,127,128,129) are summed by adders (130,131,132,133,134) into the final 3D memory (136).

Figure 8:
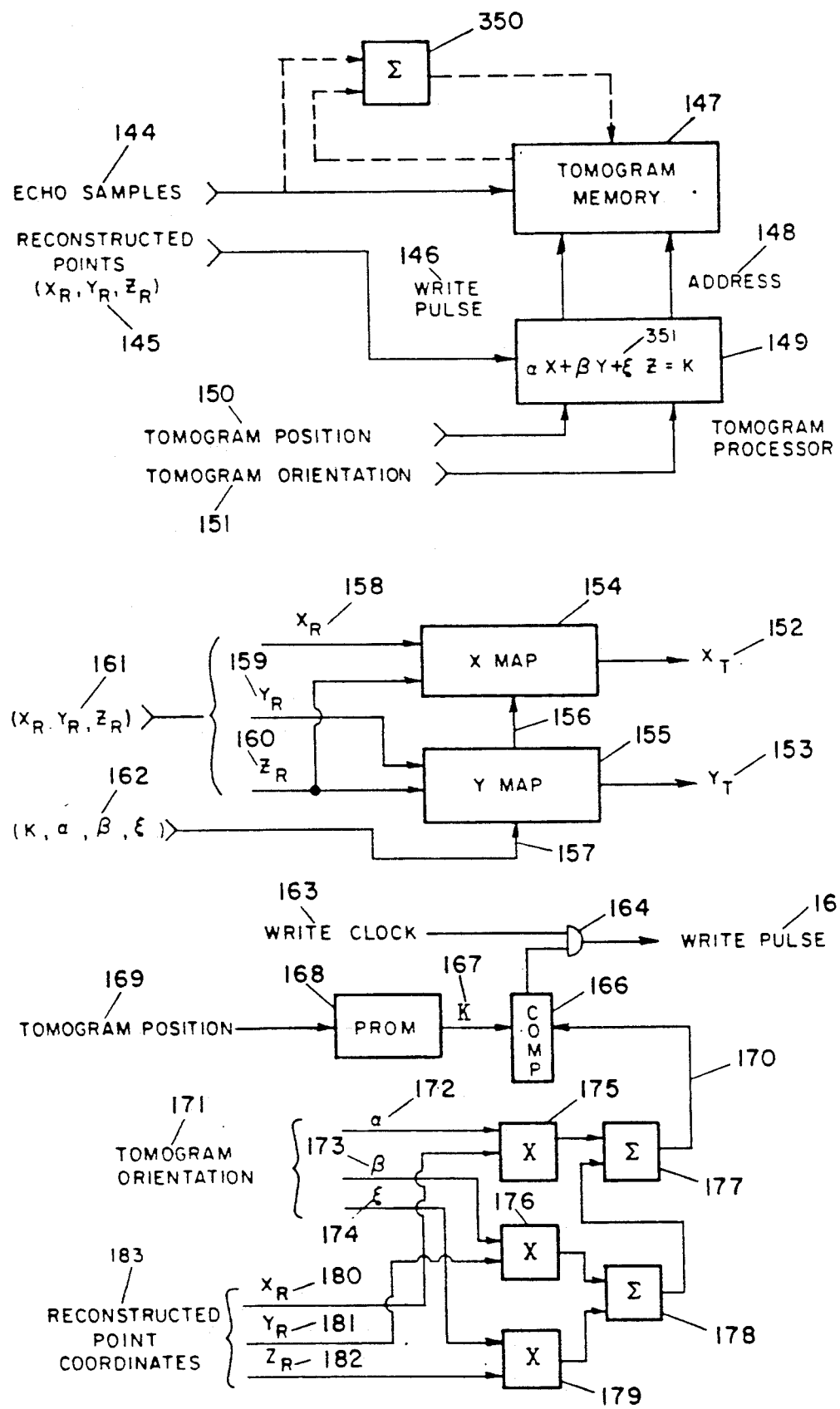
FIG. 8 shows 3D memory elimination.
Figure 9:
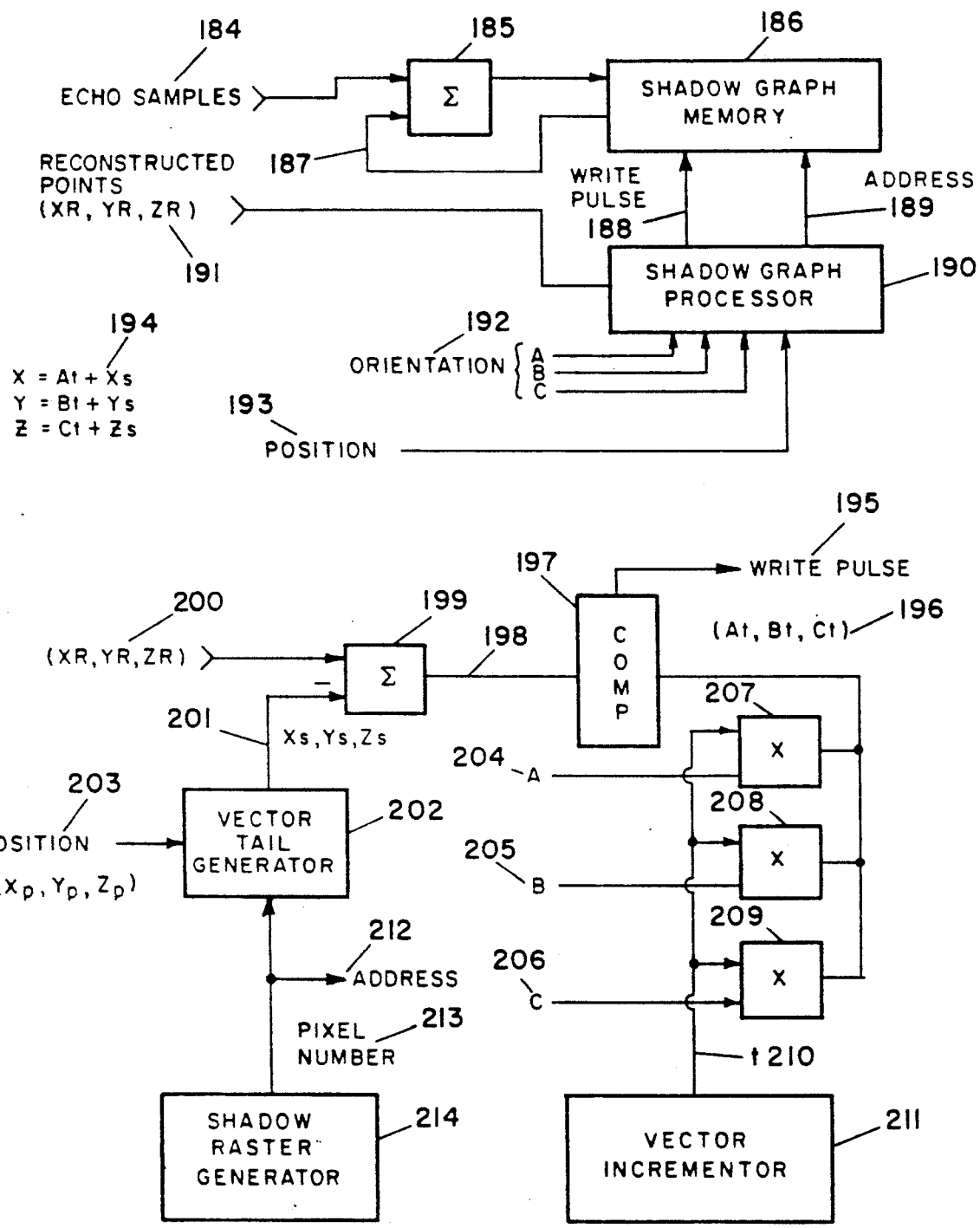
FIG. 9 further shows 3D memory elimination.

Elimination of the 3D memory refer to FIGS. 8 and 9

The object is to sum the echo samples (144,184), either from time history memories or directly as the echoes are sampled, into the appropriate pixel locations in the tomogram image in the tomogram memory (147) and the shadowgraph image in the shadowgraph memory (186). This eliminates the requirement for a 3D memory.

Alternately, the reconstruction points may be reconstructed in a register and then directly transferred to the appropriate locations in the tomogram memory and summed into the appropriate locations in the shadowgraph memory.

If echo samples are summed into the tomogram memory an additional adder (350) is required.

The figures show the direct writing of reconstructed points into the memories. In synchronism with the reconstructed points are the reconstructed points' coordinates (145,191). The coordinates are input to the tomogram processor (149) and the shadowgraph processor (190). The tomogram processor has as additional inputs, the tomogram position (150) and the tomogram orientation (151). The shadowgraph processor has as additional inputs, the viewing orientation (192) and the viewing position (193). Both processors generate write pulses (146,188) and memory addresses (148,189).

The tomogram processor contains lookup tables derived from the equation of a plane (351). The tomogram orientation inputs (171) provide the coefficients, alpha, beta and gamma (172,173,174), for the equation. These are multiplied (175,176,179) by the reconstructed point coordinates (180,181,182) and summed by adders (177,178) to form the left side of the equation (170). The tomogram position (169) provides the constant factor (167) after being scaled by a lookup table (168). The opposite sides of the equation are tested for equality by the comparator (166). Equality is anded (164) with a write clock (163) to generate the write pulse (165).

The tomogram processor also generates memory addresses (148,152,153). The reconstruction point coordinates (161,158,159,160), tomogram position and tomogram orientation (156,157,162) are inputs to prom based algorithm processors (154,155) which generate the addresses (152,153).

The shadowgraph processor (190) takes the reconstruction point coordinates (200), the starting viewing position (203) and the viewing orientation angles (204,205,206), associated with the x,y,z base coordinates, and formulates the equations (194) of straight lines which represent the line integrals which will become pixels in the shadowgram. The raster generator (214) generates a sequence of pixel addresses (212,213) representing the pixels in the shadowgram. These are used in conjunction with the shadowgram position (203) by the vector tail generator (202) to generate the vector tail addresses (201). The vector tail addresses are subtracted (199) from the reconstruction point coordinates (200). The result (198) is one input to a three stage comparator (197) which will generate a memory write pulse (195). The vector incrementor (211) increments a parameter (210) which is multiplied (207,208,209) by the shadowgraph orientation angles (204,205,206). The results are the other input (196) to the three stage comparator.

Elimination of Both 3D and Time History Memories

Figure 11:
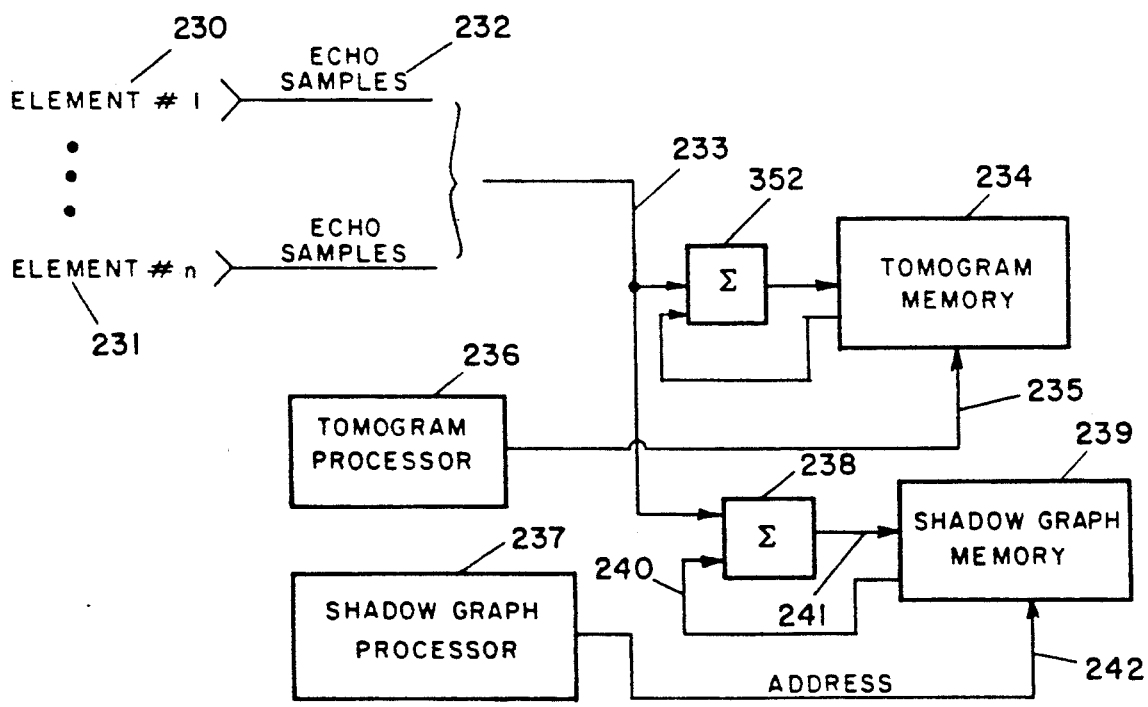
FIG. 11 shows elimination of both 3D and time history memories.

Refer to FIG. 11

The object is to sum echo samples directly into the tomogram and shadowgraph pixels without using echo time history memories or a 3D memory.

An additional equation, related to the perspective viewing direction, may be combined with the equation of FIG. 7, yielding a resultant equation which can be used to construct all of the 2D pixel addresses that a given echo sample should be summed into. As before, as the echo samples are taken, they may immediately be combined into the 2D image without an intermediate time history memory or three dimensional memory.

The technique is the combination of the foregoing techniques to eliminate each of the two memories separately. The echo samples (232) from each of the n elements (230,231) are transferred directly (233) to the tomogram summer (352) and the shadowgraph summer (238). The tomogram processor (236) controls the tomogram memory write pulses and addresses (235). The shadowgraph processor (237) controls the shadowgraph read/write pulses and addresses (242). The summer (238) combines the echo samples (233) with memory locations (240) to reconstruct pixels and perform the integration (241).

Object Oriented Display

Figure 10:
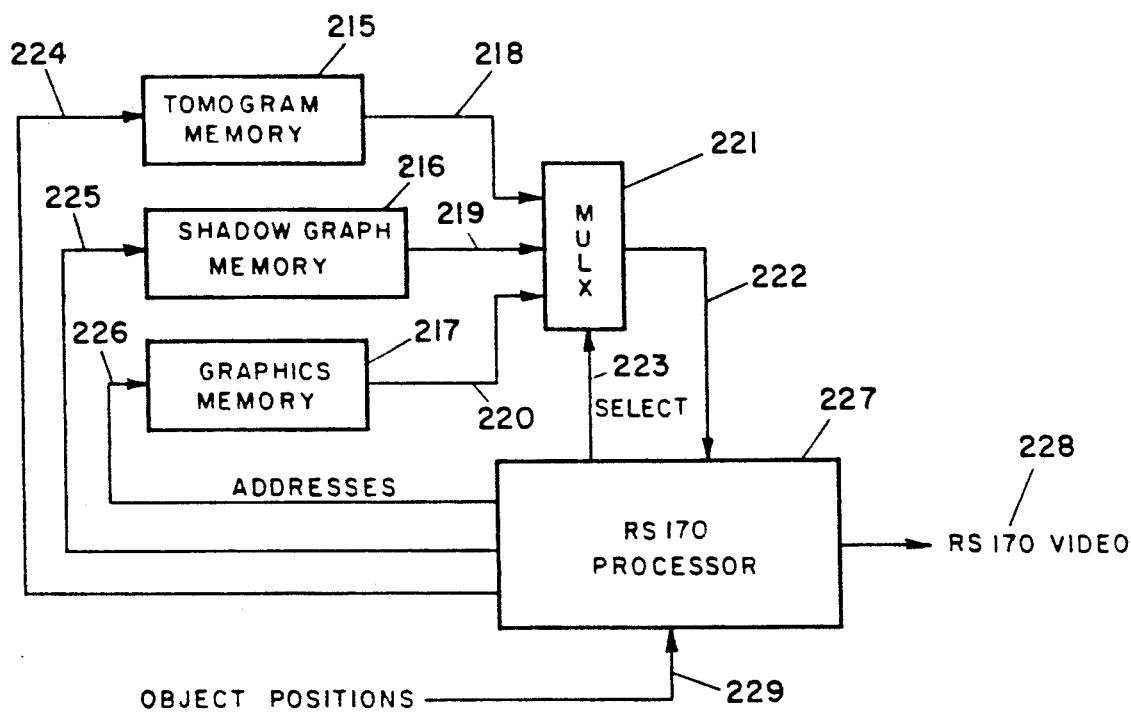
FIG. 10 shows an object oriented display.

Refer to FIG. 10

This display technique allows the tomogram, the shadowgraph and the graphics display to be maintained as separate objects to be combined into the rs170 video signal. This eliminates the need for a separate complete display memory and allows the display objects to be repositioned (229) or modified separately by the user.

The three separate image objects' (215,216,217) addresses and read pulses (224,225,226) are controlled by the rs170 processor (227) which also controls (223) the multiplexer (221). The processor, as the rs170 pixel scan progresses, combines pixels (222) into the rs170 video signal, as appropriate, from either the tomogram (218), shadowgraph (219) or graphics (220) memories.

Signal To Noise Improvement With Echo Time History Integration and Redundant Transmitted Pulses Refer to FIG. 13

Integrating an image over several frames is a technique commonly used to increase the image signal to noise ratio. If the noise is uncorrelated from one frame to the next, the signal to noise ratio is increased by the square root of the number of integrations. For each frame integration this involves summing each new pixel with each old pixel. For a three dimensional image this would be time consuming because of the large number of pixels.

This invention uses a reconstruction technique and system architecture that allows the same type of signal to noise improvement without having to sum individual pixels. Consecutive frames may be integrated by summing in the time history memories instead of the image memory and the effects will be similar. There is much less data stored in the time history memories before image reconstruction which greatly reduces the number of additions required for a full frame integration. This saves hardware and processing time.

Referring to FIG. 13, the time history memories (251,252) contain the echo time history from the last transmitted pulse. As new echoes (247,248) are received from a new transmitted pulse, the echo samples are added (249,250) to their counterparts from the last transmitted pulse. This can be continued indefinitely if the addition results are shifted right as the addition results fill up the capacity of the individual time history memory locations.

Signal To Noise Improvement With Image Integration and Redundant Transmitted Pulses (and "reduced pulse three dimensional imaging")

Refer to FIG. 14

As before, since in some imaging applications there is time for more than one transmitted pulse per image frame, multiple pulses may be transmitted and the resulting echoes combined into the same image to provide increased signal to noise ratios. Rather than "single pulse three dimensional imaging" this will be termed "reduced pulse three dimensional imaging" since the image will be formed after the transmission of a smaller number of pulses than would be required in conventional imaging systems. This same terminology applies when ever multiple redundant pulses are used as in the previous descriptions of signal to noise improvement techniques.

The echoes from each pulse may be used for a complete image reconstruction. The reconstructed pixels or voxels may then be summed into the previously reconstructed image. The process may be repeated for several transmitted pulses.

The reconstructed image points (255) are sent to summers (256,257) for the tomogram memory (258) and the shadowgraph memory (259). The summers perform the integration of image points resulting from several transmitted pulses.

Sidelobe Reduction With Multiple Offset Transmitters

Refer to FIG. 12

Sidelobes are created in the point response of the imaging system when back projected ellipses coincide at locations other than the actual location of the reconstruction point, refer to FIGS. 17-302 and 18-309. Integration of consecutive frames does not reduce the sidelobe level if the same elements are used for transmission and reception each time. However, if the transmission originates from a different location, because of offset transmitters, in each consecutive transmitted pulse, then, for a particular receiver element and particular reconstruction point, the back projected ellipses will coincide only at the location of the reconstruction point. Then, when integration over consecutive frames is done, the sidelobe levels will be reduced. The amount of the sidelobe reduction is proportional to the number of frame integrations with transmissions originating from offset transmitters and is therefore proportional to the number of offset transmitters.

The receiver elements (244) may be used as the multiple transmitters (243) or a separate transmitter array (245) may be used with the receiver array (246).

Receiver Elements Used As Transmitters

Refer to FIG. 12

The previously described embodiments show transmitters that are separate from the receiver elements. However, if the receiver elements can also be used as transmitters, a complete transmit receive array could be formed by a circular array of elements (244). Each element in the array (243) could be used, one at a time, consecutively for pulse transmission. If consecutive frame integration was implemented, sidelobe reduction and signal to noise improvement would be achieved without an increase in the number of array elements.

Weighted backprojections to compensate for element radiation patterns and other phenomena Refer to FIGS. 7,17,18,19.

Backprojections may be weighted (400) as a function of the sample number (total round trip time of flight, RTP+RPE) (402) or as a function of the reconstruction points coordinates (401) or both.

The transmitter and receiver elements have radiation patterns which may be partially compensated for by weighting the backprojections as a function of the reconstruction points coordinates. Finite area transmitter/receiver elements cause an actual backprojection pattern that is wider in the off axis direction (353,354). The echo sample represented by the backprojected ellipsoid can then be weighted as a function of the off axis angle (356) as it is summed into the various reconstruction points.

The ellipsoidal backprojections differ in length or area (309,310) depending on the sample number and the position of the foci (312,313,314). The echo samples can be weighted to take into account the total surface area of the backprojected ellipsoid.

Recording the Echo Histories in Recording Devices

Refer to FIG. 15

A recording device (264) may be added which, when connected (263), can record a sequence of echoes from the time history memories (265) of each of the receiver elements (261,262). The recorded echoes may later be played back into the time history memories for reconstruction of the image (266) by the rest of the imaging machine.

Axicon Array with Reduced Sidelobe Levels

Refer to FIG. 20

If more elements are added to a sparse circular array (324), the array will become a phased annulus or axicon. This type of aperture does not have grating lobe problems, but has very high sidelobe levels when used with oscillating transmitted pulses. If non oscillating or non-interfering pulses are used the sidelobe levels are reduced. If, in addition, multiple transmitters (325) and multiple redundant pulses are used, the sidelobes are further reduced.

Oscillation Compensation

Refer to FIG. 16

A non oscillating transmitted pulse may be hard to achieve in certain types of imaging systems. Also, if a non oscillating pulse is transmitted (267), propagation effects (268) may cause oscillations to build up (269). This may be compensated for by detecting or rectifying (271) the echo (270) and then filtering it (272) to generate corrected pulses (273) which are then used for image reconstruction.

Alternately, a time varying filter may be used where the filter coefficients are made a function of the sample number or time of flight to account for differing propagation effects depending on the round trip time of flight of the echo. The echoes (275) are digitized (274) and fed into a sequence of latches (276,277,278,279,280). The latch outputs (291,289,287,285,283,281) are multiplied (292,290,288,286,284) by the filter coefficients which are stored in a PROM (293). The prom address (294) is sequenced as a function of time of flight. The multiplication results are summed (295,296,297,298,299) and the result is a corrected pulse which is then used for image reconstruction.

Background Level Reduction

Refer to FIG. 19

A shadowgram is created by integrating along viewing vectors (316) through a reconstructed three dimensional volume. When this is done the sidelobe levels (322) are summed which obscures the resulting shadowgram. The sidelobe levels create a relatively constant ambient level in the reconstructed three dimensional image. If this level is subtracted out before the shadowgram is created, the sidelobes will not be integrated into the resulting image.

Time History Filtering

Refer to FIG. 25

Filtering the echo samples stored in the time history memories, before backprojection, can have beneficial effects on the reconstructed image.

In general the filters can reduce image clutter artifact, reduce peak sidelobe levels, reduce average sidelobe levels and increase resolution (sharpen the point spread function).

FIG. 25 shows as an example a four stage nonrecursive filter. Recursive filters may also be implemented. FIG. 25-357,358 represent the input signals from the receiver elements. These signals are processed through preamps (359) and time of flight gain compensation amplifiers (360) which are controlled by a signal (361) which increases the gain as a function of time to balance out time varying attenuation. The low pass filter (362) restricts the noise bandwidth and prevents aliasing. The analog to digital converter (364) digitizes the signal in synchronism with the sample clock (363). Four latch stages (365,366,367,368) of the digital filter hold successive echo samples. Each of the samples is multiplied by a weight, w1, w2, w3, w4. The weighted samples are then summed (369) together to form the filtered sample (370).

The value of the weights, w1, w2, w3, w4 determine the type of filter applied and can be under machine control and also varied dynamically, for example, as a function of reconstruction point position, as a function of round trip time of flight or they may may also be adjusted manually by the operator.

Examples of filters that can have beneficial effect are: a two stage backdifferencing filter, a three stage approximation to the sinc function, a matched filter for slightly oscillating transmit pulses, a time varying filter to compensate for transmission effects.

Echo Sample Integration/Blip Imaging

Refer to FIG. 26

If the echo is integrated during the sample interval, the effect is to thicken the backprojected ellipsoids by the integration duration. This allows blip images to be formed where the effective resolution is greater than the size of the imaged objects.

For example, if the integration interval corresponds to one mile, then the reconstructed image would consist of adjacent, somewhat distorted, one mile cubes. If there were no objects in a cube it would be clear. If a cube contained objects it would be grey. The level of greyness would correspond to the total number of enclosed objects and their reflectivity. That particular cube could then be reconstructed at a higher resolution to create an image of the objects contained within.

FIG. 26-371,372 are echo signals from the receiver elements which are processed by the preamps (373), TGC amps (375) and low pass filter (376). The integrator (377), which may consist of an op amp with capacitor feedback, is gated, for example by a FET across the capacitor, by an integration width signal (378). The trailing edge of the integration width signal clocks the analog to digital converter (379). The result is the integrated echo sample (380) which now represents an ellipsoidal projection through the object space where the width of the ellipsoid is controlled by the integration width signal.

Different Transmit and Echo Velocities

Refer to FIGS. 27 and 29

The transmitted pulse of energy may be a short burst of ionizing particles (382,384). In this case the echoes from an object (383) will consist of gamma rays (387) rather than reflected particles. The gamma rays will travel with a different velocity (386) as compared to the transmitted particles (385). The gamma rays are received as echoes by an array of detectors (381).

This is easily taken into account by the reconstruction processor when selecting echo samples to combine from the time history memories.

The reconstruction processor will scale (390) the distances from the receiver elements to the reconstruction point (388) with the echo propagation velocity (392). It will scale (391) the distances from the transmitter elements to the reconstruction point (389) with the transmit pulse propagation velocity (393). It may do this with multipliers (390,391). The resulting scaled signals (394,395,396,397) are paired off (as previously described) and summed (398) to form the addresses to the time history memories (399).

The resulting backprojected ellipsoids are distorted, shaped like eggs, but still as effectively reconstruct an image.

Recon Address Generation for Multiple Transmitters

Refer to FIG. 28

FIG. 28-388 are the reconstruction point coordinates whereas the following ROMs and latches are used to find the distances, RPTj, from the reconstruction point to the different transmitters. These distances are combined with the distances from the reconstruction point to the receiver elements RPEj. When that total round trip distance is divided by the velocity of propagation and then divided by the echo sample interval, the time history memory addresses are formed for the proper selection of echo samples to be combined to create a reconstructed image point.

The first set of ROMs (389,390,395) find the distances as projected in the XY plane. The second set of ROMs (393,394) take that intermediate distance along with the Z coordinate and find the final distance RPTj (391,392).

Arbitrary Three Dimensional Array

Figure 30:
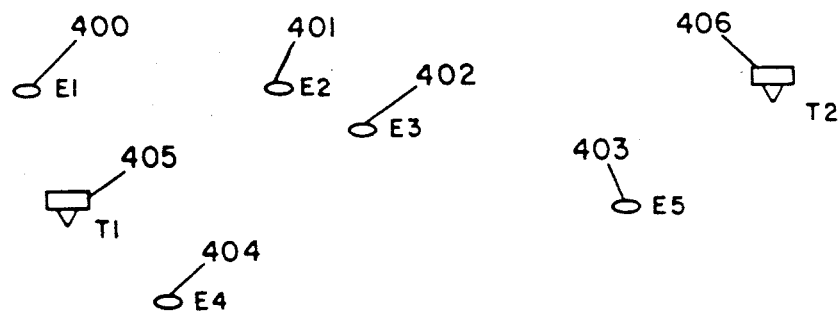
FIG. 30 shows an arbitrary three dimensional array.

Refer to FIG. 30

A three dimensional array may be used which is composed of a number of transmitters and receivers arranged in arbitrary positions in three dimensional space. Each transmitter/receiver pair will contribute a family of ellipsoidal projections through the imaged three dimensional volume. These projections are backprojected to reconstruct the image.

In FIG. 30 an arbitrary three dimensional array is shown where 400,401,402,403 and 404 are receiver elements and 405 and 406 are transmitter elements.

Wideband Random Pulse (and other transmit pulse types)

Figure 31:
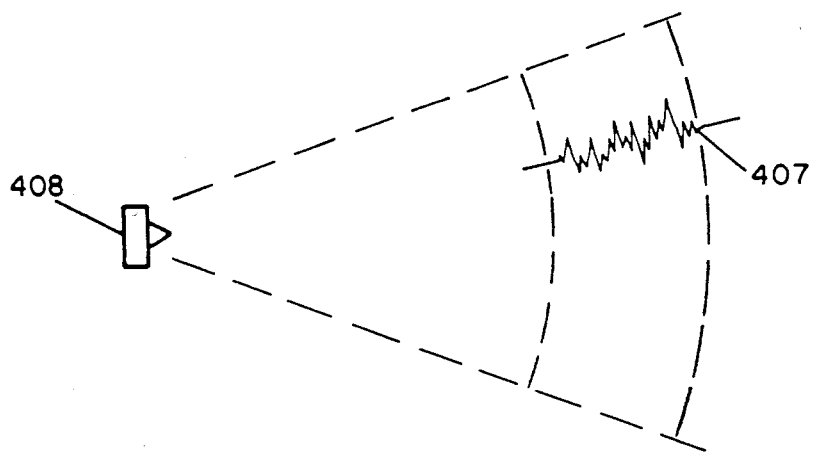
FIG. 31 shows the transmission of a wideband random pulse.

Refer to FIG. 31

A wideband random pulse may be generated by the transmitter for single pulse imaging purposes. The resulting echoes can be processed in the same manner as those resulting from a monopolar pulse transmission. This sort of pulse may be easier to generate in some applications although it has some disadvantages. Since it will typically contain periodic spectral components some interference phenomena will occur causing a degree of specular reflection. If the specular reflection phenomena is not too severe, adequate images will result. Also since there are components with alternating polarity some beamforming will occur upon transmission. However, depending on the nature of the pulse, the beam may be smeared, without sharp, strongly formed lobes, and also broad allowing adequately uniform illumination of a wide solid angle. A pulse possessing these qualities of weak beamforming and weak specular reflection will be considered non interfering or relatively non interfering for purposes of this application and will be considered capable of radiating or propagating uniformly through a wide solid angle. FIG. 31-407 shows a random wideband pulse launched from a transmitter (408).

Other types of pulses may also have the proper characteristics for use in Ellipsoidal Backprojection imaging systems. Specifically, these characteristics are: ability to propagate adequately uniformly through a wide solid angle (without peaks and nulls in intensity, in the illuminated field of objects, so great as to render inadequate images); short temporal duration as required for adequate resolution (although compression techniques may be used to synthesize this); and weak specular reflection formation (as with relatively non interfereing pulses).

One criterion that can be used to judge the degree of non interference is the autocorrelation function of the transmitted pulse waveform. Autocorrelation measures, as a function of shift, the integral of the product of a waveform and a shifted replica of the waveform.

A better critera would be a measure, as a function of shift, of the integral of the sum of a waveform and a time shifted replica of the waveform.

A relatively non interfering pulse would have a peak, for shift equal to zero, in both of these measures. The remaining portion of the measures, for non zero values of shift, would be low in value.

Transmitted pulses satisfying these criteria would generally meet the requirements for: uniform propagation through a wide solid angle; and weak specular reflection formation. These pulse types could be termed non interfering.

Nonlinear Processing

Figure 32:
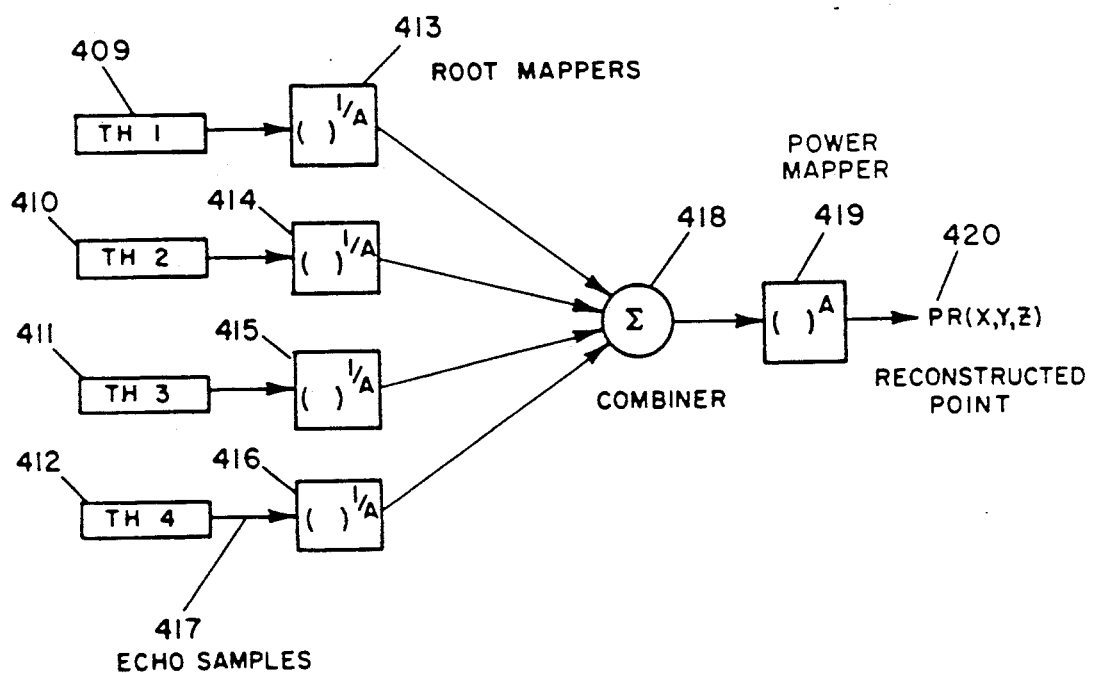
FIG. 32 shows nonlinear processing.

Refer to FIG. 32

The echo samples must be "combined" to reconstruct an image.

The term "combining" comprises both linear combination (typically addition or summation) and nonlinear combination (for example, multiplying the echo samples together).

Nonlinear processing may be implemented in the reconstruction process to increase the resolution and control the sidelobes. In a system using many diverse backprojected ellipsoids, a weak form of nonlinear processing may be implemented that does not cause the undesirable effects normally associated with nonlinear imaging techniques such as strong response in sidelobes for certain imaging conditions. Nonlinear processing may be especially appropriate when only a few sparsely spaced objects are to be imaged as in sonar applications.

One method of nonlinear processing could be termed root processing and is shown in FIG. 32. The echo samples (417) are selected from the time history memories (409,410,411,412) as previously described. As an example, four time history memories are shown. The echo samples are used as addresses to the root mapping ROMs (413,414,415,416). The ROM outputs are the Ath root of the echo samples. The processed samples are then summed, as previously described, in the echo combiner (418). The result is then used as an address to a power mapper ROM (419). The output of the ROM is the Ath power of the input and is also the reconstructed image point (420).

The strength of the nonlinear processing can be controlled by modifying the value of A.

Other forms of nonlinear processing would include multiplicative processing (where echo samples are combined by multiplication), log processing (where the logarithms of echo samples are taken before summation), and logical processing (where echo samples are converted to binary values by a comparator before addition or multiplication, or a combination of addition and multiplication, with the results of the combination then being converted back to a binary value). The echo samples could also be combined by correlation or cross correlation.

Oscillating Transmit Pulse

Refer to FIGS. 33, 34 and 35

An oscillating transmit pulse may be used. The oscillations will cause an amplitude modulation of the backprojected ellipsoids, however, if only the three dimensional volume spanned by the central area of the ellipsoids is of interest, the modulation will not create a problem.

When an oscillating pulse propagates through a wide solid angle, specular reflection problems may occur. However, if the wavelength is longer than the largest expected specular surfaces, then sufficient echo energy will propagate back toward the receiver array for adequate imaging.

FIG. 33-423 shows a transmit/receive array. Four receiver elements (421) surround a single transmitter (422) in this example. An oscillating transmitted pulse propagates outward through a wide solid angle (426). The three dimensional volume contained within the wide solid angle is illuminated relatively uniformly by the main lobe (424) of the beam pattern formed by the transmitted pulse.

FIG. 34 shows the backprojected ellipsoids that have been modulated by the beam pattern of the transmitted pulse. The transmitter (435) and the receivers (434,436) form the foci of the two backprojected ellipsoids. Portions (430,431) of the ellipsoids lie within the mainlobe area (427) of the transmitted pulse. The reconstruction point (445) is just within the mainlobe area (429). Points further off axis will not be reconstructed properly and will be within the transmit pulse sidelobe region (432,433).

FIG. 35 shows a relatively long wavelength (438) pulse (439) propagating away from a transmitter (441) surrounded by receiver elements (440). It propagates through a wide solid angle (437). A specular reflector (442) is in the path of the transmitted pulse, however, the energy reflected is only weakly focused (443) in a direction away from the receiver array. A reflected sidelobe (444) also is formed. The receiver will detect reflected energy from both the reflected mainlobe (443) and the reflected sidelobe (444) and adequate imaging is possible.

Software Based Image Reconstruction (a method of image reconstruction

Refer to the following Pascal listing:

The following code listing consists of a Turbo Pascal program, which runs on an XT clone, comprising four main blocks, each separated by a node. The blocks are functionally distinct.

The zeroth node marks the end of the configuration portion where the initial parameters are set.

The first node, the end of the first block, marks the end of the array and object field simulation and includes the definition of the array geometry and the simulated object field. This block of code provides a set of echo time histories (which are saved in disk files) to the next block. The echo samples are derived from a simulated transmitter/receiver array and a simulated field of objects made up of reflecting points. This portion can be eliminated if actual echo time histories, from a functional array, are available in a disk file.

The second node marks the end of the image reconstruction block of code (which uses the echo time histories generated by the first block) where a three dimensional image has been reconstructed from the echo time histories and saves in a disk file.

The third node marks the end of the block of code that operates on the reconstructed three dimensional image to produce tomographic views or shadowgraphs that can be displayed on printer output or the crt in numeric form. This portion could be modified to interface to a video memory board attached to a second crt, and thus provide a grey scale presentation of the reconstructed image.

The code following the third node is the pascal program proper. all the previous code comprises pascal procedures.

The computer program, taken with the information in this patent application, is self documenting for an experienced pascal programmer, and represents an alternate method of implementing the imaging machine. Real time images will be generally unobtainable in software based imaging machines.

```
      for XV := Ylbound to YuBound do
        for YV := ZlBound to ZuBound do
          PXS[XV,YV] := 0;
      for XV := Ylbound to YuBound do
        for YV := ZlBound to ZuBound do
          for XR := XlBound to XuBound do
            begin
              if PR[XR,XV,YV] < ShadowBack + 1
                then
                  PXS[XV,YV] := PXS[XV,YV] + 0
                else
                  PXS[XV,YV] := PXS[XV,YV] + round(PR[XR,XV,YV]);
{if (PR[XR,XV,YV] > 2)   then writeln('PXS =',PXS[XV,YV],' PR=',PR[XR,XV,YV]);}
            end;
      if (NormalizeShadows = true) then
        begin
        writeln('NORMALIZING XSHADOWGRAPH...');
        PXSMAX := 1;
        for XV := YlBound to YuBound do
          for YV := ZlBound to ZuBound do
            begin
              if PXS[XV,YV] > PXSMAX then
              PXSMAX := PXS[XV,YV];
            end;
        writeln('PXSMAX = ',PXSMAX);
        for XV := YlBound to YuBound do
          for YV := ZlBound to ZuBound do
            PXS[XV,YV] := round(PXS[XV,YV]/PXSMAX*99);
        end
  end;{procedure form_Xshadowgraph} procedure save_Xshadowgraph;

var
    xshadow         : text;
    XV              : integer;
    YV              : integer;
    ZV              : integer;

begin
  writeln('SAVING X SHADOWGRAPH IN FILE "XSHADOW.DAT"....');
  assign(xshadow,'xshadow.dat');
  rewrite(xshadow);
  writeln(xshadow,'       Y Y Y Y Y Y Y Y Y Y Y Y Y Y Y Y Y Y Y');
  writeln(xshadow,'       = = = = = = = = = = = = = = = = = = =');
  write(xshadow,'       ');
  for XV := YlBound to YuBound do
    write(xshadow,XV:3);
  writeln(xshadow);
  for YV := ZlBound to ZuBound do
    begin
      writeln(xshadow);
      write(xshadow,'X=',YV:3);
      for XV := YlBound to YuBound do
        write(xshadow,round(PXS[XV,YV]):3);
    end;
  close(xshadow);
  end; {procedure save_Xshadowgraph}
```

```pascal
procedure form_Zshadowgraph;
  var
    PZSMAX    : integer;
    XV        : integer;
    YV        : integer;
    ZV        : integer;
    ZR        : integer;
  begin { integrate in Z direction}
    writeln('FORMING Z SHADOWGRAPH....');
    for XV := Xlbound to XuBound do
      for YV := YlBound to YuBound do
        PZS[XV,YV] := 0;
    for XV := Xlbound to XuBound do
      for YV := YlBound to YuBound do
        begin
          for ZR := ZlBound to ZuBound do
            begin
              if PR[XV,YV,ZR] < ShadowBack + 1
                then
                  PZS[XV,YV] := PZS[XV,YV] + 0
                else
                  PZS[XV,YV] := PZS[XV,YV] + round(PR[XV,YV,ZR]);
            end;
          {writeln('PZS=',PZS[XV,YV],' XV=',XV,' YV=',YV);}
        end;
    if (NormalizeShadows = true) then
      begin
      writeln('NORMALIZING ZSHADOWGRAPH..');
      PZSMAX := 1;
       for XV := XlBound to XuBound do
          for YV := YlBound to YuBound do
            if PZS[XV,YV] > PZSMAX then
            PZSMAX := PZS[XV,YV];
        writeln('PZSMAX = ',PZSMAX);
        for XV := XlBound to XuBound do
          for YV := YlBound to YuBound do
            begin
            {write('PZS before= ',PZS[XV,YV]);}
            PZS[XV,YV] := round(PZS[XV,YV]/PZSMAX*99);
            {write(' PZS after= ',PZS[XV,YV]);}
            {writeln(' PZSMAX= ',PZSMAX);}
            end;
      end
  end;{procedure form_Zshadowgraph} procedure save_Zshadowgraph;

var
    zshadow    : text;
    XV         : integer;
    YV         : integer;
    ZV         : integer;

begin
  writeln('SAVING Z SHADOWGRAPH IN FILE "ZSHADOW.DAT"....');
  assign(zshadow,'zshadow.dat');
  rewrite(zshadow);
```

```
writeln(zshadow,'      Y Y Y Y Y Y Y Y Y Y Y Y Y Y Y Y Y Y Y');
writeln(zshadow,'      = = = = = = = = = = = = = = = = = = =');
write(zshadow,'    ');
for XV := XlBound to XuBound do
  write(zshadow,XV:3);
writeln(zshadow);
for YV := YlBound to YuBound do
  begin
    writeln(zshadow);
    write(zshadow,'X=',YV:3);
    for XV := XlBound to XuBound do
      write(zshadow,round(PZS[XV,YV]):3);
  end;
``` change_default_drive: a disk drive utility.

uses_dos_for_screen: can write to screen using dos or may write directly.

default_configuration: automatically runs.

configure_simulation: The main block zero procedure. sets up type of image reconstruction; linear, nonlinear, sets up nonlinear reconstruction parameters. Sets voxel truncation level, if active. Sets up the filter coefficients for the convolution filter (hilb filter) applied to the echo time histories before image reconstruction. Sets the diameter of four rings of transmitter elements, concentric and inside of the ring of receiver elements. Sets the number of transmitter elements in each ring. Sets the number of receiver elements in the receiver ring. Sets the diameter of the receiver ring. Defines the simulated object to be imaged, point by point. An airplane shaped test object is included in the code. Sets the image reconstruction parameters. Sets the x location of the yz tomogram. Sets the z location of the yx tomogram. Sets the pixel normalization value. Defined the bounds of the three dimensional volume to be reconstructed. Computes the coordinates of the array elements.

ZEROTH NODE: (end of block zero) An actual scan head can be attached to the computer (along with interface electronics) or echo time histories, obtained by another, remote, system can be loaded onto the computers hard disk under the appropriate file names. The code in block zero can be modified so that no time histories are generated. The scan head, or array, geometry must match that of the actual array used to obtain the data. In the case of an attached scan head, the interface electronics would comprise circuits similar to fig.5 also having the time history memories of fig.6 but without the summation means. The interface electronics would also contain circuits similar to those in the reference by Platte for driving the transmitter elements. Standard RS 232 electronics along with commonly designed interface circuitry could be used to control the transmitter electronics and access the echo samples from the echo time history memories.

do_time_history: The main block one procedure. Computes echo time histories, and stores them in disk files, given the previously defined configuration.

generate_time_histories: Form the sequences of echo samples for each receiver element, for each transmitter element.

back_difference: Backward differences, if selected, the echo time histories.

fore_difference: Foreword differences, if selected, the echo time histories.

sinc_filter: Convolves a sinc type filter, if selected, with the echo time histories.

hilb_filter: Convolves a special filter, described in a different patent application, if selected, with the time histories.

save_time_histories: Stores the time histories in disk files.

record_time_histories: Puts the time histories in ascii text files for user observation.

compress_TH: Used with nonlinear reconstruction, takes the fractional root of the echo samples.

FIRST NODE: (end of block one) The block one code can be eliminated if actual echo time histories are available as described under block zero.

make_3D_image: The main block two procedure. Uses the echo time histories to reconstruct a three dimensional image and saves it in a disk file.

initialize_voxels: Sets all voxels to zero.

load_time_history: Reads in the echo time history data from disk files.

decompress_PR: Decompresses the reconstructed voxels if nonlinear processing is used.

recon_image: Linearly combines the echo samples to reconstruct the image.

nl_mul_TH_recon_image: Non linearly combines the echo samples to reconstruct the image.

nl_xmitr_recon_image: Non linearly combines the reconstructed images from each transmitter time histories.

normalize_voxels: Normalizes the reconstructed voxels to a selected value.
truncate_voxels: Truncates, if selected, all voxels below a selected value.

log_voxels: Log compresses, if selected, the reconstructed image voxels.

save_3D_image: Writes the reconstructed image to a disk file.

SECOND NODE: (end of block two) Block two code can be augmented by specially designed hardware processor boards which can perform the more computationally intensive algorithms, such as computing the total round trip distance. The code would then be modified to read and write into these boards and the specific algorithm eliminated.

form_2D_view: The main procedure for the third block of code. Forms two dimensional views (shadowgraphs and tomograms) through the 3D image.

load_3D_image: Reads the reconstructed 3D image in from a disk file.

form_YZ_tomogram: Forms a slice through the 3D image in the yz plane.

save_YZ_tomogram: Saves the slice in a disk file.

form_YX_tomogram: Forms a slice through the 3D image in the yx plane.

save_YX_tomogram: Saves the slice in a disk file.

form_Xshadowgraph: Forms a view through (by integration) the 3D image in the x direction.

save_Xshadowgraph: Saves the view in a disk file.

form_Zshadowgraph: Forms a view through (by integration) the 3D image in the z direction.

save_Zshadowgraph: Saves the view in a disk file.

THIRD NODE: End of block three code.

While the above descriptions contains many specifics, these
tomographic views or shadowgraphs that can be displayed on printer output
or the crt in numeric form. This portion could be modified to interface to
a video memory board attached to a second crt, and thus provide a grey
scale presentation of the reconstructed image.
 The code following the third node is the pascal program proper. All the
previous code comprises pascal procedures.
 The computer program, taken with the information in this patent
application, is self documenting for an experienced pascal programmer, and
represents an alternate method of implementing the imaging machine. Real
time images will be generally unobtainable in software based imaging
machines.

```
            SOFTWARE IMPLEMENTATION OF IMAGING MACHINE:
{$R-}    {Range checking ?}
{$B-}    {Boolean complete evaluation on}
{$S-}    {Stack checking ?}
{$I-}    {I/O checking ?}
{$N+}    {numeric coprocessor}
{$M 65520,0,655360}{stack and heap}{old:65500,65500,655360}
program sim;
{***************************************************************}
{*************************************************************** }
{* *          IMPULSE IMAGING PROGRAM                      * * }
{*************************************************************** }
{*************************************************************** }

Uses
  Dos,
  Crt;
{Turbo3;} const
```

```
{.................SWITCHES.................}
  TH_TextFile             = false; {generate time history text file}
  ShowTimeHistory         = false; {put time histories on the screen}
  NormalizeShadows        = true;  {maps  0..max  to  0..99  !!!}
  NormalizeTomos          = true;  {maps  0..max  to  0..99  !!!}
  LogVoxels               = false; {log remap voxels}
  NormalizeVoxels         = false; {sets maximum voxel value to 99}
  NormalizeVoxels_80db    = false; {sets maximum voxel value to 10,000 -1}
  Trunc_Voxel_Background  = false; {truncate recon. voxels in background}
  TruncNegTomoPixels      = false; {set neg tomo pixels to zero}
  ShadowBack              = 0;{set to 0 for no shadowbackground reduction}
  Vdisk                   = false; {ramdrive D: for intermediate storage}
  Back_Diff               = false; {back difference time histories}
  Fore_Back_Diff          = false; {forward & backward difference}
  Sinc_Filter_Diff        = false; {sinc filter time histories}
  Hilb_Filter_Diff        = true;  {hilbert filter time histories}
  Log_Sum_PRs             = false; {log sums prs from separate xmittrs}
  NonLinear_Proc_TH       = false; {NL comb. of THs for each xmittr}
  NonLinear_Proc_Xmtrs    = false; {NL comb. of PRs from diff.xmittrs}
  NL_Mul_TH_Proc          = false; {Mul comb. of THs from each xmittr}
  Save_3D_Pix_Text        = false; {save 3D recon in text file}
  Reassign_Echo_Ampl      = true;  {redo all point amplitudes}
  DoDefault               = true;  {do default config automatically.. *.bat}
  UseDos                  = false; {uses dos for screen output..DV}
{.................CONSTANTS.................}
  PI                      = 3.1415926;
  Speed                   = 1.5; {millimeter/microsec}

{.................MAXIMUM VALUES.................}
  MaxNumRcvrEle           = 32;
  MaxNumXmtrEle           = 16;
  MaxNumSamples           = 260;
  MaxX                    = 10;
  MinX                    =-10; {-10}
  MaxY                    = 10; {10}
  MinY                    =-10; {-10}
  MaxZ                    = 75; {75}
  MinZ                    = 65; {65}
  MaxNumPoints            = 35;
  MaxNumXmtrRings         = 4;

type
{.................GLOBAL VARIABLE TYPES.................}
  RcvrRadtype             = 1..200;
  XmtrRadtype             = 0..199;
  NumRcvrEletype          = 2..MaxNumRcvrEle;
  NumXmtrEletype          = 1..MaxNumXmtrEle;
  SampleNumtype           = 1..MaxNumSamples;
  SampleInttype           = single;
  NumSamplestype          = 1..MaxNumSamples;
  ReconRestype            = single;
  PulseWidthtype          = single;
  NumPointstype           = 1..MaxNumPoints;
  XlBoundtype             = MinX..MaxX;
  XuBoundtype             = MinX..MaxX;
  YlBoundtype             = MinY..MaxY;
  YuBoundtype             = MinY..MaxY;
  ZlBoundtype             = MinZ..MaxZ;
```

```
    ZuBoundtype                = MinZ..MaxZ;
    X_tomotype                 = MinX..MaxX;
    Z_tomotype                 = MinZ..MaxZ;
    NumSqrtype                 = 1..100;
    NumSqrRttype               = 1..100;
    pixelrangetype             = 10..99;
    VoxelTruncLeveltype        = 1..100;
    FilterCoeffType            = single;

var
{....................GLOBAL VARIABLES................................}
    RcvrRad                    : RcvrRadtype;
    XmtrRad                    : XmtrRadtype;
    NumRcvrEle                 : NumRcvrEletype;
    XE                         : array[1..MaxNumRcvrEle] of single;
    YE                         : array[1..MaxNumRcvrEle] of single;
    NumXmtrEle                 : NumXmtrEletype;
    XT                         : array[1..MaxNumXmtrEle] of single;
    YT                         : array[1..MaxNumXmtrEle] of single;
    ZT                         : array[1..MaxNumXmtrEle] of single;
    SampleNum                  : SampleNumtype;
    SampleInt                  : SampleInttype;
    NumSamples                 : NumSamplestype;
    ReconRes                   : ReconRestype;
    PulseWidth                 : PulseWidthtype;
    NumPoints                  : NumPointstype;
    XP                         : array[1..MaxNumPoints] of single;
    YP                         : array[1..MaxNumPoints] of single;
    ZP                         : array[1..MaxNumPoints] of single;
    EchoAmpl                   : array[1..MaxNumPoints] of single;
    XlBound                    : XlBoundtype;
    XuBound                    : XuBoundtype;
    YlBound                    : YlBoundtype;
    YuBound                    : YuBoundtype;
    ZlBound                    : ZlBoundtype;
    ZuBound                    : ZuBoundtype;
    X_tomo                     : X_tomotype;
    Z_tomo                     : Z_tomotype;
    NumSqr                     : NumSqrtype;
    NumSqrRt                   : NumSqrRttype;
    pixelrange                 : pixelrangetype;
    VoxelTruncLevel            : VoxelTruncLeveltype;
    FC1                        : FilterCoeffType;
    FC2                        : FilterCoeffType;
    FC3                        : FilterCoeffType;
    FC4                        : FilterCoeffType;
    FC5                        : FilterCoeffType;

{................END OF GLOBAL / PROGRAM DECLARATIONS....................} procedure change_default_drive ;
  begin
    writeln('******* - ALL OUTPUT WILL GO TO VDISK D:  !!!!!!!!!!!!!!!!! ');
    exec('\command.com','/c d:');
    if DosError <> 0 then
      writeln('Dos error #',DosError)
    else
      writeln('Exec OK.. child process exit code =', DosExitCode);
  end; {procedure change_default_drive}
```

```
procedure use_dos_for_screen;
  begin
    assign(input,'');
    reset(input);
    assign(output,'');
    rewrite(output);
  end; {procedure use_dos_for_screen} procedure default_configuration ;
  var
    rcvrconf              : text;
    xmtrcon1              : text;
    xmtrcon2              : text;
    xmtrcon3              : text;
    xmtrcon4              : text;

EleNum                : integer;

XmtrRingNum1Rad       : integer;
    XmtrRingNum2Rad       : integer;
    XmtrRingNum3Rad       : integer;
    XmtrRingNum4Rad       : integer;
    XmtrRingNum1Offs      : integer;
    XmtrRingNum2Offs      : integer;
    XmtrRingNum3Offs      : integer;
    XmtrRingNum4Offs      : integer;
    NumXmtrEleRingNum1    : integer;
    NumXmtrEleRingNum2    : integer;
    NumXmtrEleRingNum3    : integer;
    NumXmtrEleRingNum4    : integer;

PN                    : integer;
    Universal_Ampl        : integer;

begin
  writeln('DOING DEFAULT CONFIGURATION....');

{............THE FUNDAMENTAL PARAMETERS................................}

{NONLINEAR COMPRESSION if active}
  NumSqr                := 1;{1}
  NumSqrRt              := 2;{2}

{VOXEL TRUNCATION LEVEL if active}
  VoxelTruncLevel       := 1;

{FILTER COEFFICIENTS}
  FC1 := 0; FC2 := -0.5; FC3 := 1; FC4 := -0.5; FC5 := 0;
        {THE ARRAY}
  XmtrRingNum1Rad       := 0; {25}
  XmtrRingNum1Offs      := 0;
  XmtrRingNum2Rad       := 20;
  XmtrRingNum2Offs      := 0;
  XmtrRingNum3Rad       := 30;
  XmtrRingNum3Offs      := 0;
  XmtrRingNum4Rad       := 40;
  XmtrRingNum4Offs      := 0;
```

```
NumXmtrEleRingNum1     := 1;   {r3=0}{r2=0}{r1=1} {16}
NumXmtrEleRingNum2     := 4;   {r3=0}{r2=0}{r1=3}
NumXmtrEleRingNum3     := 5;   {r3=0}{r2=16} {r1=4}
NumXmtrEleRingNum4     := 6;   {r3=16} {r2=0}{r1=4}

NumRcvrEle             := 32;  {32}
RcvrRad                := 50;
        {THE OBJECT FIELD}
    NumPoints    := 1;   {31}

XP[1]        := 0;        {0}    {start body}
    YP[1]        := 0;        {5}
    ZP[1]        := 71;       {71}
    EchoAmpl[1]  := 5;        {5}

XP[2]        := 0;
    YP[2]        := 4;
    ZP[2]        := 71;
    EchoAmpl[2]  := 5;

XP[3]        := 0;
    YP[3]        := 3;
    ZP[3]        := 71;
    EchoAmpl[3]  := 5;

XP[4]        := 0;
    YP[4]        := 2;
    ZP[4]        := 71;
    EchoAmpl[4]  := 5;

XP[5]        := 0;
    YP[5]        := 1;
    ZP[5]        := 71;
    EchoAmpl[5]  := 5;

XP[6]        := 0;
    YP[6]        := 5;
    ZP[6]        := 71;
    EchoAmpl[6]  := 5;

XP[7]        := 0;
    YP[7]        := -1;
    ZP[7]        := 71;
    EchoAmpl[7]  := 5;

XP[8]        := 0;
    YP[8]        := -2;
    ZP[8]        := 71;
    EchoAmpl[8]  := 5;

XP[9]        := 0;
    YP[9]        := -3;
    ZP[9]        := 71;
    EchoAmpl[9]  := 5;

XP[10]       := 0;
```

```
YP[10]          := -4;
ZP[10]          := 71;
EchoAmpl[10]    := 5;

XP[11]          := 0;                      {end body}
YP[11]          := -5;
ZP[11]          := 71;
EchoAmpl[11]    := 5;

XP[12]          := 4;                      {start wing}
YP[12]          := 1;
ZP[12]          := 71;
EchoAmpl[12]    := 5;

XP[13]          := 3;
YP[13]          := 1;
ZP[13]          := 71;
EchoAmpl[13]    := 5;

XP[14]          := 2;
YP[14]          := 1;
ZP[14]          := 71;
EchoAmpl[14]    := 5;

XP[15]          := 1;
YP[15]          := 1;
ZP[15]          := 71;
EchoAmpl[15]    := 5;

XP[16]          := -1;
YP[16]          := 1;
ZP[16]          := 71;
EchoAmpl[16]    := 5;

XP[17]          := -2;
YP[17]          := 1;
ZP[17]          := 71;
EchoAmpl[17]    := 5;

XP[18]          := -3;
YP[18]          := 1;
ZP[18]          := 71;
EchoAmpl[18]    := 5;

XP[19]          := -4;                     {end wing}
YP[19]          := 1;
ZP[19]          := 71;
EchoAmpl[19]    := 5;

XP[20]          := 3;                      {start tail}
YP[20]          := -5;
ZP[20]          := 71;
EchoAmpl[20]    := 5;

XP[21]          := 2;
YP[21]          := -5;
ZP[21]          := 71;
EchoAmpl[21]    := 5;
```

```
XP[22]          := 1;
YP[22]          := -5;
ZP[22]          := 71;
EchoAmpl[22]    := 5;

XP[23]          := -1;
YP[23]          := -5;
ZP[23]          := 71;
EchoAmpl[23]    := 5;

XP[24]          := -2;                          {end tail}
YP[24]          := -5;
ZP[24]          := 71;
EchoAmpl[24]    := 5;

XP[25]          := 0;                           {start rudder}
YP[25]          := -5;
ZP[25]          := 70;
EchoAmpl[25]    := 5;
XP[26]          := 0;
YP[26]          := -5;
ZP[26]           := 69;
EchoAmpl[26]    := 5;

XP[27]          := 0;                           {end rudder}
YP[27]          := -5;
ZP[27]          := 68;
EchoAmpl[27]    := 5;

XP[28]          := -5;                          {start widen wing}
YP[28]          := 1;
ZP[28]          := 71;
EchoAmpl[28]    := 5;

XP[29]          := -6;
YP[29]          := 1;
ZP[29]          := 71;
EchoAmpl[29]    := 5;

XP[30]          := 5;
YP[30]          := 1;
ZP[30]          := 71;
EchoAmpl[30]    := 5;

XP[31]          := 6;                           {end widen wing}
YP[31]          := 1;
ZP[31]          := 71;
EchoAmpl[31]    := 5;
{
XP[31]          := ;
YP[31]          := ;
ZP[31]          := ;
EchoAmpl[31]    := ;
}
{
XP[32]          := 0;
YP[32]          := 1;
ZP[32]          := 71;
```

```
EchoAmpl[32]   := 5;
}{
XP[33]         := 0;
YP[33]         := 1;
ZP[33]         := 71;
EchoAmpl[33]   := 5;
}{
XP[34]         := 0;
YP[34]         := 1;
ZP[34]         := 71;
EchoAmpl[34]   := 5;
}

{*------------------ECHO AMPL REASSIGNMEMT--------------------*}
if Reassign_Echo_Ampl then
begin
  Universal_Ampl := 1;
  writeln('****REASSIGNING ALL POINT AMPLITUDES TO ',Universal_Ampl);
  for PN := 1 to NumPoints do
    EchoAmpl[PN] := Universal_Ampl;
end;

{*********************************}
{*****---POINT  REASSIGNMENT---*****}
{    XP[1]         := 8.660 ;         }
{    YP[1]         := 5 ;             }
{    ZP[1]         := ZP[1];          }
{    EchoAmpl[1]   := 1;              }
{*****---FOR OBJECT SCANNING---*****}
{**  ·OR OBJECT DECOMPOSITION    **}
{*********************************}

{RECON PARAMETERS}
  SampleInt    := 0.66666666;  {microsec}
  NumSamples   := 250;
  ReconRes     := 1;
  PulseWidth   := 1;

X_tomo       := 0;       { YZ tomogram location}
  Z_tomo       := 71;      { YX tomogram location} pixelrange   := 99;{max nomalization value}

XlBound      := - 10              {- 10};
  XuBound      :=   10              {  10};

YlBound      := -10               {- 10};
  YuBound      :=  10               {  10};

ZlBound      :=  65               { 65 };
  ZuBound      :=  75               { 75 };

{............COMPUTE THE TRANSMITTER ELEMENT COORDINATES................}
```

```pascal
NumXmtrEle := NumXmtrEleRingNum1 + NumXmtrEleRingNum2 +
              NumXmtrEleRingNum3 + NumXmtrEleRingNum4;
writeln('NumXmtrEle = ',NumXmtrEle,'   !!!!!!!!!!');

for EleNum := 1 to NumXmtrEleRingNum1 do {find transmitter element coordinates}
   begin
   XT[EleNum] :=XmtrRingNum1Rad*cos((2*PI/NumXmtrEleRingNum1)*EleNum +PI/2);
   YT[EleNum] :=XmtrRingNum1Rad*sin((2*PI/NumXmtrEleRingNum1)*EleNum +PI/2);
   ZT[EleNum] :=XmtrRingNum1Offs;
   end;

{************************************}
{*-TRANSMITTER COORD REASSIGNMENT-**}
{  writeln('');                        }
{  writeln('REASSIGNING XMITTR COORDS');}
{  writeln('');                        }
{                                      }
{  XT[1] := -22;                       }
{  YT[1] := -12;                       }
{  ZT[1] := 0;                         }
{                                      }
{  XT[2] :=                            }
{  YT[2] :=                            }
{  ZT[2] :=                            }
{                                      }
{  XT[3] :=                            }
{  YT[3] :=                            }
{  ZT[3] :=                            }
{************************************} for EleNum := 1 to NumXmtrEleRingNum1 do
   writeln('RING1.. TN',EleNum,' (',round(XT[EleNum]),','
           ,round(YT[EleNum]),',',round(ZT[EleNum]),')');
writeln('FORMING TRANSMITTER RING 1 CONFIGURATION TEXT FILE "xmtrcon1.dat"...');
assign(xmtrcon1,'xmtrcon1.dat');
rewrite(xmtrcon1);
for EleNum := 1 to NumXmtrEleRingNum1 do
   writeln(xmtrcon1,'TN',EleNum,' (',round(XT[EleNum]),','
           ,round(YT[EleNum]),',',round(ZT[EleNum]),')');
close(xmtrcon1);

If (NumXmtrEleRingNum2 > 0) then
begin
for EleNum    := (NumXmtrEleRingNum1 + 1) to
                 (NumXmtrEleRingNum1 + NumXmtrEleRingNum2) do
                   {find transmitter element coordinates}
   begin
   XT[EleNum]  :=  XmtrRingNum2Rad * cos((2*PI/NumXmtrEleRingNum2)*EleNum);
   YT[EleNum]  :=  XmtrRingNum2Rad * sin((2*PI/NumXmtrEleRingNum2)*EleNum);
   ZT[EleNum]  :=  XmtrRingNum2Offs;
   end;

for EleNum := (NumXmtrEleRingNum1 + 1) to (NumXmtrEleRingNum1 +
               NumXmtrEleRingNum2)   do
   writeln('RING2.. TN',EleNum,' (',round(XT[EleNum]),','
           ,round(YT[EleNum]),',',round(ZT[EleNum]),')');
```

```
writeln('FORMING TRANSMITTER RING 2 CONFIGURATION TEXT FILE "xmtrcon2.dat"...');
assign(xmtrcon2,'xmtrcon2.dat');
rewrite(xmtrcon2);
for EleNum := (NumXmtrEleRingNum1 + 1) to (NumXmtrEleRingNum1 +
              NumXmtrEleRingNum2) do
  writeln(xmtrcon2,'TN',EleNum,' (',round(XT[EleNum]),','
          ,round(YT[EleNum]),',',round(ZT[EleNum]),')');
close(xmtrcon2);
end;

If (NumXmtrEleRingNum3 > 0) then
begin
for EleNum    := (NumXmtrEleRingNum1 + NumXmtrEleRingNum2 + 1) to
                 (NumXmtrEleRingNum1 + NumXmtrEleRingNum2 +
                 NumXmtrEleRingnum3) do
  begin
  XT[EleNum] :=XmtrRingNum3Rad * cos((2*PI/NumXmtrEleRingNum3)*EleNum +PI/2);
  YT[EleNum] :=XmtrRingNum3Rad * sin((2*PI/NumXmtrEleRingNum3)*EleNum +PI/2);
  ZT[EleNum] :=XmtrRingNum3Offs;
  end;

for EleNum    := (NumXmtrEleRingNum1 + NumXmtrEleRingNum2 + 1) to
                 (NumXmtrEleRingNum1 + NumXmtrEleRingNum2 +
                 NumXmtrEleRingnum3) do
  writeln('RING3.. TN',EleNum,' (',round(XT[EleNum]),','
          ,round(YT[EleNum]),',',round(ZT[EleNum]),')');
writeln('FORMING TRANSMITTER RING 3 CONFIGURATION TEXT FILE "xmtrcon3.dat"...');
assign(xmtrcon3,'xmtrcon3.dat');
rewrite(xmtrcon3);
for EleNum    := (NumXmtrEleRingNum1 + NumXmtrEleRingNum2 + 1) to
                 (NumXmtrEleRingNum1 + NumXmtrEleRingNum2 +
                 NumXmtrEleRingnum3) do
  writeln(xmtrcon3,'TN',EleNum,' (',round(XT[EleNum]),','
          ,round(YT[EleNum]),')',round(ZT[EleNum]));
close(xmtrcon3);
end;

If (NumXmtrEleRingNum4 > 0 ) then
begin
for EleNum    := (NumXmtrEleRingNum1 + NumXmtrEleRingNum2 +
                 NumXmtrEleRingNum3 + 1) to
                 (NumXmtrEleRingNum1 + NumXmtrEleRingNum2 +
                 NumXmtrEleRingnum3 + NumXmtrEleRingnum4) do
  begin
  XT[EleNum]  := XmtrRingNum4Rad * cos((2*PI/NumXmtrEleRingNum4)*EleNum);
  YT[EleNum]  := XmtrRingNum4Rad * sin((2*PI/NumXmtrEleRingNum4)*EleNum);
  ZT[EleNum]  := XmtrRingNum4Offs;
  end;

for EleNum    := (NumXmtrEleRingNum1 + NumXmtrEleRingNum2 +
                 NumXmtrEleRingNum3 + 1) to
                 (NumXmtrEleRingNum1 + NumXmtrEleRingNum2 +
                 NumXmtrEleRingnum3 + NumXmtrEleRingnum4) do
  writeln('RING4.. TN',EleNum,' (',round(XT[EleNum]),','
          ,round(YT[EleNum]),',',round(ZT[EleNum]),')');
writeln('FORMING TRANSMITTER RING 4 CONFIGURATION TEXT FILE "xmtrcon4.dat"...');
assign(xmtrcon4,'xmtrcon4.dat');
rewrite(xmtrcon4);
```

```
  for EleNum    := (NumXmtrEleRingNum1 + NumXmtrEleRingNum2 +
                    NumXmtrEleRingNum3 + 1) to
                   (NumXmtrEleRingNum1 + NumXmtrEleRingNum2 +
                    NumXmtrEleRingnum3 + NumXmtrEleRingnum4) do
    writeln(xmtrcon4,'TN',EleNum,' (',round(XT[EleNum]),',','
            ,round(YT[EleNum]),',',round(ZT[EleNum]));
  close(xmtrcon4);
  end;

{..................COMPUTE THE RECEIVER ELEMENT COORDINATES...............}
- for EleNum    := 1 to NumRcvrEle do {find receiver element coordinates}
    begin
    XE[EleNum]   := RcvrRad * cos((2*PI/NumRcvrEle)*EleNum+PI/2);
    YE[EleNum]   := RcvrRad * sin((2*PI/NumRcvrEle)*EleNum+PI/2);
    end;
  writeln('COMPUTING RECEIVER ELEMENT COORDINATES....');
  for EleNum := 1 to NumRcvrEle do
    writeln('EN',EleNum,' (',round(XE[EleNum]),',',round(YE[EleNum]),')');
  writeln('FORMING RECEIVER CONFIGURATION TEXT FILE "rcvrconf.dat"...');
  assign(rcvrconf,'rcvrconf.dat');
  rewrite(rcvrconf);
  for EleNum := 1 to NumRcvrEle do
    writeln(rcvrconf,'EN',EleNum,' (',round(XE[EleNum]),',',round(YE[EleNum]),')');
  close(rcvrconf);

end; {default_configuration} procedure configure_simulation;
var
  ans, dummychar : char;
begin
  writeln(' Accept Default simulation Configuration?? y/n  ');
  if DoDefault = true then
    default_configuration;
  if DoDefault = false then
    begin
      repeat
        begin
          ans := ReadKey;   {read(kbd,ans)}
          if ans = 'y' then
            default_configuration
          else
            default_configuration; {reconfigure;}
        end;
        until (ans = 'y') or (ans = 'n');
      end;
  end; {configure_simulation}

{----------------------------------------------------------}
  {              LOCATION OF ZEROTH NODE                     }
  {                                                          }
  {              system has been configured                  }
  {----------------------------------------------------------}
```

```
procedure do_time_history;
  var
    TimeHistory    : array[1..MaxNumSamples,
                           1..MaxNumRcvrEle] of single;
    TN             : integer;

procedure generate_time_histories;
  var

EchoRecord    : array[1..MaxNumRcvrEle,
                          1..MaxNumPoints] of boolean;
    RTP           : single;
    RPE           : single;
    RR            : single;
    TOF           : single;
    EN            : integer;
    PN            : integer;
    RRint         : integer;
    begin
      if Nonlinear_Proc_TH then
        begin
          writeln(' ');
          writeln('!!! NONLINEAR PROCESSING OF TH COMBINATION IS ACTIVE');
          writeln('     -> COMPRESSION RATIO IS : ', NumSqr,' / ',NumSqrRt);
          writeln(' ');
        end;
      writeln(' ');
      writeln('GENERATING TIME HISTORY.... NUMBER OF SAMPLES = ',NumSamples);
      for EN := 1 to NumRcvrEle do   {initialize}
        for PN := 1 to NumPoints do
          for SampleNum := 1 to NumSamples do
          begin
          EchoRecord[EN,PN] := false;
          TimeHistory[SampleNum,EN] := 0;
          end;

for EN := 1 to NumRcvrEle do
      begin
      writeln('EN= ',EN,' ----------------------------------------');
      for PN := 1 to NumPoints do
        begin
        write('     PN= ',PN);
        for SampleNum := 1 to NumSamples do
          begin
          RTP            := sqrt(sqr(XP[PN]-XT[TN])+sqr(YP[PN]-YT[TN])
                              +sqr(ZP[PN]-ZT[TN]));
          RPE            := sqrt(sqr(XP[PN]-XE[EN])+sqr(YP[PN]-YE[EN])
                              +sqr(ZP[PN]));
          RR             := RPE + RTP;
          RRint          := round(RR);
          TOF            := SampleNum * SampleInt ;
          {if ( ( ABS((TOF * Speed) - RR) <= (0.499 * Sampleint * Speed) )
              or (TOF * Speed > RR) )
              and ( EchoRecord[EN,PN]=false )
            then}
          if ( (TOF * Speed) >= RRint )
              and (EchoRecord[EN,PN] = false) then
            begin
```

```
        TimeHistory[SampleNum,EN] := TimeHistory[SampleNum,EN]
                                        + EchoAmpl[PN];

EchoRecord[EN,PN] := true;
      writeln('  echo recorded');
    end
    else
    begin
      TimeHistory[Samplenum,EN] := TimeHistory[SampleNum,EN]
                                        + 0;

end;
If (ShowTimeHistory = true)
 then
      writeln('TIME HISTORY..',
              ' TN=',TN,' EN=',EN,' PN=',PN,
              ' ER=',EchoRecord[EN,PN],
              ' SN=',Samplenum,
                        ' TH=',round(TimeHistory[SampleNum,EN]),
                        ' RR=',round(RR), 'RTP=',round(RTP),' RPE=',round(RPE));
              end;{for SampleNum}
          end;{for PN}
        end;{for EN}
    end; {procedure generate_time_histories} procedure back_difference;
    var
-    EN                : integer;
    SampleNum          : integer;
    DifTimeHistory     : array[1..MaxNumSamples] of single;

begin
      writeln('BACK DIFFERENCING TIME HISTORY...');
      for EN := 1 to NumRcvrEle  do
        begin
        for SampleNum := 2 to NumSamples  do
          DifTimeHistory[SampleNum] := TimeHistory[SampleNum,EN]
                                        - TimeHistory[(SampleNum - 1),EN];
          for SampleNum := 2 to NumSamples do
            TimeHistory[SampleNum,EN] := DifTimeHistory[SampleNum];
        end;
    end; {procedure back_difference} procedure fore_difference;
    var
    EN                 : integer;
    SampleNum          : integer;
    DifTimeHistory     : array[1..MaxNumSamples,1..MaxNumRcvrEle] of single;

begin
      writeln('FORWARD DIFFERENCING TIME HISTORY...');
      for EN := 1 to NumRcvrEle  do
        for SampleNum := 1 to NumSamples - 1  do
          DifTimeHistory[SampleNum,EN] := TimeHistory[SampleNum,EN]
                                        - TimeHistory[(SampleNum + 1),EN];
      for EN := 1 to NumRcvrEle do
        for SampleNum := 1 to NumSamples - 1 do
          TimeHistory[SampleNum,EN] := DifTimeHistory[SampleNum,EN];
    end; {procedure fore_difference} procedure sinc_filter;
```

```pascal
  var
    EN              : integer;
    SampleNum       : integer;
    DifTimeHistory  : array[1..MaxNumSamples] of single;

begin
    writeln('SINC FILTERING TIME HISTORY...');
    for EN := 1 to NumRcvrEle  do
      begin
        for SampleNum := 2 to NumSamples - 1  do
          DifTimeHistory[SampleNum] := TimeHistory[SampleNum,EN]
                                    - 0.5 * TimeHistory[(SampleNum - 1),EN]
                                    - 0.5 * TimeHistory[(SampleNum + 1),EN];
        for SampleNum := 2 to NumSamples - 1  do
          TimeHistory[SampleNum,EN] := DifTimeHistory[SampleNum];
      end;
  end; {procedure sinc_filter} procedure hilb_filter;
  var
    EN              : integer;
    SampleNum       : integer;
    DifTimeHistory  : array[1..MaxNumSamples] of single;

begin
    writeln('HILB FILTERING TIME HISTORY...');
    for EN := 1 to NumRcvrEle  do
      begin
        for SampleNum := 3 to NumSamples - 2  do
          DifTimeHistory[SampleNum] :=
                                 FC1 * TimeHistory[(SampleNum - 1),EN]
                               + FC2 * TimeHistory[(SampleNum - 2),EN]
                               + FC3 * TimeHistory[SampleNum,EN]
                               + FC4 * TimeHistory[(SampleNum + 1),EN]
                               + FC5 * TimeHistory[(SampleNum + 2),EN]  ;
        for SampleNum := 3 to NumSamples - 2  do
          TimeHistory[SampleNum,EN] := DifTimeHistory[SampleNum];
      end;
  end; {procedure hilb_filter}
  procedure save_time_histories;
    type
      sample      = single;
    var
      EN          : integer;
      tim_hist    : file of sample;
      TNS         : string[2];
      timhistTN   : string[11];

begin
      writeln('SAVING BINARY TIME HISTORIES IN FILES tim_hist.',TN,'....');
      str(TN,TNS);{make hard disk file names}
      timhistTN := concat('tim_hist.',TNS);
      assign(tim_hist,timhistTN);{make individual files for each xmitter}
      rewrite(tim_hist);
      for EN := 1 to NumRcvrEle do
```

```
      for SampleNum := 1 to NumSamples do
        begin
          write(tim_hist,TimeHistory[SampleNum,EN]);
          {writeln('SAVED BINARY TIME HISTORY=',TimeHistory[SampleNum,EN]:2,
              ' SampleNum=',SampleNum:3,' EN=',EN,' TN=',TN);}
        end;
      close(tim_hist);
    end{procedure save_time_histories};

procedure record_time_histories;

var
    EN            : integer;
    echo_hist     : text;
    TNS           : string[2];
    echohistTN    : string[10];

begin {write time histories to text file if option selected} writeln('WRITING TIME HISTORY TO TEXT FILE echohist.',TN,'...... ');
    str(TN,TNS);{make hard disk file names}
    echohistTN := concat('echohist.',TNS);
    assign(echo_hist,echohistTN);
    rewrite(echo_hist);
    writeln(echo_hist,
      ' S   E E E E E E E E E E E E E E E E E E E E E E E E E E E E E E E E ');
    writeln(echo_hist,
      ' M   N N N N N N N N N N N N N N N N N N N N N N N N N N N N N N N N ');
    writeln(echo_hist,
      ' P   0 0 0 0 0 0 0 0 0 1 1 1 1 1 1 1 1 1 1 2 2 2 2 2 2 2 2 2 2 3 3 3 ');
    writeln(echo_hist,
      ' #   1 2 3 4 5 6 7 8 9 0 1 2 3 4 5 6 7 8 9 0 1 2 3 4 5 6 7 8 9 0 1 2 ');
    for SampleNum := 1 to NumSamples do
      begin
        write(echo_hist,SampleNum:3);
        for EN := 1 to NumRcvrEle do
          begin
            write(echo_hist, round(TimeHistory[SampleNum,EN]):2);
          end;{for EN}
        writeln(echo_hist);
      end;{for SampleNum}
    close(echo_hist);
  end {procedure record_time_histories};

procedure compress_TH;

type
    SqrCountertype         = 1..100;
    SqrRtCountertype       = 1..100;

var
    IntermediateValue     : single;
    SqrCounter            : SqrCountertype;
    SqrRtCounter          : SqrRtCountertype;
    EN                    : integer;
```

```
begin
  writeln('COMPRESSING TIME HISTORIES');
  for SampleNum := 1 to NumSamples do
    begin
      for EN := 1 to NumRcvrEle do
        begin
          IntermediateValue := TimeHistory[SampleNum,EN];
          for SqrCounter := (1 + 1) to NumSqr do
            IntermediateValue :=
              TimeHistory[SampleNum,EN] * IntermediateValue;
          for SqrRtCounter := (1 + 1) to NumSqrRt do
            IntermediateValue := sqrt(IntermediateValue);
          TimeHistory[SampleNum,EN] := round(IntermediateValue);
                    MinZ..MaxZ] of single;
    PRMAX          : single;

echo_hist      : text;
    EN             : integer;
    TN             : integer;

procedure initialize_voxels ;
  var
    XR             : integer;
    YR             : integer;
    ZR             : integer;

begin {initialize}
      for XR := XlBound to XuBound do
        for YR := YlBound to YuBound do
          for ZR := ZlBound to ZuBound do
            PR[XR,YR,ZR] := 0;
      PRMAX := 0;
  end; {procedure initialize_voxels} procedure load_time_history;
  type
    sample       = single;
  var
    EN             : integer;
    tim_hist       : file of sample;
    TNS            : string[2];
    timhistTN      : string[11];

begin
  writeln('LOADING TIME HISTORY FOR TRANSMITTER NUMBER ',TN,'...');
  for EN := 1 to NumRcvrEle do                {initialize time history arrays}
    for SampleNum := 1 to NumSamples do
      TimeHistory[SampleNum,EN] := 0;
  str(TN,TNS);                                {derive hard disk file name}
  timhistTN := concat('tim_hist.',TNS);              {tim_hist.TN}
  assign(tim_hist,timhistTN);                 {equate with file variable}
  reset(tim_hist);                                   {open the file}
  for EN := 1 to NumRcvrEle do                {read disk data into time}
    for SampleNum := 1 to NumSamples do              {history array}
      read(tim_hist,TimeHistory[SampleNum,EN]);
  close(tim_hist);
```

```
end;{procedure load_time_history} procedure decompress_PR;

type
    SqrCountertype        = 1..100;
    SqrRtCountertype      = 1..100;

var
    IntermediateValue     : single;
    SqrCounter            : SqrCountertype;
    SqrRtCounter          : SqrRtCountertype;
    XR                    : integer;
    YR                    : integer;
    ZR                    : integer;

begin
    writeln('DECOMPRESSING RECONSTRUCTED VOXELS, "PR" ');
    for XR := Xlbound to Xubound do
      begin
        for YR := Ylbound to Yubound do
          begin
            for ZR := Zlbound to Zubound do
              begin
              IntermediateValue := PR[XR,YR,ZR];
              for SqrCounter := (1 + 1) to NumSqrRT do
                begin
                {writeln('sqr ');}
                IntermediateValue :=
                  PR[XR,YR,ZR] * IntermediateValue;
                end;
              for SqrRtCounter := (1 + 1) to NumSqr do
                begin
                {writeln('sqrt ');}
                IntermediateValue := sqrt(IntermediateValue);
                end;
              PR[XR,YR,ZR] := round(IntermediateValue);
              end;{for ZR}
          end;{for YR}
      end;{for XR}
  end {procedure decompress_PR};
  procedure recon_image ;

var

PRt         : real;

XR          : integer;
      YR          : integer;
      ZR          : integer;

EN          : integer;

RTP         : single;
      RPE         : single;
      RR          : single;
```

```
    SampleLoc    : integer;

begin
writeln('DOING standard IMAGE RECONSTRUCTION FOR TRANSMITTER ',TN);
if (Log_Sum_PRs) then writeln('         !!!!!!Log_Sum_PRs IS ON!!!!!');
writeln('XBOUND = ',XlBound:3,' to ',XuBound:3,
     '   YBOUND = ',YlBound:3,' to ',YuBound:3,
     '   ZBOUND = ',ZlBound:3,' to ',ZuBound:3);
  for XR := XlBound to XuBound do
    begin
    write('.');
    for YR := YlBound to YuBound do
      for  ZR := ZlBound to ZuBound do
        begin
        PRt := 0;
        for  EN := 1 to NumRcvrEle do
          begin
          RTP      := sqrt(sqr(XR-XT[TN])+sqr(YR-YT[TN])+sqr(ZR-ZT[TN]));
          RPE      := sqrt(sqr(XR-XE[EN])+sqr(YR-YE[EN])+sqr(ZR));
          RR       := RPE + RTP;
          SampleLoc:= round(RR / (SampleInt * speed));
          PRt      := PRt + TimeHistory[ SampleLoc,EN];
          end; { for EN}
        if (Log_Sum_PRs) then
          begin
          if (PRt <= 0.0001) then PRt := 0.0001;
          PR[XR,YR,ZR] := PR[XR,YR,ZR] + 20 * ln(PRt) / ln(10);
            end
          else
            begin
            PR[XR,YR,ZR] := PR[XR,YR,ZR] + PRt;
            end;
        end;{for ZR}
    end;{for XR}
  writeln('IMAGE RECONSTRUCTION DONE ********');
  end; { procedure recon_image} procedure nl_mul_TH_recon_image ;

var

XR              : integer;
    YR              : integer;
    ZR              : integer;

EN              : integer;

RTP             : single;
    RPE             : single;
    RR              : single;

SampleLoc       : integer;

PSF             : single;
```

```
begin
writeln('DOING nl_mul_TH IMAGE RECONSTRUCTION FOR TRANSMITTER ',TN);
writeln('XBOUND = ',XlBound:3,' to ',XuBound:3,
    ' YBOUND = ',YlBound:3,' to ',YuBound:3,
    ' ZBOUND = ',ZlBound:3,' to ',ZuBound:3);

for XR := XlBound to XuBound do
  begin
    write('.');
    for YR := YlBound to YuBound do
    begin
      for  ZR := ZlBound to ZuBound do
      begin
        PSF := 1; {must be init. to 1 for mult. proc.}
          for  EN := 1 to NumRcvrEle do
          begin
            RTP       := sqrt(sqr(XR-XT[TN])+sqr(YR-YT[TN])+sqr(ZR-ZT[TN]));
            RPE       := sqrt(sqr(XR-XE[EN])+sqr(YR-YE[EN])+sqr(ZR));
            RR        := RPE + RTP;
            SampleLoc := round(RR / (SampleInt * speed));
            PSF       := PSF * TimeHistory[SampleLoc,EN];
          end;{for EN}
          PR[XR,YR,ZR]  := PR[XR,YR,ZR] + PSF;
      end;{for ZR}
    end;{for YR}
  end;{for XR} writeln('NL_MUL_TH_IMAGE RECONSTRUCTION DONE FOR TN= ',TN,' *********');
  end; { procedure nl_mul_TH_recon_image} procedure nl_xmtr_recon_image ;

type
    SqrCountertype          = 1..100;
    SqrRtCountertype        = 1..100;

var
    IntermediateValue .     : single;
    SqrCounter              : SqrCountertype;
    SqrRtCounter            : SqrRtCountertype;

XR              : integer;
    YR              : integer;
    ZR              : integer;

EN              : integer;

RTP             : single;
    RPE             : single;
    RR              : single;

SampleLoc       : integer;

begin
  writeln('DOING nl_xmittr IMAGE RECONSTRUCTION FOR TRANSMITTER ',TN);
  writeln('XBOUND = ',XlBound:3,' to ',XuBound:3,
```

```
            '   YBOUND = ',YlBound:3,' to ',YuBound:3,
            '   ZBOUND = ',ZlBound:3,' to ',ZuBound:3);
      for XR := XlBound to XuBound do
        begin
        write('.');
        for YR := YlBound to YuBound do
          begin
          for  ZR := ZlBound to ZuBound do
            begin
            IntermediateValue := 0;
            for  EN := 1 to NumRcvrEle do
              begin
              RTP  := sqrt(sqr(XR-XT[TN])+sqr(YR-YT[TN])+sqr(ZR-ZT[TN]));
              RPE  := sqrt(sqr(XR-XE[EN])+sqr(YR-YE[EN])+sqr(ZR));
              RR   := RPE + RTP;
              SampleLoc    := round(RR / (SampleInt * speed));
              IntermediateValue :=
                          IntermediateValue +  TimeHistory[ SampleLoc,EN];
              end;{for EN}
            {write(' ',round(IntermediateValue):3);}
            for SqrCounter := (1 + 1) to NumSqr do
              begin
              {writeln('sqr ');}
              IntermediateValue :=
                 IntermediateValue * IntermediateValue;
              end;
            for SqrRtCounter := (1 + 1) to NumSqrRt do
              begin
              {writeln('sqrt ');}
              IntermediateValue := sqrt(IntermediateValue);
              end;
            PR[XR,YR,ZR] := PR[XR,YR,ZR] + round(IntermediateValue);
            end;{for ZR}
          end;{for YR}
        end;{for XR}
  writeln('NL TRANSMITTER IMAGE RECONSTRUCTION DONE *********');
  end; { procedure nl_xmtr_recon_image} procedure normalize_voxels;

var
    PRMAX     : single;
    XR        : integer;
    YR        : integer;
    ZR        : integer;

begin
    writeln('*******NORMALIZING VOXELS.......');
    PRMAX := 1;
     for XR := XlBound to XuBound do
       for YR := YlBound to YuBound do
         for ZR := ZlBound to ZuBound do
           if PR[XR,YR,ZR] > PRMAX then
             PRMAX := PR[XR,YR,ZR];
     writeln('PRMAX = ',PRMAX);
     for XR := XlBound to XuBound do
       for YR := YlBound to YuBound do
         for ZR := ZlBound to ZuBound do
```

```
              begin
              {write('PR before= ',PR[XR,YR,ZR]);}
              PR[XR,YR,ZR] := round(PR[XR,YR,ZR]/PRMAX*99);
              {write(' PR after= ',PR[XR,YR,ZR]);}
              {writeln(' PRMAX= ',PRMAX);}
              end;
          end; {procedure normalize_voxels} procedure truncate_voxels;

var
      XR            : integer;
      YR            : integer;
      ZR            : integer;

begin
   writeln('*******TRUNCATING VOXEL BACKGROUND AT ',(VoxelTruncLevel - 1),'...');
   for XR := XlBound to XuBound do
      for YR := YlBound to YuBound do
         for ZR := ZlBound to ZuBound do
            begin
            if PR[XR,YR,ZR] < VoxelTruncLevel then
            PR[XR,YR,ZR] := 0;
            end;
   end; {procedure truncate voxels} procedure log_voxels;
   var
      XR            : integer;
      YR            : integer;
      ZR            : integer;
      TruncatePR    : single;
      LogPR         : single;
      PRMAX         : single;

begin
   writeln('******* CONVERTS ALL VOXELS TO DECIBELS...');
   writeln('       ....TRUNCATES BELOW ONE BEFORE 20 LOGGING...');
   writeln('       .......CONVERTS RESULTING PR dbs TO INTEGERS.....');

if NormalizeVoxels_80db then
      begin
      writeln('***** NORMALIZING VOXELS TO 10,000 (80db) .......');
      PRMAX := 1;
       for XR := XlBound to XuBound do
         for YR := YlBound to YuBound do
            for ZR := ZlBound to ZuBound do
               if PR[XR,YR,ZR] > PRMAX then
                  PRMAX := PR[XR,YR,ZR];
      writeln('PRMAX = ',PRMAX);
      for XR := XlBound to XuBound do
         for YR := YlBound to YuBound do
            for ZR := ZlBound to ZuBound do
            begin
            {write('PR before= ',PR[XR,YR,ZR]);}
            PR[XR,YR,ZR] := round(PR[XR,YR,ZR]/PRMAX*99);
```

```
            {write(' PR after= ',PR[XR,YR,ZR]);}
            {writeln(' PRMAX= ',PRMAX);}
            end;
    end; {NORMALIZING VOXELS} for XR := XlBound to XuBound do
      for YR := YlBound to YuBound do
        for ZR := ZlBound to ZuBound do
          begin
            if PR[XR,YR,ZR] < 1
               then  PR[XR,YR,ZR] := 1 ;
            TruncatePR          := PR[XR,YR,ZR];
            LogPR               := 20 * ln(TruncatePR) / ln(10);
                PR[XR,YR,ZR]         := round(LogPR);
              end;
        end; {procedure log_voxels} procedure save_3D_Image;
   type
      point         = single;
   var
     XR            : integer;
     YR             : integer;
     ZR            : integer;
     image_3d      : file of point;
   begin
   writeln('SAVING BINARY 3D IMAGE IN FILE "image_3d.dat"....');
   assign(image_3d,'image_3d.dat');
   rewrite(image_3d);
   for XR := XlBound to XuBound do
     for YR := YlBound to YuBound do
       for ZR := ZlBound to ZuBound do
         write(image_3d,PR[XR,YR,ZR]);
   write(image_3d,PRMAX);
   close(image_3d);
   end; {procedure save_3D_Image} procedure save_3D_pik;

var
    pik_3d     : text;
    XR         : integer;
    YR         : integer;
    ZR         : integer;

begin
  writeln('SAVING 3D IMAGE IN FILE "pik_3d.dat"....');
  assign(pik_3d,'pik_3d.dat');
  rewrite(pik_3d);
  for XR := XlBound to XuBound do
    for YR := YlBound to YuBound do
      for ZR := ZlBound to ZuBound do
        write(pik_3d,PR[XR,YR,ZR]);
  close(pik_3d);
  end; {procedure save_3D_pik}
```

```
begin {Make_3D_Image}
  initialize_voxels;
  for TN := 1 to NumXmtrEle do
    begin  {recon for TN = i and sum into 3D image voxels}
      load_time_history;{download time history for a particular xmitter}
      if not (NonLinear_Proc_Xmtrs or NL_Mul_TH_Proc) then
        recon_image;
      if NonLinear_Proc_Xmtrs then
        NL_xmtr_recon_image;
      if NL_Mul_TH_Proc then
        NL_Mul_TH_Recon_Image;
    end;   {separate xmitter images have been summed or combined}
  if NonLinear_Proc_TH or NonLinear_Proc_xmtrs then
    decompress_PR;
  if NormalizeVoxels then
    normalize_voxels;
  if Trunc_Voxel_Background then
    truncate_voxels;
  if LogVoxels then
    log_voxels;
  save_3D_Image;          {save in a binary file}
  if Save_3D_Pix_Text then
    save_3D_pik;          {save in a text file}
end; {procedure make_3D_image}
```

```
{-----------------------------------------------------------------}
{                   LOCATION OF SECOND NODE                       }
{              a three dimensional image has been                 }
{                 reconstructed and saved on disk                 }
{-----------------------------------------------------------------}
```

```
procedure form_2D_view;

var
    PR        : array[MinX..MaxX,MinY..MaxY,
                      MinZ..Maxz] of single;
    PYZ       : array[MinY..MaxY,MinZ..MaxZ]
                      of integer;
    PYX       : array[MinY..MaxY,MinX..MaxX]
                      of integer;

PXS       : array[MinY..MaxY,MinZ..MaxZ]
                      of integer;

PZS       : array[MinX..MaxX,MinY..MaxY]
                      of integer;

PRMAX     : single;

XV        : integer;
    YV        : integer;

procedure load_3D_image;

type
    point        = single;
```

```
        var
          image_3d       : file of point;
          XR             : integer;
          YR             : integer;
          ZR             : integer;

begin writeln('LOADING BINARY 3D IMAGE FROM FILE "image_3d.dat"....');
        assign(image_3d,'image_3d.dat');
        reset(image_3d);
        for XR := XlBound to XuBound do
          for YR := YlBound to YuBound do
            for ZR := ZlBound to ZuBound do
              read(image_3d,PR[XR,YR,ZR]);
        read(image_3d,PRMAX);
        close(image_3d);
        end; {procedure load_3D_Image} procedure form_YZtomogram;
    var
      PYZMAX         : integer;
      XV             : integer;
      YV             : integer;
      ZV             : integer;
      XR             : integer;

begin  { form a slice in YZ plane }
       for XV := Ylbound to YuBound do   {initialize}
         for YV := ZlBound to ZuBound do
           PYZ[XV,YV] := 0;
       writeln('FORMING YZ TOMOGRAM...');
       XR := X_tomo;
       for XV := Ylbound to YuBound do
         for YV := ZlBound to ZuBound do
           PYZ[XV,YV] := round(PR[XR,XV,YV]);
       if (TruncNegTomoPixels = true) then
       begin
         for XV := Ylbound to YuBound do
           for YV := ZlBound to ZuBound do
             if (PYZ[XV,YV] < 0) then PYZ[XV,YV] := 0;
       end;
       if (NormalizeTomos = true) then
       begin
         PYZMAX := 1;
         for XV := Ylbound to YuBound do
           for YV := ZlBound to ZuBound do
             if PYZ[XV,YV] > PYZMAX then
               PYZMAX := PYZ[XV,YV];
         for XV := Ylbound to YuBound do
           for YV := ZlBound to ZuBound do
             PYZ[XV,YV] := round(PYZ[XV,YV] / PYZMAX * pixelrange);
       end
    end; {procedure form yz tomogram} procedure save_YZtomogram;
```

```pascal
var
  yztomo        : text;
  XV            : integer;
  YV            : integer;
  ZV            : integer;

begin
writeln('SAVING YZ TOMOGRAM IN FILE "YZ_tomo.dat"....');
assign(yztomo,'yz_tomo.dat');
rewrite(yztomo);
writeln(yztomo,'       Y Y Y Y Y Y Y Y Y Y Y Y Y Y Y Y Y Y');
writeln(yztomo,'       = = = = = = = = = = = = = = = = = =');
write(yztomo,'      ');
for XV := YlBound to YuBound do
   write(yztomo,XV:3);
writeln(yztomo);
for YV := ZlBound to ZuBound do
   begin
   writeln(yztomo);
   write(yztomo,'Z=',YV:3);
   for XV := YlBound to YuBound do
      write(yztomo,PYZ[XV,YV]:3);
   end;
close(yztomo);
end; {procedure save_YZtomogram} procedure form_YXtomogram;
  var
    PYXMAX      : integer;
    XV          : integer;
    YV          : integer;
    ZV          : integer;
    ZR          : integer;

begin { form a slice in YX plane }
    for XV := Ylbound to YuBound do   {initialize}
     for YV := XlBound to XuBound do
       PYX[XV,YV] := 0;
    writeln('FORMING YX TOMOGRAM...');
    ZR := Z_tomo;
    for XV := Ylbound to YuBound do
     for YV := XlBound to XuBound do
       PYX[XV,YV] := round(PR[YV,XV,ZR]);
    if (TruncNegTomoPixels = true) then
    begin
      for XV := Ylbound to YuBound do
        for YV := XlBound to XuBound do
          if (PYX[XV,YV] < 0) then PYX[XV,YV] := 0;
    end;
    if (NormalizeTomos = true) then
    begin
      PYXMAX := 1;
      for XV := Ylbound to YuBound do
        for YV := XlBound to XuBound do
          if PYX[XV,YV] > PYXMAX then
            PYXMAX := PYX[XV,YV];
      for XV := Ylbound to YuBound do
```

```
        for YV := XlBound to XuBound do
          PYX[XV,YV] := round(PYX[XV,YV] / PYXMAX * pixelrange);
    end
  end; {procedure form yx tomogram} procedure save_YXtomogram;

var
    yxtomo       : text;
    XV           : integer;
    YV           : integer;
    ZV           : integer;

begin
    writeln('SAVING YX TOMOGRAM IN FILE "YX_tomo.dat"....');
    assign(yxtomo,'yx_tomo.dat');
    rewrite(yxtomo);
    writeln(yxtomo,'      Y Y Y Y Y Y Y Y Y Y Y Y Y Y Y Y Y Y');
    writeln(yxtomo,'      = = = = = =, = = = = = = = = = = = =');
    write(yxtomo,'      ');
    for XV := YlBound to YuBound do
      write(yxtomo,XV:3);
    writeln(yxtomo);
    for YV := XlBound to XuBound do
      begin
        writeln(yxtomo);
        write(yxtomo,'X=',YV:3);
        for XV := YlBound to YuBound do
          write(yxtomo,PYX[XV,YV]:3);
      end;
    close(yxtomo);
  end; {procedure save_YXtomogram} procedure form_Xshadowgraph;
  var
    PXSMAX       : integer;
    XV           : integer;
    YV           : integer;
    ZV           : integer;
    XR           : integer;

begin  { integrate in X direction}
    writeln('FORMING X SHADOWGRAPH....');
```

While the above descriptions contains many specifics, these should not be construed as limitations on the scope of the invention, but as an example of several embodiments.

The imaging concept can be implemented with any type of energy that can be transmitted as a spherical, expanding, radiating pulse of short duration with predictable velocity of propagation. The echoes may or may not be of the same type of energy as the transmitted pulse. The velocity of the transmitted energy may be different from the velocity of the echo energy.

The receiver array can be any shape, two dimensional or three dimensional, although circular is typically optimal. The transmitter or transmitters can be located at any position with respect to the receiver array.

The image reconstruction processing may be implemented in hardware or software.

The tomograms may be extracted in a more flexible manner by implementing, in hardware, equations that describe the tomographic plane and then by using these equations to extract voxels from the 3D image to be used as tomographic pixels.

The viewing perspectives through the 3D volume may be made more continuously variable by implementing in hardware the viewing perspective vector and using it to generate 3D memory addresses to access voxels to be summed, thus causing the integration.

The term "active imaging" will mean, for purposes of this patent specification, all imaging systems which purposely emit energy to illuminate the object or volume to be imaged, with the exception of seismic migration systems.

What is claimed is:

1. A three dimensional active imaging device with multiple transmitter, using a reduced number of transmitted pulses to produce a three dimensional image, and capable of generating a three dimensional image of reflecting points on or within objects in a three dimensional volume within which the propagation velocities of the transmitted energy and the echo energy are known, said volume being external to a sparsely spaced two or three dimensional array of plural transmitters and plural receiver elements, comprising:

(a) A Transmitter means for transmitting a pulse of energy which radiates through a wide solid angle within the three dimensional volume;

(b) A Receiver means for detecting echoes, from the reflecting points within the volume, caused by said pulse of energy, simultaneously at three or more of the sparsely spaced receiver elements;

(c) An Echo Time History Memory means for sampling said detected echoes from each of the receiver elements of said receiver means whereby an Echo Time History echo sample set is created which is associated with the transmitter which transmitted the pulse;

(d) A System Timing and Control means for repeating (a) through (c) with other of the plural transmitters whereby a set of echo samples from each of the receiver elements becomes associated with each of the transmitters within the array of plural transmitters;

(e) An Image Reconstruction Processor means for selecting and combining with each other, for each image of a reflecting point, one echo sample from each receiver element from each of the echo sample sets associated with each of the transmitters, whereby an image is created of the reflecting points on or within objects in the three dimensional volume, said Image Reconstruction Processor utilizing for selection, the sum of: distance from the transmitter to the image point divided by the known propagation velocity of the pulse of energy, and distance from the image point to each of the receiver element divided by the known propagation velocity of the echoes, said Image Reconstruction Processor means therefore operating in accordance with the equivalent of the formula:

$$PR(xr,yr,zr) = \Sigma \, echo_{ij}((1/ds)(1/Ct)RTP_i + (1/Ce)RPE_j)$$

for each of the transmitters: $t_1, t_2, \ldots t_i, \ldots t_{nt}$ and
for each of the receivers: $e_1, e_2, \ldots e_j, \ldots e_{ne}$
where
i is the transmitter index
j is the receiver element index
PR (xr,yr,zr) is the image of the point at the location (xr,yr,zr)
$t_{nt}$ is the number of transmitter elements
$e_{ne}$ is the number of receiver elements
$echo_{ij}(sn)$ is the echo sample at location "sn" in the echo sample set, $st_ie_j$, where the echoes resulted from the pulse transmitted the transmitter i, and the echoes were detected by receiver element j
ds is the time interval at which the echo samples are taken
Ct is the transmitted energy propagation velocity
Ce is the echo energy propagation velocity which may be equal to Ct, or different from CT
and where $$RTP_i = \sqrt{[(xr-xti)^2 + (yr-yti)^2 + (zr-zti)^2]}$$

$$RPE_j = \sqrt{[(xr-xej)^2 + (yr-yej)^2 + (zr-zej)^2]}$$

where also
(xti,yti,zti) is the location of transmitter element i
(xrj,yrj,zrj) is the location of receiver element j.

2. A three dimensional active imaging device for generating a three dimensional image of reflecting points on or within objects in a three dimensional volume within which the propagation velocity of transmitted energy and the propagation velocity of echo energy are known, said device using a reduced number of transmitted pulses and utilizing a Receiver means comprising a two or three dimensional array of sparsely spaced receiver elements and a Transmitter means comprising a two or three dimensional array of sparsely spaced transmitter elements, comprising:

(a) The Transmitter means for generating plural pulses of energy which will radiate uniformly through a wide solid angle in the three dimensional volume external to said array;

(b) A System Timing and Control means for activating the first transmitter element means whereby the first pulse of energy is radiated;

(c) The Receiver means for simultaneously detecting echoes, caused by said radiated pulse of energy reflecting from said reflecting points, at three or more of the sparsely spaced receiver elements;

(d) An Echo Processor means for sampling, as a function of time, said detected echoes from each of the receiver elements of said sparsely spaced receiver elements whereby echo samples are generated;

(e) An Image Reconstruction Processor means for combining said samples into points of the image of the three dimensional volume, whereby the image is reconstructed, said means utilizing time of flight associated with the echo samples to determine into which of said image points the echo samples should be combined, wherein said time of flight consists of the sum of: (1) the distance from the transmitter element to the image point divided by the velocity of the transmitted energy, and (2) the distance from the image point to the receiver element divided by the velocity of the echo energy, said time of flight computed according to the equivalent of the following equation, $$TOF(x,y,z) = (1/Ct)RTP_i + (1/Ce)RPE_j$$

for transmitter $t_i$
and for receiver $e_j$
where
TOF(x,y,z) is the time of flight for the image point at (x,y,z), and which is associated with transmitter i and receiver j
Ct is the transmitted energy propagation velocity
Ce is the echo energy propagation velocity which may be equal to Ct, or different from Ct
and also where $$RTP_i = \sqrt{[(x-xi)^2 + (y-yi)^2 + (z-zi)^2]}$$

is the distance from the transmitter i to the point (x,y,z)

$$RPE_j = \sqrt{[(x-xj)^2 + (y-yj)^2 + (z-zj)^2]}$$

is the distance from point (x,y,z) to the receiver j
where also (xi,yi,zi) is the location of transmitter element i
(xj,yj,zj) is the location of receiver element j (f) The System Timing and Control means for activating the next of the transmitter elements whereby the next pulse of energy is radiated;

(g) The System Timing and Control means for repeating (c), (d), (e) whereby the echo samples generated by the receiver elements are combined into the image;

(h) The System Timing and Control means for repeating (f) and then (g) for each of the transmitter elements in the plurality of transmitters wherein all of the transmitter elements radiate a pulse of energy and the echo samples received at each of the receiver elements resulting from each of the pulses are combined into the image.

3. A three dimensional active imaging method by which there is generated image points of reflecting points in a three dimensional volume residing outside of a sparse array of plural transmitting and plural sensing elements, where the transmitted energy propagation speed is known and the echo propagation speed is known, comprising the steps;

(a) Transmitting a pulse of energy, from a transmitting element, which will propagate through all of the three dimensional volume to be imaged;

(b) Simultaneously sensing echoes caused by the reflecting points within said volume with a two or three dimensional array of three or more sparsely spaced sensing elements;

(c) Sampling at time interval, dt, the echoes simultaneously sensed at each sensing element whereby a set of echo time histories of sequences of echo samples for all of the sensing elements is created which is associated with the transmitter;

(d) Repeating steps (a), (b) and (c) for each transmitter whereby sets of echo time histories, associated with each transmitter, are created;

(e) Reconstructing one of the image points by selecting and summing together one of said echo samples from each of said echo time histories from each of said sensor elements for each of said echo time history sets associated with each of said transmitters, wherein said echo samples are selected in accordance with the equivalent of the following algorithm:

the echo sample, $echo_{ij}$, from the sensor i echo time history from the echo time history set associated with transmitter j for use in reconstructing the image point at (x,y,z) is:

$$echo_{ij}(1/dt)(1/C_t)RTP_i+(1/C_e)RPE_j)$$

where
(x,y,z) is the image point of the reflecting point at the location (x,y,z)
$echo_{ij}(sn)$ is the $(sn)^{th}$ sample in the echo time history set, $echo_{ij}$,
where the echoes resulted from the pulse transmitted by the transmitter i, and the echoes were sensed by sensor element j
dt is the time interval at which the echo samples are taken
Ct is the transmitted pulse propagation velocity
Ce is the echo energy propagation velocity which may be equal to Ct, or different from Ct
and where $$RTP_i=\sqrt{[(x-x_i)^2+(y-y_i)^2+(z-z_i)^2]}$$

$$RPE_j=\sqrt{[(x-x_j)^2+(y-y_j)^2+(z-z_j)^2]}$$

where also
(xi,yi,zi) is the location of transmitter element i
(xj,yj,zj) is the location of receiver element j (f) Repeating step (e) for each image point in the three dimensional volume.

4. The device of claim 1, or claim 2 wherein the energy is an electromagnetic radar pulse.

5. The device of claim 1, or claim 2 wherein the energy is an underwater acoustic sonar pulse.

6. The device of claim 1, or claim 2 wherein the energy is a short pulse of light.

7. The device of claim 1, or claim 2 wherein the energy is an acoustic pulse used for non destructive testing of a solid material.

8. The device of claim 1, or claim 2 wherein the energy is an acoustic ultrasound pulse used for 3D, real time medical imaging.

9. The device according to claim 1 or 2 wherein the energy is a low interference pulse.

10. The device according to claim 1 or 2 wherein the energy is a non interfereing pulse.

11. The device according to claim 1 or 2 wherein the three dimensional image is created in realtime, repetitively approximately very 33 milliseconds.

12. The method according to claim 3 wherein the energy is a low interference pulse.

13. The method according to claim 3 wherein the energy is a non interfering pulse.

14. The device according to claim 4 wherein a new three dimensional image is created in less than 100 milliseconds.

15. The device according to claim 1 or 2 wherein the Image Reconstruction processor is a parallel, pipelines means for combining echo samples to reconstruct the image points, said means having as input the image point coordinates, (xp,yp,zp), comprising:

(a) plural parallel means for computing simultaneously the distances from the receivers to the image point comprising:
(aa) means for computing simultaneously first distances from the receivers to (xp,yp) or (xp,zp) or (yp,zp);
(bb) means for using said first distances to compute the final distances to (xp,yp,zp);
(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

16. The device according to claim 4 wherein the Image Reconstruction Processor is a parallel, pipelined means for combining echo samples to reconstruct the image points, said means having as input the image point coordinates, (xp,yp,zp), comprising:

(a) plural parallel means for computing simultaneously the distances from the receivers to the image point comprising:
(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

17. The device according to claim 8 wherein the Image Reconstruction processor is a parallel, pipelined means for combining echo samples to reconstruct the image points, said means having as input the image point coordinates, (xp,yp,zp), comprising:
(a) plural parallel means for computing simultaneously the distances from the receivers to the image point comprising:
(aa) means for computing simultaneously first distances from the receivers to (xp,yp) or (xp,zp) or (yp,zp);
(bb) means for using said first distances to compute the final distances to (xp,yp,zp);
(cc) means for simultaneously combining the distances from the receivers with the distance from the image point to each transmitter wherein the resulting combined distances represents the round trip travel distances from each receiver to the image point to the transmitters;
(b) means for using the round trip travel distances to simultaneously select echo samples to be combined whereby the image point is reconstructed.

18. The device according to claim 11 wherein the Image Reconstruction Processor is a parallel, pipelined means for combining echo samples to reconstruct the image points, said means having as input the image point coordinates, (xp,yp,zp), comprising:
(a) plural parallel means for computing simultaneously the distances from the receivers to the image point comprising:
(aa) means for computing simultaneously first distances from the receivers to (xp,yp) or (xp,zp) or (yp,zp);
(bb) means for using said first distances to compute the final distances to (xp,yp,zp);
(cc) means for simultaneously combining the distances from the receivers with the distance from the image point to each transmitter wherein the resulting combined distances represents the round trip travel distances from each receiver to the image point to the transmitters;
(b) means for using the round trip travel distances to simultaneously select echo samples to be combined whereby the image point is reconstructed.

19. The device according to claim 14 wherein the Image Reconstruction Processor is a parallel, pipelined means for combining echo samples to reconstruct the image points, said means having an input the image point coordinates, (xp,yp,zp), comprising:
(a) plural parallel means for computing simultaneously the distances from the receivers to the image point comprising:
(aa) means for computing simultaneously first distances from the receivers to (xp,yp) or (xp,zp) or (yp,zp);
(bb) means for using said first distances to compute the final distances to (xp,yp,zp);
(cc) means for simultaneously combining the distances from the receivers with the distance from the image point to each transmitter wherein the resulting combined distances represent the round trip travel distances from each receiver to the image point to the transmitters;
(b) means for using the round trip travel distances to simultaneously select echo samples to be combined whereby the image point is reconstructed.

20. The device according to claim 17 further comprising a Tomogram Processor means for generating tomographic images within the imaged three dimensional volume, said means comprising:
(a) Means for using the equation of a plane to select three dimensional voxels which will be used in the tomogram;
(b) Means or generating addresses for the tomogram pixels using the voxel coordinates and the coefficients of the equation of the plane;
(c) Means for generating write pulses for the pixels by comparing the two sides of the equation.

21. The device according to claim 20 further comprising a Shadowgraph Processor means for generating shadowgraph images of the imaged three dimensional volume, said means comprising:
(a) Means for using the equations of lines to generate addresses of the voxels to be summed to create pixels for the shadowgraph
(b) Means for generating a sequence of pixel addresses for the shadowgraph and summing them with the reconstruction point coordinates to create one side of the equation
(c) Means for multiplying the coefficients of the equation with a vector incrementor parameter and summing the results to generate the other side of the equation
(d) Means for comparing the two sides of the equation to generate write pulses for the shadowgraph memory.

22. The device according to claims 1 or 2 wherein the array is an axicon array with elements closely spaced around the circumference of the array while being sparsely spaced in the center and further comprising multiple transmitter elements and multiple redundant transmitted pulses whereby the sidelobe levels are reduced.

23. The device according to claims or 2 wherein the transmitted pulse is a wideband pulse.

24. The device according to claims 1 or 2 wherein the transmitted pulse is a monopolar pulse.

25. The device according to claim 1 or claim 2 wherein the transmitted pulse is a pulse of particles.

26. The device according to claim 25 wherein the echo energy is electromagnetic energy and the different velocities of the transmitted pulse and the echoes are used in the image reconstruction wherein the backprojected ellipsoids are distorted.

* * * * *

UNITED STATES PATENT AND TRADEMARK OFFICE
CERTIFICATE OF CORRECTION

PATENT NO. : 5,005,418

DATED : April 9, 1991

INVENTOR(S) : Forrest L. Anderson

Page 1 of 41

It is certified that error appears in the above-identified patent and that said Letters Patent is hereby corrected as shown below:

Columns 21-100 should be deleted to appear as per attached columns 21-100.

Signed and Sealed this

Nineteenth Day of January, 1993

Attest:

DOUGLAS B. COMER

*Attesting Officer*

*Acting Commissioner of Patents and Trademarks*

SOFTWARE IMPLEMENTATION OF IMAGING MACHINE:

```
{$R-}    {Range checking ?}
{$B-}    {Boolean complete evaluation on}
{$S-}    {Stack checking ?}
{$I-}    {I/O checking ?}
{$N+}    {numeric coprocessor}
{$M 65520,0,655360}{stack and heap}{old:65500,65500,655360}
program sim;
{*****************************************************}
{*****************************************************}
{* *        IMPULSE IMAGING PROGRAM              * * }
           COPYRIGHT 1988 (C) by FORREST ANDERSON
                  all rights reserved
{*****************************************************}
{*****************************************************}

Uses
   Dos,
   Crt;
{Turbo3;} const
{.................SWITCHES.................}
   TH_TextFile              = false; {generate time history text file}
   ShowTimeHistory          = false; {put time histories on the screen}
   NormalizeShadows         = true;  {maps  0..max  to  0..99  !!!}
   NormalizeTomos           = true;  {maps  0..max  to  0..99  !!!}
   LogVoxels                = false; {log remap voxels}
   NormalizeVoxels          = false; {sets maximum voxel value to 99}
   NormalizeVoxels_80db     = false; {sets maximum voxel value to 10,000 -1}
   Trunc_Voxel_Background   = false; {truncate recon. voxels in background}
   TruncNegTomoPixels       = false; {set neg tomo pixels to zero}
   ShadowBack               = 0;{set to 0 for no shadowbackground reduction}
   Vdisk                    = false; {ramdrive D: for intermediate storage}
   Back_Diff                = false; {back difference time histories}
   Fore_Back_Diff           = false; {forward & backward difference}
   Sinc_Filter_Diff         = false; {sinc filter time histories}
   Hilb_Filter_Diff         = true;  {hilbert filter time histories}
   Log_Sum_PRs              = false; {log sums prs from separate xmittrs}
   NonLinear_Proc_TH        = false; {NL comb. of THs for each xmittr}
   NonLinear_Proc_Xmtrs     = false; {NL comb. of PRs from diff.xmittrs}
   NL_Mul_TH_Proc           = false; {Mul comb. of THs from each xmittr}
   Save_3D_Pix_Text         = false; {save 3D recon in text file}
   Reassign_Echo_Ampl       = true;  {redo all point amplitudes}
   DoDefault                = true;  {do default config automatically.. *.bat}
   UseDos                   = false; {uses dos for screen output..DV}
{.................CONSTANTS.................}
   PI                       = 3.1415926;
   Speed                    = 1.5; {millimeter/microsec}
```

```
{....................MAXIMUM VALUES...........................}
  MaxNumRcvrEle              = 32;
  MaxNumXmtrEle              = 16;
  MaxNumSamples              = 260;
  MaxX                       = 10;
  MinX                       =-10; {-10}
  MaxY                       = 10; {10}
  MinY                       =-10; {-10}
  MaxZ                       = 75; {75}
  MinZ                       = 65; {65}
  MaxNumPoints               = 35;
  MaxNumXmtrRings            = 4;

type
{.....................GLOBAL VARIABLE TYPES.....................}
  RcvrRadtype                = 1..200;
  XmtrRadtype                = 0..199;
  NumRcvrEletype             = 2..MaxNumRcvrEle;
  NumXmtrEletype             = 1..MaxNumXmtrEle;
  SampleNumtype              = 1..MaxNumSamples;
  SampleInttype              = single;
  NumSamplestype             = 1..MaxNumSamples;
  ReconRestype               = single;
  PulseWidthtype             = single;
  NumPointstype              = 1..MaxNumPoints;
  XlBoundtype                = MinX..MaxX;
  XuBoundtype                = MinX..MaxX;
  YlBoundtype                = MinY..MaxY;
  YuBoundtype                = MinY..MaxY;
  ZlBoundtype                = MinZ..MaxZ;
  ZuBoundtype                = MinZ..MaxZ;
  X_tomotype                 = MinX..MaxX;
  Z_tomotype                 = MinZ..MaxZ;
  NumSqrtype                 = 1..100;
  NumSqrRttype               = 1..100;
  pixelrangetype             = 10..99;
  VoxelTruncLeveltype        = 1..100;
  FilterCoeffType            = single;

var
{....................GLOBAL VARIABLES............................}
  RcvrRad                    : RcvrRadtype;
  XmtrRad                    : XmtrRadtype;
  NumRcvrEle                 : NumRcvrEletype;
  XE                         : array[1..MaxNumRcvrEle] of single;
  YE                         : array[1..MaxNumRcvrEle] of single;
  NumXmtrEle                 : NumXmtrEletype;
  XT                         : array[1..MaxNumXmtrEle] of single;
  YT                         : array[1..MaxNumXmtrEle] of single;
  ZT                         : array[1..MaxNumXmtrEle] of single;
```

```
    SampleNum                    : SampleNumtype;
    SampleInt                    : SampleInttype;
    NumSamples                   : NumSamplestype;
    ReconRes                     : ReconRestype;
    PulseWidth                   : PulseWidthtype;
    NumPoints                    : NumPointstype;
    XP                           : array[1..MaxNumPoints] of single;
    YP                           : array[1..MaxNumPoints] of single;
    ZP                           : array[1..MaxNumPoints] of single;
    EchoAmpl                     : array[1..MaxNumPoints] of single;
    XlBound                      : XlBoundtype;
    XuBound                      : XuBoundtype;
    YlBound                      : YlBoundtype;
    YuBound                      : YuBoundtype;
    ZlBound                      : ZlBoundtype;
    ZuBound                      : ZuBoundtype;
    X_tomo                       : X_tomotype;
    Z_tomo                       : Z_tomotype;
    NumSqr                       : NumSqrtype;
    NumSqrRt                     : NumSqrRttype;
    pixelrange                   : pixelrangetype;
    VoxelTruncLevel              : VoxelTruncLeveltype;
    FC1                          : FilterCoeffType;
    FC2                          : FilterCoeffType;
    FC3                          : FilterCoeffType;
    FC4                          : FilterCoeffType;
    FC5                          : FilterCoeffType;

{................END OF GLOBAL / PROGRAM DECLARATIONS....................} procedure change_default_drive ;
  begin
    writeln('*******   ALL OUTPUT WILL GO TO VDISK D:   !!!!!!!!!!!!!!!!! ');
    exec('\command.com','/c d:');
    if DosError <> 0 then
       writeln('Dos error #',DosError)
    else
       writeln('Exec OK.. child process exit code =', DosExitCode);
  end; {procedure change_default_drive} procedure use_dos_for_screen;
  begin
    assign(input,'');
    reset(input);
    assign(output,'');
    rewrite(output);
  end; {procedure use_dos_for_screen} procedure default_configuration ;
  var
```

```
    rcvrconf              : text;
    xmtrcon1              : text;
    xmtrcon2              : text;
    xmtrcon3              : text;
    xmtrcon4              : text;

EleNum                : integer;

XmtrRingNum1Rad       : integer;
    XmtrRingNum2Rad       : integer;
    XmtrRingNum3Rad       : integer;
    XmtrRingNum4Rad       : integer;
    XmtrRingNum1Offs      : integer;
    XmtrRingNum2Offs      : integer;
    XmtrRingNum3Offs      : integer;
    XmtrRingNum4Offs      : integer;
    NumXmtrEleRingNum1    : integer;
    NumXmtrEleRingNum2    : integer;
    NumXmtrEleRingNum3    : integer;
    NumXmtrEleRingNum4    : integer;

PN                    : integer;
    Universal_Ampl        : integer;

begin
  writeln('DOING DEFAULT CONFIGURATION....');

{............THE FUNDAMENTAL PARAMETERS...................................}

{NONLINEAR COMPRESSION if active}
    NumSqr                := 1;{1}
    NumSqrRt              := 2;{2}

{VOXEL TRUNCATION LEVEL if active}
    VoxelTruncLevel       := 1;

{FILTER COEFFICIENTS}
    FC1 := 0; FC2 := -0.5; FC3 := 1; FC4 := -0.5; FC5 := 0;
        {THE ARRAY}
    XmtrRingNum1Rad       := 0; {25}
    XmtrRingNum1Offs      := 0;
    XmtrRingNum2Rad       := 20;
    XmtrRingNum2Offs      := 0;
    XmtrRingNum3Rad       := 30;
    XmtrRingNum3Offs      := 0;
    XmtrRingNum4Rad       := 40;
    XmtrRingNum4Offs      := 0;

NumXmtrEleRingNum1    := 1;   {r3=0}{r2=0}{r1=1} {16}
    NumXmtrEleRingNum2    := 4;   {r3=0}{r2=0}{r1=3}
```

```
NumXmtrEleRingNum3    := 5;   {r3=0}{r2=16} {r1=4}
NumXmtrEleRingNum4    := 6;   {r3=16} {r2=0}{r1=4}

NumRcvrEle            := 32;  {32}
RcvrRad               := 50:

{THE OBJECT FIELD}
NumPoints       := 1;   {31}

XP[1]           := 0;        {0}    {start body}
YP[1]           := 0;        {5}
ZP[1]           := 71;       {71}
EchoAmpl[1]     := 5;        {5}

XP[2]           := 0;
YP[2]           := 4;
ZP[2]           := 71;
EchoAmpl[2]     := 5;

XP[3]           := 0;
YP[3]           := 3;
ZP[3]           := 71;
EchoAmpl[3]     := 5;

XP[4]           := 0;
YP[4]           := 2;
ZP[4]           := 71;
EchoAmpl[4]     := 5;

XP[5]           := 0;
YP[5]           := 1;
ZP[5]           := 71;
EchoAmpl[5]     := 5;

XP[6]           := 0;
YP[6]           := 5;
ZP[6]           := 71;
EchoAmpl[6]     := 5;

XP[7]           := 0;
YP[7]           := -1;
ZP[7]           := 71;
EchoAmpl[7]     := 5;

XP[8]           := 0;
YP[8]           := -2;
ZP[8]           := 71;
EchoAmpl[8]     := 5;
```

```
XP[9]          := 0;
YP[9]          := -3;
ZP[9]          := 71;
EchoAmpl[9]    := 5;

XP[10]         := 0;
YP[10]         := -4;
ZP[10]         := 71;
EchoAmpl[10]   := 5;

XP[11]         := 0;                    {end body}
YP[11]         := -5;
ZP[11]         := 71;
EchoAmpl[11]   := 5;

XP[12]         := 4;                    {start wing}
YP[12]         := 1;
ZP[12]         := 71;
EchoAmpl[12]   := 5;

XP[13]         := 3;
YP[13]         := 1;
ZP[13]         := 71;
EchoAmpl[13]   := 5;

XP[14]         := 2;
YP[14]         := 1;
ZP[14]         := 71;

EchoAmpl[14]   := 5;

XP[15]         := 1;
YP[15]         := 1;
ZP[15]         := 71;
EchoAmpl[15]   := 5;

XP[16]         := -1;
YP[16]         := 1;
ZP[16]         := 71;
EchoAmpl[16]   := 5;

XP[17]         := -2;
YP[17]         := 1;
ZP[17]         := 71;
EchoAmpl[17]   := 5;

XP[18]         := -3;
YP[18]         := 1;
ZP[18]         := 71;
EchoAmpl[18]   := 5;
```

```
XP[19]         := -4;
YP[19]         := 1;
ZP[19]         := 71;
EchoAmpl[19]   := 5;

XP[20]         := 3;
YP[20]         := -5;
ZP[20]         := 71;
EchoAmpl[20]   := 5;

XP[21]         := 2;
YP[21]         := -5;
ZP[21]         := 71;
EchoAmpl[21]   := 5;

XP[22]         := 1;
YP[22]         := -5;
ZP[22]         := 71;
EchoAmpl[22]   := 5;

XP[23]         := -1;
YP[23]         := -5;
ZP[23]         := 71;
EchoAmpl[23]   := 5;

XP[24]         := -2;
YP[24]         := -5;
ZP[24]         := 71;
EchoAmpl[24]   := 5;

XP[25]         := 0;
YP[25]         := -5;
ZP[25]         := 70;
EchoAmpl[25]   := 5;

XP[26]         := 0;
YP[26]         := -5;
ZP[26]         := 69;
EchoAmpl[26]   := 5;

XP[27]         := 0;
YP[27]         := -5;
ZP[27]         := 68;
EchoAmpl[27]   := 5;

XP[28]         := -5;
YP[28]         := 1;
ZP[28]         := 71;
EchoAmpl[28]   := 5;
```

{end wing}

{start tail}

{end tail}

{start rudder}

{end rudder}

{start widen wing}

```
XP[29]          := -6;
YP[29]          := 1;
ZP[29]          := 71;
EchoAmpl[29]    := 5;

XP[30]          := 5;
YP[30]          := 1;
ZP[30]          := 71;
EchoAmpl[30]    := 5;

XP[31]          := 6;                         {end widen wing}
YP[31]          := 1;
ZP[31]          := 71;
EchoAmpl[31]    := 5;
{
XP[31]          := ;
YP[31]          := ;
ZP[31]          := ;
EchoAmpl[31]    := ;
}
{
XP[32]          := 0;
YP[32]          := 1;
ZP[32]          := 71;
EchoAmpl[32]    := 5;
}{
XP[33]          := 0;
YP[33]          := 1;
ZP[33]          := 71;
EchoAmpl[33]    := 5;
}{
XP[34]          := 0;
YP[34]          := 1;
ZP[34]          := 71;
EchoAmpl[34]    := 5;
}

{*-------------------ECHO AMPL REASSIGNMEMT--------------------*}
if Reassign_Echo_Ampl then
begin
  Universal_Ampl := 1;
  writeln('****REASSIGNING ALL POINT AMPLITUDES TO ',Universal_Ampl);
  for PN := 1 to NumPoints do
    EchoAmpl[PN] := Universal_Ampl;
end;
```

```
{*******************************}
{*****---POINT REASSIGNMENT---*****}
{    XP[1]        := 8.660 ;           }
{    YP[1]        := 5 ;               }
{    ZP[1]        := ZP[1];            }
{    EchoAmpl[1]  := 1;                }
{*****---FOR OBJECT SCANNING---*****}
{**    OR OBJECT DECOMPOSITION    **}
{*******************************}

{RECON PARAMETERS}
SampleInt   := 0.66666666;  {microsec}
NumSamples  := 250;
ReconRes    := 1;
PulseWidth  := 1;

X_tomo      := 0;         { YZ tomogram location}
Z_tomo      := 71;        { YX tomogram location} pixelrange  := 99;{max nomalization value}

XlBound     := - 10                   {- 10};
XuBound     :=   10                   {  10};

YlBound     :=  -10                   {- 10};
YuBound     :=   10                   {  10};

ZlBound     :=   65                   { 65 };
ZuBound     :=   75                   { 75 };

{...........COMPUTE THE TRANSMITTER ELEMENT COORDINATES................}

NumXmtrEle := NumXmtrEleRingNum1 + NumXmtrEleRingNum2 +
                NumXmtrEleRingNum3 + NumXmtrEleRingNum4;
  writeln('NumXmtrEle = ',NumXmtrEle,'  !!!!!!!!!!');

for EleNum := 1 to NumXmtrEleRingNum1 do {find transmitter element
coordinates}
      begin
      XT[EleNum] :=XmtrRingNum1Rad*cos((2*PI/NumXmtrEleRingNum1)*EleNum +PI/2);
      YT[EleNum] :=XmtrRingNum1Rad*sin((2*PI/NumXmtrEleRingNum1)*EleNum +PI/2);
      ZT[EleNum] :=XmtrRingNum1Offs;
      end;

{*******************************}
{*-TRANSMITTER COORD REASSIGNMENT-**}
{   writeln('');                       }
{   writeln('REASSIGNING XMITTR COORDS');}
{   writeln('');                       }
```

```
{                                         }
{   XT[1] := -22;                         }
{   YT[1] := -12;                         }
{   ZT[1] := 0;                           }
{                                         }
{   XT[2] :=                              }
{   YT[2] :=                              }
{   ZT[2] :=                              }
{                                         }
{   XT[3] :=                              }
{   YT[3] :=                              }
{   ZT[3] :=                              }
{*****************************************} for EleNum := 1 to NumXmtrEleRingNum1 do
    writeln('RING1.. TN',EleNum,' (',round(XT[EleNum]),','
            ,round(YT[EleNum]),',',round(ZT[EleNum]),')');
  writeln('FORMING TRANSMITTER RING 1 CONFIGURATION TEXT FILE
"xmtrcon1.dat"...');
  assign(xmtrcon1,'xmtrcon1.dat');
  rewrite(xmtrcon1);
  for EleNum := 1 to NumXmtrEleRingNum1 do
    writeln(xmtrcon1,'TN',EleNum,' (',round(XT[EleNum]),','
            ,round(YT[EleNum]),',',round(ZT[EleNum]),')');
  close(xmtrcon1);

If (NumXmtrEleRingNum2 > 0) then
  begin
  for EleNum    := (NumXmtrEleRingNum1 + 1) to
                   (NumXmtrEleRingNum1 + NumXmtrEleRingNum2) do
                   {find transmitter element coordinates}
    begin
    XT[EleNum]   := XmtrRingNum2Rad * cos((2*PI/NumXmtrEleRingNum2)*EleNum);
    YT[EleNum]   := XmtrRingNum2Rad * sin((2*PI/NumXmtrEleRingNum2)*EleNum);
    ZT[EleNum]   := XmtrRingNum2Offs;
    end;

for EleNum := (NumXmtrEleRingNum1 + 1) to (NumXmtrEleRingNum1 +
                 NumXmtrEleRingNum2)   do
    writeln('RING2.. TN',EleNum,' (',round(XT[EleNum]),','
            ,round(YT[EleNum]),',',round(ZT[EleNum]),')');
  writeln('FORMING TRANSMITTER RING 2 CONFIGURATION TEXT FILE
"xmtrcon2.dat"...');
  assign(xmtrcon2,'xmtrcon2.dat');
  rewrite(xmtrcon2);
  for EleNum := (NumXmtrEleRingNum1 + 1) to (NumXmtrEleRingNum1 +
                 NumXmtrEleRingNum2)   do
    writeln(xmtrcon2,'TN',EleNum,' (',round(XT[EleNum]),','
```

```
           ,round(YT[EleNum]),',',round(ZT[EleNum]),')');
  close(xmtrcon2);
  end;

If (NumXmtrEleRingNum3 > 0) then
  begin
  for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
    begin
    XT[EleNum] :=XmtrRingNum3Rad * cos((2*PI/NumXmtrEleRingNum3)*EleNum
+PI/2);
    YT[EleNum] :=XmtrRingNum3Rad * sin((2*PI/NumXmtrEleRingNum3)*EleNum
+PI/2);
    ZT[EleNum] :=XmtrRingNum3Offs;
    end;
  for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
    writeln('RING3.. TN',EleNum,' (',round(XT[EleNum]),','
              ,round(YT[EleNum]),',',round(ZT[EleNum]),')');
  writeln('FORMING TRANSMITTER RING 3 CONFIGURATION TEXT FILE
"xmtrcon3.dat"...');
  assign(xmtrcon3,'xmtrcon3.dat');
  rewrite(xmtrcon3);
  for EleNum    := (NumXmtrEleRingNum1 + NumXmtrEleRingNum2 + 1) to
                  (NumXmtrEleRingNum1 + NumXmtrEleRingNum2 +
                   NumXmtrEleRingnum3) do
    writeln(xmtrcon3,'TN',EleNum,' (',round(XT[EleNum]),','
              ,round(YT[EleNum]),')',round(ZT[EleNum]));
  close(xmtrcon3);
  end;

If (NumXmtrEleRingNum4 > 0 ) then
  begin
  for EleNum    := (NumXmtrEleRingNum1 + NumXmtrEleRingNum2 +
                   NumXmtrEleRingNum3 + 1) to
                  (NumXmtrEleRingNum1 + NumXmtrEleRingNum2 +
                   NumXmtrEleRingnum3 + NumXmtrEleRingnum4) do
    begin
    XT[EleNum]   :=  XmtrRingNum4Rad * cos((2*PI/NumXmtrEleRingNum4)*EleNum);
    YT[EleNum]   :=  XmtrRingNum4Rad * sin((2*PI/NumXmtrEleRingNum4)*EleNum);
    ZT[EleNum]   :=  XmtrRingNum4Offs;
    end;

for EleNum    := (NumXmtrEleRingNum1 + NumXmtrEleRingNum2 +
                   NumXmtrEleRingNum3 + 1) to
                  (NumXmtrEleRingNum1 + NumXmtrEleRingNum2 +
                   NumXmtrEleRingnum3 + NumXmtrEleRingnum4) do
    writeln('RING4.. TN',EleNum,' (',round(XT[EleNum]),','
```

```
                ,round(YT[EleNum]),',',round(ZT[EleNum]),')');
  writeln('FORMING TRANSMITTER RING 4 CONFIGURATION TEXT FILE
"xmtrcon4.dat"...');
  assign(xmtrcon4,'xmtrcon4.dat');
  rewrite(xmtrcon4);

for EleNum    := (NumXmtrEleRingNum1 + NumXmtrEleRingNum2 +
                    NumXmtrEleRingNum3 + 1) to
                   (NumXmtrEleRingNum1 + NumXmtrEleRingNum2 +
                    NumXmtrEleRingnum3 + NumXmtrEleRingnum4) do
    writeln(xmtrcon4,'TN',EleNum,' (',round(XT[EleNum]),','
            ,round(YT[EleNum]),',',round(ZT[EleNum]));
  close(xmtrcon4);
  end;

{.................COMPUTE THE RECEIVER ELEMENT COORDINATES...............}
  for EleNum    := 1 to NumRcvrEle do {find receiver element coordinates}
    begin
    XE[EleNum]   := RcvrRad * cos((2*PI/NumRcvrEle)*EleNum+PI/2);
    YE[EleNum]   := RcvrRad * sin((2*PI/NumRcvrEle)*EleNum+PI/2);
    end;
  writeln('COMPUTING RECEIVER ELEMENT COORDINATES....');
  for EleNum := 1 to NumRcvrEle do
    writeln('EN',EleNum,' (',round(XE[EleNum]),',',round(YE[EleNum]),')');
  writeln('FORMING RECEIVER CONFIGURATION TEXT FILE "rcvrconf.dat"...');
  assign(rcvrconf,'rcvrconf.dat');
  rewrite(rcvrconf);
  for EleNum := 1 to NumRcvrEle do
    writeln(rcvrconf,'EN',EleNum,'
(',round(XE[EleNum]),',',round(YE[EleNum]),')');
  close(rcvrconf);

end; {default_configuration} procedure configure_simulation;
var
   ans, dummychar : char;
begin
   writeln(' Accept Default simulation Configuration?? y/n  ');
   if DoDefault = true then
     default_configuration;
   if DoDefault = false then
     begin
       repeat
         begin
           ans := ReadKey;    {read(kbd,ans)}
           if ans = 'y' then
             default_configuration
           else
```

```
                default_configuration; {reconfigure;}
          end;
        until (ans = 'y') or (ans = 'n');
     end;
end; {configure_simulation}
```

```
{------------------------------------------------------------}
{                   LOCATION OF ZEROTH NODE                  }
{                                                            }
{                  system has been configured                }
{------------------------------------------------------------}
```

```
procedure do_time_history;
   var
      TimeHistory   : array[1..MaxNumSamples,
                            1..MaxNumRcvrEle] of single;
      TN            : integer;

procedure generate_time_histories;
   var

EchoRecord    : array[1..MaxNumRcvrEle,
                            1..MaxNumPoints] of boolean;
      RTP           : single;
      RPE           : single;
      RR            : single;
      TOF           : single;
      EN            : integer;
      PN            : integer;
      RRint         : integer;
      begin
       if Nonlinear_Proc_TH then
          begin
             writeln(' ');
             writeln('!!! NONLINEAR PROCESSING OF TH COMBINATION IS ACTIVE');
             writeln('      -> COMPRESSION RATIO IS : ', NumSqr,' / ',NumSqrRt);
             writeln(' ');
          end;
        writeln(' ');
        writeln('GENERATING TIME HISTORY.... NUMBER OF SAMPLES = ',NumSamples);
        for EN := 1 to NumRcvrEle do   {initialize}
           for PN := 1 to NumPoints do
              for SampleNum := 1 to NumSamples do
                 begin
                    EchoRecord[EN,PN] := false;
                    TimeHistory[SampleNum,EN] := 0;
                 end;
```

```pascal
    for EN := 1 to NumRcvrEle do
      begin
      writeln('EN= ',EN,' ---------------------------------------');
      for PN := 1 to NumPoints do
        begin
        write('        PN= ',PN);
        for SampleNum := 1 to NumSamples do
          begin
          RTP              := sqrt(sqr(XP[PN]-XT[TN])+sqr(YP[PN]-YT[TN])
                                   +sqr(ZP[PN]-ZT[TN]));
          RPE              := sqrt(sqr(XP[PN]-XE[EN])+sqr(YP[PN]-YE[EN])
                                   +sqr(ZP[PN]));
          RR               := RPE + RTP;
          RRint            := round(RR);
          TOF              := SampleNum * SampleInt ;
           {if ( ( ABS((TOF * Speed) - RR) <= (0.499 * Sampleint * Speed) )
              or (TOF * Speed > RR) )
              and ( EchoRecord[EN,PN]=false )
            then}
            if ( (TOF * Speed) >= RRint )
               and (EchoRecord[EN,PN] = false) then
            begin
             TimeHistory[SampleNum,EN] := TimeHistory[SampleNum,EN]
                                          + EchoAmpl[PN];
             EchoRecord[EN,PN]  := true;
             writeln('   echo recorded');
            end
            else
            begin
             TimeHistory[Samplenum,EN] := TimeHistory[SampleNum,EN]
                                          + 0;
            end;
           If (ShowTimeHistory = true)
            then
              writeln('TIME HISTORY..',
                     ' TN=',TN,' EN=',EN,' PN=',PN,
                     ' ER=',EchoRecord[EN,PN],
                     ' SN=',Samplenum,
                     ' TH=',round(TimeHistory[SampleNum,EN]),
                     ' RR=',round(RR), 'RTP=',round(RTP),'
RPE=',round(RPE));
          end;{for SampleNum}
        end;{for PN}
      end;{for EN}
    end; {procedure generate_time_histories} procedure back_difference;
  var
    EN                   : integer;
    SampleNum            : integer;
```

```pascal
    DifTimeHistory       : array[1..MaxNumSamples] of single;

begin
   writeln('BACK DIFFERENCING TIME HISTORY...');
   for EN := 1 to NumRcvrEle  do
     begin
     for SampleNum := 2 to NumSamples   do
       DifTimeHistory[SampleNum] := TimeHistory[SampleNum,EN]
                                       - TimeHistory[(SampleNum - 1),EN];
       for SampleNum := 2 to NumSamples do
         TimeHistory[SampleNum,EN] := DifTimeHistory[SampleNum];
     end;
  end; {procedure back_difference} procedure fore_difference;
   var
   EN                   : integer;
   SampleNum            : integer;
   DifTimeHistory       : array[1..MaxNumSamples,1..MaxNumRcvrEle] of single;

begin
     writeln('FORWARD DIFFERENCING TIME HISTORY...');
     for EN := 1 to NumRcvrEle  do
       for SampleNum := 1 to NumSamples - 1  do
         DifTimeHistory[SampleNum,EN] := TimeHistory[SampleNum,EN]
                                       - TimeHistory[(SampleNum + 1),EN];
     for EN := 1 to NumRcvrEle do
       for SampleNum := 1 to NumSamples - 1 do
         TimeHistory[SampleNum,EN] := DifTimeHistory[SampleNum,EN];
   end; {procedure fore_difference} procedure sinc_filter;
   var
   EN                   : integer;
   SampleNum            : integer;
   DifTimeHistory       : array[1..MaxNumSamples] of single;

begin
     writeln('SINC FILTERING TIME HISTORY...');
     for EN := 1 to NumRcvrEle  do
       begin
       for SampleNum := 2 to NumSamples - 1  do
         DifTimeHistory[SampleNum] := TimeHistory[SampleNum,EN]
                                    - 0.5 * TimeHistory[(SampleNum - 1),EN]
                                    - 0.5 * TimeHistory[(SampleNum + 1),EN];
         for SampleNum := 2 to NumSamples - 1  do
           TimeHistory[SampleNum,EN] := DifTimeHistory[SampleNum];
       end:
   end; {procedure sinc_filter}
```

```
procedure hilb_filter;
  var
    EN                  : integer;
    SampleNum           : integer;
    DifTimeHistory      : array[1..MaxNumSamples] of single;

begin
    writeln('HILB FILTERING TIME HISTORY...');
    for EN := 1 to NumRcvrEle  do
      begin
        for SampleNum := 3 to NumSamples - 2  do
          DifTimeHistory[SampleNum] :=
                                      FC1 * TimeHistory[(SampleNum - 1),EN]
                                    + FC2 * TimeHistory[(SampleNum - 2),EN]
                                    + FC3 * TimeHistory[SampleNum,EN]
                                    + FC4 * TimeHistory[(SampleNum + 1),EN]
                                    + FC5 * TimeHistory[(SampleNum + 2),EN]
;
        for SampleNum := 3 to NumSamples - 2  do
          TimeHistory[SampleNum,EN] := DifTimeHistory[SampleNum];
      end;
  end; {procedure hilb_filter} procedure save_time_histories;
  type
    sample          = single;
  var
    EN              : integer;
    tim_hist        : file of sample;
    TNS             : string[2];
    timhistTN       : string[11];

begin
    writeln('SAVING BINARY TIME HISTORIES IN FILES tim_hist.',TN,'....');
    str(TN,TNS);{make hard disk file names}
    timhistTN := concat('tim_hist.',TNS);
    assign(tim_hist,timhistTN);{make individual files for each xmitter}
    rewrite(tim_hist);
    for EN := 1 to NumRcvrEle do
      for SampleNum := 1 to NumSamples do
        begin
          write(tim_hist,TimeHistory[SampleNum,EN]);
          {writeln('SAVED BINARY TIME HISTORY=',TimeHistory[SampleNum,EN]:2,
                  ' SampleNum=',SampleNum:3,' EN=',EN,' TN=',TN);}
        end;
    close(tim_hist);
  end{procedure save_time_histories};

procedure record_time_histories;
```

```pascal
var
  EN              : integer;
  echo_hist       : text;
  TNS             : string[2];
  echohistTN      : string[10];

begin {write time histories to text file if option selected} writeln('WRITING TIME HISTORY TO TEXT FILE echohist.',TN,'..... ');
  str(TN,TNS);{make hard disk file names}
  echohistTN := concat('echohist.',TNS);
  assign(echo_hist,echohistTN);
  rewrite(echo_hist);
  writeln(echo_hist,
   ' S  E E E E E E E E E E E E E E E E E E E E E E E E E E E E E E E
');
  writeln(echo_hist,
   ' M  N N N N N N N N N N N N N N N N N N N N N N N N N N N N N N N
');
  writeln(echo_hist,
   ' P  0 0 0 0 0 0 0 0 0 0 1 1 1 1 1 1 1 1 1 1 2 2 2 2 2 2 2 2 2 2 3 3 3
');
  writeln(echo_hist,
   ' #  1 2 3 4 5 6 7 8 9 0 1 2 3 4 5 6 7 8 9 0 1 2 3 4 5 6 7 8 9 0 1 2
');
  for SampleNum := 1 to NumSamples do
    begin
      write(echo_hist,SampleNum:3);
      for EN := 1 to NumRcvrEle do
        begin
          write(echo_hist, round(TimeHistory[SampleNum,EN]):2);
        end;{for EN}
      writeln(echo_hist);
    end;{for SampleNum}
  close(echo_hist);
end {procedure record_time_histories};

procedure compress TH;

type
    SqrCountertype      = 1..100;
    SqrRtCountertype    = 1..100;

var
    IntermediateValue   : single;
    SqrCounter          : SqrCountertype;
    SqrRtCounter        : SqrRtCountertype;
    EN                  : integer;
```

```
    begin
      writeln('COMPRESSING TIME HISTORIES');
      for SampleNum := 1 to NumSamples do
        begin
          for EN := 1 to NumRcvrEle do
            begin
              IntermediateValue := TimeHistory[SampleNum,EN];
              for SqrCounter := (1 + 1) to NumSqr do
                IntermediateValue :=
                  TimeHistory[SampleNum,EN] * IntermediateValue;
              for SqrRtCounter := (1 + 1) to NumSqrRt do
                IntermediateValue := sqrt(IntermediateValue);
              TimeHistory[SampleNum,EN] := round(IntermediateValue);
            end;{for EN}
        end;{for SampleNum}
    end {procedure compress_TH};

begin {procedure do_time_histories}
    for TN := 1 to NumXmtrEle do
      begin
        writeln('***GENERATING & SAVING TIME HISTORY FOR TRANSMITTER NUMBER ',TN);
        generate_time_histories;
        if Back_Diff then
          back_difference;
        if Fore_Back_Diff then
          begin
           if odd(TN) then
            back_difference
            else
            fore_difference;
          end;
        if Sinc_Filter_Diff then
          sinc_filter;
        if Hilb_Filter_Diff then
          hilb_filter;
        if TH_TextFile then;
          record_time_histories;
        if NonLinear_Proc_TH then
          compress_TH;
        save_time_histories;
      end
  end; {procedure do_time_history}

{------------------------------------------------------------------}
{                    LOCATION OF FIRST NODE                        }
{              time histories have been generated                  }
{                      and saved on disk                           }
{------------------------------------------------------------------}
```

```
procedure make_3D_image;

var

TimeHistory     : array[1..MaxNumSamples,
                              1..MaxNumRcvrEle] of single;
      PR              : array[MinX..MaxX,MinY..MaxY,
                              MinZ..MaxZ] of single;
      PRMAX           : single;

echo_hist       : text;
      EN              : integer;
      TN              : integer;

procedure initialize_voxels ;
   var
      XR              : integer;
      YR              : integer;
      ZR              : integer;

begin {initialize}
      for XR := XlBound to XuBound do
        for YR := YlBound to YuBound do
          for  ZR := ZlBound to ZuBound do
            PR[XR,YR,ZR] := 0;
      PRMAX := 0;
   end; {procedure initialize_voxels} procedure load_time_history;
   type
      sample          = single;
   var
      EN              : integer;
      tim_hist        : file of sample;
      TNS             : string[2];
      timhistTN       : string[11];

begin
      writeln('LOADING TIME HISTORY FOR TRANSMITTER NUMBER ',TN,'...');
      for EN := 1 to NumRcvrEle do                {initialize time history
arrays}
         for SampleNum := 1 to NumSamples do
           TimeHistory[SampleNum,EN] := 0;
      str(TN,TNS);                                {derive hard disk file name}
      timhistTN := concat('tim_hist.',TNS);                  {tim_hist.TN}
      assign(tim_hist,timhistTN);                  {equate with file variable}
      reset(tim_hist);                                       {open the file}
      for EN := 1 to NumRcvrEle do                 {read disk data into time}
        for SampleNum := 1 to NumSamples do                  {history array}
          read(tim_hist,TimeHistory[SampleNum,EN]);
```

```pascal
    close(tim_hist);
  end;{procedure load_time_history} procedure decompress_PR;

type
    SqrCountertype        = 1..100;
    SqrRtCountertype      = 1..100;

var
    IntermediateValue     : single;
    SqrCounter            : SqrCountertype;
    SqrRtCounter          : SqrRtCountertype;
    XR                    : integer;
    YR                    : integer;
    ZR                    : integer;

begin
      writeln('DECOMPRESSING RECONSTRUCTED VOXELS, "PR" ');
      for XR := Xlbound to Xubound do
        begin
          for YR := Ylbound to Yubound do
            begin
              for ZR := Zlbound to Zubound do
                begin
                IntermediateValue := PR[XR,YR,ZR];
                for SqrCounter := (1 + 1) to NumSqrRT do
                  begin
                  {writeln('sqr ');}
                  IntermediateValue :=
                    PR[XR,YR,ZR] * IntermediateValue;
                  end;
                for SqrRtCounter := (1 + 1) to NumSqr do
                  begin
                  {writeln('sqrt ');}
                  IntermediateValue := sqrt(IntermediateValue);
                  end;
                PR[XR,YR,ZR] := round(IntermediateValue);
                end;{for ZR}
            end;{for YR}
        end;{for XR}
    end {procedure decompress_PR};

procedure recon_image ;

var

PRt             : real;
```

```
    XR              : integer;
    YR              : integer;
    ZR              : integer;

EN              : integer;

RTP             : single;
    RPE             : single;
    RR              : single;

SampleLoc       : integer;

begin
writeln('DOING standard IMAGE RECONSTRUCTION FOR TRANSMITTER ',TN);
if (Log_Sum_PRs) then writeln('          !!!!!!Log_Sum_PRs IS ON!!!!!');
writeln('XBOUND = ',XlBound:3,' to ',XuBound:3,
        ' YBOUND = ',YlBound:3,' to ',YuBound:3,
        ' ZBOUND = ',ZlBound:3,' to ',ZuBound:3);
    for XR := XlBound to XuBound do
      begin
      write('.');
      for YR := YlBound to YuBound do
        for  ZR := ZlBound to ZuBound do
          begin
            PRt := 0;
            for  EN := 1 to NumRcvrEle do
              begin
                RTP       := sqrt(sqr(XR-XT[TN])+sqr(YR-YT[TN])+sqr(ZR-
ZT[TN]));
                RPE       := sqrt(sqr(XR-XE[EN])+sqr(YR-YE[EN])+sqr(ZR));
                RR        := RPE + RTP;
                SampleLoc := round(RR / (SampleInt * speed));
                PRt       := PRt + TimeHistory[ SampleLoc,EN];
              end; { for EN}
            if (Log_Sum_PRs) then
              begin
              if (PRt <= 0.0001) then PRt := 0.0001;
              PR[XR,YR,ZR] := PR[XR,YR,ZR] + 20 * ln(PRt) / ln(10);
              end
            else
              begin
              PR[XR,YR,ZR] := PR[XR,YR,ZR] + PRt;
              end;
          end;{for ZR}
      end;{for XR}
writeln('IMAGE RECONSTRUCTION DONE *********');
end; { procedure recon_image} procedure nl_mul_TH_recon_image :
```

```
var

XR              : integer;
    YR              : integer;
    ZR              : integer;

EN              : integer;

RTP             : single;
    RPE             : single;
    RR              : single;

SampleLoc       : integer;

PSF             : single;

begin
writeln('DOING nl_mul_TH IMAGE RECONSTRUCTION FOR TRANSMITTER ',TN);
writeln('XBOUND = ',XlBound:3,' to ',XuBound:3,
      ' YBOUND = ',YlBound:3,' to ',YuBound:3,
      ' ZBOUND = ',ZlBound:3,' to ',ZuBound:3);

for XR := XlBound to XuBound do
   begin
     write('.');
     for YR := YlBound to YuBound do
     begin
       for  ZR := ZlBound to ZuBound do
       begin
         PSF := 1; {must be init. to 1 for mult. proc.}
         for  EN := 1 to NumRcvrEle do
         begin
           RTP       := sqrt(sqr(XR-XT[TN])+sqr(YR-YT[TN])+sqr(ZR-ZT[TN]));
           RPE       := sqrt(sqr(XR-XE[EN])+sqr(YR-YE[EN])+sqr(ZR));
           RR        := RPE + RTP;
           SampleLoc := round(RR / (SampleInt * speed));
           PSF       := PSF * TimeHistory[SampleLoc,EN];
         end;{for EN}
         PR[XR,YR,ZR]   := PR[XR,YR,ZR] + PSF;
       end;{for ZR}
     end;{for YR}
   end;{for XR} writeln('NL_MUL_TH_IMAGE RECONSTRUCTION DONE FOR TN= ',TN,' ********');
end; { procedure nl_mul_TH_recon_image} procedure nl_xmtr_recon_image ;

type
```

```
  SqrCountertype           = 1..100;
  SqrRtCountertype         = 1..100;

var
  IntermediateValue        : single;
  SqrCounter               : SqrCountertype;
  SqrRtCounter             : SqrRtCountertype;

XR              : integer;
  YR              : integer;
  ZR              : integer;

EN              : integer;

RTP             : single;
  RPE             : single;
  RR              : single;

SampleLoc       : integer;

begin
writeln('DOING nl_xmittr IMAGE RECONSTRUCTION FOR TRANSMITTER ',TN);
writeln('XBOUND = ',XlBound:3,' to ',XuBound:3,
    '  YBOUND = ',YlBound:3,' to ',YuBound:3,
    '  ZBOUND = ',ZlBound:3,' to ',ZuBound:3);
   for XR := XlBound to XuBound do
     begin
     write('.');
     for YR := YlBound to YuBound do
       begin
       for ZR := ZlBound to ZuBound do
         begin
         IntermediateValue := 0;
         for  EN := 1 to NumRcvrEle do
           begin
           RTP   := sqrt(sqr(XR-XT[TN])+sqr(YR-YT[TN])+sqr(ZR-ZT[TN]));
           RPE   := sqrt(sqr(XR-XE[EN])+sqr(YR-YE[EN])+sqr(ZR));
           RR    := RPE + RTP;
           SampleLoc   := round(RR / (SampleInt * speed));
           IntermediateValue :=
                     IntermediateValue +  TimeHistory[ SampleLoc,EN];
           end;{for EN}
         {write(' ',round(IntermediateValue):3);}
         for SqrCounter := (1 + 1) to NumSqr do
           begin
           {writeln('sqr ');}
           IntermediateValue :=
             IntermediateValue * IntermediateValue;
           end;
         for SqrRtCounter := (1 + 1) to NumSqrRt do
```

```
              begin
              {writeln('sqrt ');}
              IntermediateValue := sqrt(IntermediateValue);
              end;
            PR[XR,YR,ZR] := PR[XR,YR,ZR] + round(IntermediateValue);
          end;{for ZR}
        end;{for YR}
      end;{for XR}
  writeln('NL TRANSMITTER IMAGE RECONSTRUCTION DONE *********');
  end; { procedure nl_xmtr_recon_image} procedure normalize_voxels;

var
    PRMAX    : single;
    XR       : integer;
    YR       : integer;
    ZR       : integer;
      begin
      writeln('*******NORMALIZING VOXELS.......');
      PRMAX := 1;
       for XR := XlBound to XuBound do
         for YR := YlBound to YuBound do
           for ZR := ZlBound to ZuBound do
             if PR[XR,YR,ZR] > PRMAX then
               PRMAX := PR[XR,YR,ZR];
      writeln('PRMAX = ',PRMAX);
      for XR := XlBound to XuBound do
        for YR := YlBound to YuBound do
          for ZR := ZlBound to ZuBound do
          begin
          {write('PR before= ',PR[XR,YR,ZR]);}
          PR[XR,YR,ZR] := round(PR[XR,YR,ZR]/PRMAX*99);
          {write(' PR after= ',PR[XR,YR,ZR]);}
          {writeln(' PRMAX= ',PRMAX);}
          end;
      end; {procedure normalize_voxels} procedure truncate_voxels;

var
    XR              : integer;
    YR                : integer;
    ZR              : integer;

begin
    writeln('*******TRUNCATING VOXEL BACKGROUND AT ',(VoxelTruncLevel -
1),'...');
      for XR := XlBound to XuBound do
        for YR := YlBound to YuBound do
```

```
        for ZR := ZlBound to ZuBound do
          begin
          if PR[XR,YR,ZR] < VoxelTruncLevel then
          PR[XR,YR,ZR] := 0;
          end;
    end; {procedure truncate voxels} procedure log_voxels;

var
    XR              : integer;
    YR              : integer;
    ZR              : integer;
    TruncatePR      : single;
    LogPR           : single;
    PRMAX           : single;

begin
    writeln('******* CONVERTS ALL VOXELS TO DECIBELS...');
    writeln('         ....TRUNCATES BELOW ONE BEFORE 20 LOGGING...');
    writeln('         .......CONVERTS RESULTING PR dbs TO INTEGERS.....');

if NormalizeVoxels_80db then
      begin
      writeln('***** NORMALIZING VOXELS TO 10,000 (80db) .......');
      PRMAX := 1;
      for XR := XlBound to XuBound do
        for YR := YlBound to YuBound do
          for ZR := ZlBound to ZuBound do
            if PR[XR,YR,ZR] > PRMAX then
              PRMAX := PR[XR,YR,ZR];
      writeln('PRMAX = ',PRMAX);
      for XR := XlBound to XuBound do
        for YR := YlBound to YuBound do
          for ZR := ZlBound to ZuBound do
          begin
          {write('PR before= ',PR[XR,YR,ZR]);}
          PR[XR,YR,ZR] := round(PR[XR,YR,ZR]/PRMAX*99);
          {write(' PR after= ',PR[XR,YR,ZR]);}
          {writeln(' PRMAX= ',PRMAX);}
          end;
      end; {NORMALIZING VOXELS} for XR := XlBound to XuBound do
      for YR := YlBound to YuBound do
        for ZR := ZlBound to ZuBound do
          begin
            if PR[XR,YR,ZR] < 1
              then  PR[XR,YR,ZR] := 1 ;
```

```
            TruncatePR          := PR[XR,YR,ZR];
            LogPR               := 20 * ln(TruncatePR) / ln(10);
            PR[XR,YR,ZR]        := round(LogPR);
          end;
    end; {procedure log_voxels} procedure save_3D_Image;
  type
    point      = single;
  var
    XR         : integer;
    YR         : integer;
    ZR         : integer;
    image_3d   : file of point;
    begin
    writeln('SAVING BINARY 3D IMAGE IN FILE "image_3d.dat"....');
    assign(image_3d,'image_3d.dat');
    rewrite(image_3d);
    for XR := XlBound to XuBound do
      for YR := YlBound to YuBound do
        for ZR := ZlBound to ZuBound do
          write(image_3d,PR[XR,YR,ZR]);
    write(image_3d,PRMAX);
    close(image_3d);
    end; {procedure save_3D_Image} procedure save_3D_pik;

var
    pik_3d     : text;
    XR         : integer;
    YR         : integer;
    ZR         : integer;

begin
    writeln('SAVING 3D IMAGE IN FILE "pik_3d.dat"....');
    assign(pik_3d,'pik_3d.dat');
    rewrite(pik_3d);
    for XR := XlBound to XuBound do
      for YR := YlBound to YuBound do
        for ZR := ZlBound to ZuBound do
          write(pik_3d,PR[XR,YR,ZR]);
    close(pik_3d);
    end; {procedure save_3D_pik} begin {Make_3D_Image}
    initialize_voxels;
    for TN := 1 to NumXmtrEle do
      begin {recon for TN = i and sum into 3D image voxels}
```

```
       load_time_history;{download time history for a particular xmitter}
       if not (NonLinear_Proc_Xmtrs or NL_Mul_TH_Proc) then
          recon_image;
       if NonLinear_Proc_Xmtrs then
          NL_xmtr_recon_image;
       if NL_Mul_TH_Proc then
          NL_Mul_TH_Recon_Image;
     end;    {separate xmitter images have been summed or combined}
  if NonLinear_Proc_TH or NonLinear_Proc_xmtrs then
     decompress_PR;
  if NormalizeVoxels then
     normalize_voxels;
  if Trunc_Voxel_Background then
     truncate_voxels;
  if LogVoxels then
     log_voxels;
  save_3D_Image;        {save in a binary file}
  if Save_3D_Pix_Text then
     save_3D_pik;       {save in a text file}
 end; {procedure make_3D_image}

{----------------------------------------------------------}
{              LOCATION OF SECOND NODE                     }
{           a three dimensional image has been             }
{              reconstructed and saved on disk             }
{----------------------------------------------------------} procedure form_2D_view;

var
      PR            : array[MinX..MaxX,MinY..MaxY,
                            MinZ..Maxz] of single;
      PYZ           : array[MinY..MaxY,MinZ..MaxZ]
                            of integer;
      PYX           : array[MinY..MaxY,MinX..MaxX]
                            of integer;

PXS           : array[MinY..MaxY,MinZ..MaxZ]
                            of integer;

PZS           : array[MinX..MaxX,MinY..MaxY]
                            of integer;

PRMAX         : single;

XV            : integer;
      YV            : integer;

procedure load_3D_image;
```

```
type
  point           = single;

var
  image_3d        : file of point;
  XR              : integer;
  YR              : integer;
  ZR              : integer;

begin writeln('LOADING BINARY 3D IMAGE FROM FILE "image_3d.dat"....');
  assign(image_3d,'image_3d.dat');
  reset(image_3d);
  for XR := XlBound to XuBound do
    for YR := YlBound to YuBound do
      for ZR := ZlBound to ZuBound do
        read(image_3d,PR[XR,YR,ZR]);
  read(image_3d,PRMAX);
  close(image_3d);
  end; {procedure load_3D_Image} procedure form_YZtomogram;
  var
    PYZMAX        : integer;
    XV            : integer;
    YV            : integer;
    ZV            : integer;
    XR            : integer;

begin  { form a slice in YZ plane }
    for XV := Ylbound to YuBound do   {initialize}
     for YV := ZlBound to ZuBound do
       PYZ[XV,YV] := 0;
    writeln('FORMING YZ TOMOGRAM...');
    XR := X_tomo;
    for XV := Ylbound to YuBound do
      for YV := ZlBound to ZuBound do
        PYZ[XV,YV] := round(PR[XR,XV,YV]);
    if (TruncNegTomoPixels = true) then
    begin
      for XV := Ylbound to YuBound do
        for YV := ZlBound to ZuBound do
          if (PYZ[XV,YV] < 0) then PYZ[XV,YV] := 0;
    end;
    if (NormalizeTomos = true) then
    begin
      PYZMAX := 1;
      for XV := Ylbound to YuBound do
        for YV := ZlBound to ZuBound do
```

```
          if PYZ[XV,YV] > PYZMAX then
              PYZMAX := PYZ[XV,YV];
        for XV := Ylbound to YuBound do
          for YV := ZlBound to ZuBound do
              PYZ[XV,YV] := round(PYZ[XV,YV] / PYZMAX * pixelrange);
      end
  end; {procedure form yz tomogram} procedure save_YZtomogram;

var
    yztomo           : text;
    XV               : integer;
    YV               : integer;
    ZV               : integer;

begin
    writeln('SAVING YZ TOMOGRAM IN FILE "YZ_tomo.dat"....');
    assign(yztomo,'yz_tomo.dat');
    rewrite(yztomo);
    writeln(yztomo,'        Y Y Y Y Y Y Y Y Y Y Y Y Y Y Y Y Y Y Y');
    writeln(yztomo,'        = = = = = = = = = = = = = = = = = = =');
    write(yztomo,'     ');
    for XV := YlBound to YuBound do
       write(yztomo,XV:3);
    writeln(yztomo);
    for YV := ZlBound to ZuBound do
       begin
       writeln(yztomo);
       write(yztomo,'Z=',YV:3);
       for XV := YlBound to YuBound do
          write(yztomo,PYZ[XV,YV]:3);
       end;
    close(yztomo);
    end; {procedure save_YZtomogram} procedure form_YXtomogram;
  var
    PYXMAX           : integer;
    XV               : integer;
    YV               : integer;
    ZV               : integer;
    ZR               : integer;

begin  { form a slice in YX plane }
      for XV := Ylbound to YuBound do    {initialize}
        for YV := XlBound to XuBound do
           PYX[XV,YV] := 0;
```

```pascal
      writeln('FORMING YX TOMOGRAM...');
      ZR := Z_tomo;
      for XV := Ylbound to YuBound do
       for YV := XlBound to XuBound do
         PYX[XV,YV] := round(PR[YV,XV,ZR]);
      if (TruncNegTomoPixels = true) then
      begin
        for XV := Ylbound to YuBound do
          for YV := XlBound to XuBound do
            if (PYX[XV,YV] < 0) then PYX[XV,YV] := 0;
      end;
      if (NormalizeTomos = true) then
      begin
        PYXMAX := 1;
        for XV := Ylbound to YuBound do
          for YV := XlBound to XuBound do
            if PYX[XV,YV] > PYXMAX then
              PYXMAX := PYX[XV,YV];
        for XV := Ylbound to YuBound do
          for YV := XlBound to XuBound do
            PYX[XV,YV] := round(PYX[XV,YV] / PYXMAX * pixelrange);
      end
  end; {procedure form yx tomogram} procedure save_YXtomogram;

var
    yxtomo        : text;
    XV            : integer;
    YV            : integer;
    ZV            : integer;

begin
    writeln('SAVING YX TOMOGRAM IN FILE "YX_tomo.dat"....');
    assign(yxtomo,'yx_tomo.dat');
    rewrite(yxtomo);
    writeln(yxtomo,'      Y Y Y Y Y Y Y Y Y Y Y Y Y Y Y Y Y Y Y');
    writeln(yxtomo,'      = = = = = = = = = = = = = = = = = = =');
    write(yxtomo,'      ');
    for XV := YlBound to YuBound do
      write(yxtomo,XV:3);
    writeln(yxtomo);
    for YV := XlBound to XuBound do
      begin
      writeln(yxtomo);
      write(yxtomo,'X=',YV:3);
      for XV := YlBound to YuBound do
        write(yxtomo,PYX[XV,YV]:3);
```

```pascal
        end;
    close(yxtomo);
    end; {procedure save_YXtomogram} procedure form_Xshadowgraph;
  var
    PXSMAX          : integer;
    XV              : integer;
    YV              : integer;
    ZV              : integer;
    XR              : integer;

begin  { integrate in X direction}
    writeln('FORMING X SHADOWGRAPH....');
    for XV := Ylbound to YuBound do
      for YV := ZlBound to ZuBound do
        PXS[XV,YV] := 0;
    for XV := Ylbound to YuBound do
      for YV := ZlBound to ZuBound do
        for XR := XlBound to XuBound do
            begin
              if PR[XR,XV,YV] < ShadowBack + 1
                then
                    PXS[XV,YV] := PXS[XV,YV] + 0
                else
                    PXS[XV,YV] := PXS[XV,YV] + round(PR[XR,XV,YV]);
{if (PR[XR,XV,YV] > 2)   then writeln('PXS =',PXS[XV,YV],' PR=',PR[XR,XV,YV]);}
            end;
    if (NormalizeShadows = true) then
      begin
      writeln('NORMALIZING XSHADOWGRAPH...');
      PXSMAX := 1;
      for XV := YlBound to YuBound do
        for YV := ZlBound to ZuBound do
          begin
          if PXS[XV,YV] > PXSMAX then
          PXSMAX := PXS[XV,YV];
          end;
      writeln('PXSMAX = ',PXSMAX);
      for XV := YlBound to YuBound do
        for YV := ZlBound to ZuBound do
          PXS[XV,YV] := round(PXS[XV,YV]/PXSMAX*99);
      end
  end;{procedure form_Xshadowgraph}
  procedure save_Xshadowgraph;

var
      xshadow          : text;
      XV               : integer;
      YV               : integer;
      ZV               : integer;
```

```pascal
    begin
    writeln('SAVING X SHADOWGRAPH IN FILE "XSHADOW.DAT"....');
    assign(xshadow,'xshadow.dat');
    rewrite(xshadow);
    writeln(xshadow,'        Y  Y  Y  Y  Y  Y  Y  Y  Y  Y  Y  Y  Y  Y  Y  Y  Y  Y');
    writeln(xshadow,'        =  =  =  =  =  =  =  =  =  =  =  =  =  =  =  =  =  =');
    write(xshadow,'     ');
    for XV := YlBound to YuBound do
      write(xshadow,XV:3);
    writeln(xshadow);
    for YV := ZlBound to ZuBound do
      begin
        writeln(xshadow);
        write(xshadow,'X=',YV:3);
        for XV := YlBound to YuBound do
          write(xshadow,round(PXS[XV,YV]):3);
      end;
    close(xshadow);
    end; {procedure save_Xshadowgraph} procedure form_Zshadowgraph;
  var
    PZSMAX    : integer;
    XV        : integer;
    YV        : integer;
    ZV        : integer;
    ZR        : integer;
  begin { integrate in Z direction}
    writeln('FORMING Z SHADOWGRAPH....');
    for XV := Xlbound to XuBound do
      for YV := YlBound to YuBound do
        PZS[XV,YV] := 0;
    for XV := Xlbound to XuBound do
      for YV := YlBound to YuBound do
        begin
        for ZR := ZlBound to ZuBound do
          begin
            if PR[XV,YV,ZR] < ShadowBack + 1
              then
                PZS[XV,YV] := PZS[XV,YV] + 0
              else
                PZS[XV,YV] := PZS[XV,YV] + round(PR[XV,YV,ZR]);
          end;
        {writeln('PZS=',PZS[XV,YV],' XV=',XV,' YV=',YV);}
        end;
    if (NormalizeShadows = true) then
      begin
      writeln('NORMALIZING ZSHADOWGRAPH..');
```

```
      PZSMAX := 1;
       for XV := XlBound to XuBound do
          for YV := YlBound to YuBound do
            if PZS[XV,YV] > PZSMAX then
              PZSMAX := PZS[XV,YV];
       writeln('PZSMAX = ',PZSMAX);
       for XV := XlBound to XuBound do
          for YV := YlBound to YuBound do
            begin
            {write('PZS before= ',PZS[XV,YV]);}
            PZS[XV,YV] := round(PZS[XV,YV]/PZSMAX*99);
            {write(' PZS after= ',PZS[XV,YV]);}
            {writeln(' PZSMAX= ',PZSMAX);}
            end;
       end
   end;{procedure form_Zshadowgraph} procedure save_Zshadowgraph;

var
    zshadow          : text;
    XV               : integer;
    YV               : integer;
    ZV               : integer;

begin
   writeln('SAVING Z SHADOWGRAPH IN FILE "ZSHADOW.DAT"....');
   assign(zshadow,'zshadow.dat');
   rewrite(zshadow);
   writeln(zshadow,'          Y Y Y Y Y Y Y Y Y Y Y Y Y Y Y Y Y
 Y Y');
   writeln(zshadow,'          = = = = = = = = = = = = = = = = =
 = =');
   write(zshadow,'     ');
   for XV := XlBound to XuBound do
   writeln(zshadow);
   for YV := YlBound to YuBound do
     begin
       writeln(zshadow);
       write(zshadow,'X=',YV:3);
       for XV := XlBound to XuBound do
         write(zshadow,round(PZS[XV,YV]):3);
     end;
   close(zshadow);
   end; {procedure save_Zshadowgraph} begin
    load_3D_image;
    form_YZtomogram;
    save_YZtomogram;
```

```
    form_YXtomogram;
    save_YXtomogram;
    form_Xshadowgraph;
    save_Xshadowgraph;
    form_Zshadowgraph;
    save_Zshadowgraph;
  end; {procedure form_2D-view}
```

```
{------------------------------------------------------------}
{              LOCATION OF THIRD NODE                        }
{          a three dimensional image has been                }
{          reduced to a two dimensional image                }
{          which can be printed, plotted, or                 }
{                 sent to a frame grabber                    }
{------------------------------------------------------------}
```

{procedure form_RS170_video;}

```
{**********************************************************}
{*              PROGRAM :   SIM.PAS                        *}
{**********************************************************} begin {program SIM}
   if VDisk then change_default_drive;
   if UseDos then use_dos_for_screen;
   configure_simulation;   {define_target;}
   do_time_history;        {generate_time_histories;} {save_time_histories;}
   make_3D_image;          {recon_image;}
   form_2D_view;           {load_3D_image} {form..}
   writeln('***************PROGRAM FINISHED********************');
end. {program SIM}
```

A description of the procedures follow:

change_default_drive: a disk drive utility.

uses_dos_for_screen: can write to screen using dos or may write directly.

default_configuration: automatically runs.

configure_simulation: The main block zero procedure. sets up type of image reconstruction; linear, nonlinear, sets up nonlinear reconstruction parameters. Sets voxel truncation level, if active. Sets up the filter coefficients for the convolution filter (hilb filter) applied to the echo time histories before image reconstruction. Sets the diameter of four rings of transmitter elements, concentric and inside of the ring of receiver elements. Sets the number of transmitter elements in each ring. Sets the number of receiver elements in the receiver ring. Sets the diameter of the receiver ring. Defines the simulated object to be imaged, point by point. An airplane shaped test object is included in the code. Sets the image reconstruction parameters. Sets the x location of the yz tomogram. Sets the z location of the yx tomogram. Sets the pixel normalization value. Defined the bounds of the three dimensional volume to be reconstructed. Computes the coordinates of the array elements.

ZEROTH NODE: (end of block zero) An actual scan head can be attached to the computer (along with interface electronics) or echo time histories, obtained by another, remote, system can be loaded onto the computers hard disk under the appropriate file names. The code in block zero can be modified so that no time histories are generated. The scan head, or array, geometry must match that of the actual array used to obtain the data. In the case of an attached scan head, the interface electronics would comprise circuits similar to fig.5 also having the time history memories of fig.6 but without the summation means. The interface electronics would also contain circuits similar to those in the reference by Platte for driving the transmitter elements. Standard RS 232 electronics along with commonly designed interface circuitry could be used to control the transmitter electronics and access the echo samples from the echo time history memories.
do_time_history: The main block one procedure. Computes echo time histories, and stores them in disk files, given the previously defined configuration.

generate_time_histories: Form the sequences of echo samples for each receiver element, for each transmitter element.

back_difference: Backward differences, if selected, the echo time histories.

fore_difference: Foreword differences, if selected, the echo time histories.

sinc_filter: Convolves a sinc type filter, if selected, with the echo time histories.

hilb_filter: Convolves a special filter, described in a different patent application, if selected, with the time histories.

save_time_histories: Stores the time histories in disk files.

record_time_histories: Puts the time histories in ascii text files for user observation.

compress_TH: Used with nonlinear reconstruction, takes the fractional root of the echo samples.

FIRST NODE: (end of block one) The block one code can be eliminated if actual echo time histories are available as described under block zero.

make_3D_image: The main block two procedure. Uses the echo time histories to reconstruct a three dimensional image and saves it in a disk file.

initialize_voxels: Sets all voxels to zero.

load_time_history: Reads in the echo time history data from disk files.

decompress_PR: Decompresses the reconstructed voxels if nonlinear processing is used.

recon_image: Linearly combines the echo samples to reconstruct the image.

nl_mul_TH_recon_image: Non linearly combines the echo samples to reconstruct the image.

nl_xmitr_recon_image: Non linearly combines the reconstructed images from each transmitter time histories.

normalize_voxels: Normalizes the reconstructed voxels to a selected value.

truncate_voxels: Truncates, if selected, all voxels below a selected value.

log_voxels: Log compresses, if selected, the reconstructed image voxels.

save_3D_image: Writes the reconstructed image to a disk file.

SECOND NODE: (end of block two) Block two code can be augmented by specially designed hardware processor boards which can perform the more computationally intensive algorithms, such as computing the total round trip distance. The code would then be modified to read and write into these boards and the specific algorithm eliminated.

form_2D_view: The main procedure for the third block of code. Forms two dimensional views (shadowgraphs and tomograms) through the 3D image.

load_3D_image: Reads the reconstructed 3D image in from a disk file.

form_YZ_tomogram: Forms a slice through the 3D image in the yz plane.

save_YZ_tomogram: Saves the slice in a disk file.

form_YX_tomogram: Forms a slice through the 3D image in the yx plane.

save_YX_tomogram: Saves the slice in a disk file.

form_Xshadowgraph: Forms a view through (by integration) the 3D image in the x direction.

save_Xshadowgraph: Saves the view in a disk file.

form_Zshadowgraph: Forms a view through (by integration) the 3D image in the z direction.

save_Zshadowgraph: Saves the view in a disk file.

THIRD NODE: End of block three code.

While the above descriptions contains many specifics, these should not be construed as limitations on the scope of the invention, but as an example of several embodiments.

The imaging concept can be implemented with any type of energy that can be transmitted as a spherical, expanding, radiating pulse of short duration with predictable velocity of propagation. The echoes may or may not be of the same type of energy as the transmitted pulse. The velocity of the transmitted energy may be different from the velocity of the echo energy.

The receiver array can be any shape, two dimensional or three dimensional, although circular is typically optimal. The transmitter or transmitters can be located at any position with respect to the receiver array.

The image reconstruction processing may be implemented in hardware or software.

The tomograms may be extracted in a more flexible manner by implementing, in hardware, equations that describe the tomographic plane and then by using these equations to extract voxels from the 3D image to be used as tomographic pixels.

The viewing perspectives through the 3D volume may be made more continuously variable by implementing in hardware the viewing perspective vector and using it to generate 3D memory addresses to access voxels to be summed, thus causing the integration.

The term "active imaging" will mean, for purposes of this patent specification, all imaging systems which purposely emit energy to illuminate the object or volume to be imaged, with the exception of seismic migration systems.

What is claimed is:

1. A three dimensional active imaging device with multiple transmitter, using a reduced number of transmitted pulses to produce a three dimensional image, and capable of generating a three dimensional image of reflecting points on or within objects in a three dimensional volume within which the propagation velocities of the transmitted energy and the echo energy are known, said volume being external to a sparsely spaced two or three dimensional array of plural transmitters and plural receiver elements, comprising:

(a) A Transmitter means for transmitting a pulse of energy which radiates through a wide solid angle within the three dimensional volume;

(b) A Receiver means for detecting echoes, from the reflecting points within the volume, caused by said pulse of energy, simultaneously at three or more of the sparsely spaced receiver elements;

(c) An Echo Time History Memory means for sampling said detected echoes from each of the receiver elements of said receiver means whereby an Echo Time History echo sample set is created which is associated with the transmitter which transmitted the pulse;

(d) A System Timing and Control means for repeating (a) through (c) with other of the plural transmitters whereby a set of echo samples from each of the receiver elements becomes associated with each of the transmitters within the array of plural transmitters;

(e) An Image Reconstruction Processor means for selecting and combining with each other, for each image of a reflecting point, one echo sample from each receiver element from each of the echo sample sets associated with each of the transmitters, whereby an image is created of the reflecting points on or within objects in the three dimensional volume, said Image Reconstruction Processor utilizing for selection, the sum of: distance from the transmitter to the image point divided by the known propagation velocity of the pulse of energy, and distance from the image point to each of the receiver element divided by the known propagation velocity of the echoes, said Image Reconstruction Processor means therefore operating in accordance with the equivalent of the formula:

$$PR(xr,yr,zr) = \Sigma \, echo_{ij}((1/ds)(1/Ct)RTP_i + (1/Ce)RPE_j)$$

for each of the transmitters: $t_1, t_2, \ldots t_i, \ldots t_{nt}$ and
for each of the receivers: $e_1, e_2, \ldots e_j, \ldots e_{ne}$ where i is the transmitter index
j is the receiver element index
PR (xr,yr,zr) is the image of the point at the location (xr,yr,zr)
$t_{nt}$ is the number of transmitter elements
$e_{ne}$ is the number of receiver elements
$echo_{ij}(sn)$ is the echo sample at location "sn" in the echo sample set, $st_ie_j$, where the echoes resulted from the pulse transmitted the transmitter i, and the echoes were detected by receiver element j
ds is the time interval at which the echo samples are taken
Ct is the transmitted energy propagation velocity
Ce is the echo energy propagation velocity which may be equal to Ct, or different from CT
and where $$RTP_i = \sqrt{(xr-xti)^2 + (yr-yti)^2 + (zr-zti)^2}$$

$$RPE_j = \sqrt{(xr-xej)^2 + (yr-yej)^2 + (zr-zej)^2}$$

where also (xti,yti,zti) is the location of transmitter element i
(xrj,yrj,zrj) is the location of receiver element j.

2. A three dimensional active imaging device for generating a three dimensional image of reflecting points on or within objects in a three dimensional volume within which the propagation velocity of transmitted energy and the propagation velocity of echo energy are known, said device using a reduced number of transmitted pulses and utilizing a Receiver means comprising a two or three dimensional array of sparsely spaced receiver elements and a Transmitter means comprising a two or three dimensional array of sparsely spaced transmitter elements, comprising:

(a) The Transmitter means for generating plural pulses of energy which will radiate uniformly through a wide solid angle in the three dimensional volume external to said array;

(b) A System Timing and Control means for activating the first transmitter element means whereby the first pulse of energy is radiated;

(c) The Receiver means for simultaneously detecting echoes, caused by said radiated pulse of energy reflecting from said reflecting points, at three or more of the sparsely spaced receiver elements;

(d) An Echo Processor means for sampling, as a function of time, said detected echoes from each of the receiver elements of said sparsely spaced receiver elements whereby echo samples are generated;

(e) An Image Reconstruction Processor means for combining said samples into points of the image of the three dimensional volume, whereby the image is reconstructed, said means utilizing time of flight associated with the echo samples to determine into which of said image points the echo samples should be combined, wherein said time of flight consists of the sum of: (1) the distance from the transmitter element to the image point divided by the velocity of the transmitted energy, and (2) the distance from the image point to the receiver element divided by the velocity of the echo energy, said time of flight computed according to the equivalent of the following equation, $$TOF(x,y,z) = (1/Ct)RTP_i + (1/Ce)RPE_j$$

for transmitter $t_i$
and for receiver $e_j$
where
TOF(x,y,z) is the time of flight for the image point at (x,y,z), and which is associated with transmitter i and receiver j
Ct is the transmitted energy propagation velocity
Ce is the echo energy propagation velocity which may be equal to Ct, or different from Ct
and also where $$RTP_i = \sqrt{(x-xi)^2 + (y-yi)^2 + (z-zi)^2}$$

is the distance from the transmitter i to the point (x,y,z)

$$RPE_j = \sqrt{(x-xj)^2 + (y-yj)^2 + (z-zj)^2}$$

is the distance from point (x,y,z) to the receiver j
where also ($x_i, y_i, z_i$) is the location of transmitter element i
($x_j, y_j, z_j$) is the location of receiver element j (f) The System Timing and Control means for activating the next of the transmitter elements whereby the next pulse of energy is radiated;

(g) The System Timing and Control means for repeating (c), (d), (e) whereby the echo samples generated by the receiver elements are combined into the image;

(h) The System Timing and Control means for repeating (f) and then (g) for each of the transmitter elements in the plurality of transmitters wherein all of the transmitter elements radiate a pulse of energy and the echo samples received at each of the receiver elements resulting from each of the pulses are combined into the image.

3. A three dimensional active imaging method by which there is generated image points of reflecting points in a three dimensional volume residing outside of a sparse array of plural transmitting and plural sensing elements, where the transmitted energy propagation speed is known and the echo propagation speed is known, comprising the steps;

(a) Transmitting a pulse of energy, from a transmitting element, which will propagate through all of the three dimensional volume to be imaged;

(b) Simultaneously sensing echoes caused by the reflecting points within said volume with a two or three dimensional array of three or more sparsely spaced sensing elements;

(c) Sampling at time interval, dt, the echoes simultaneously sensed at each sensing element whereby a set of echo time histories of sequences of echo samples for all of the sensing elements is created which is associated with the transmitter;

(d) Repeating steps (a), (b) and (c) for each transmitter whereby sets of echo time histories, associated with each transmitter, are created;

(e) Reconstructing one of the image points by selecting and summing together one of said echo samples from each of said echo time histories from each of said sensor elements for each of said echo time history sets associated with each of said transmitters, wherein said echo samples are selected in accordance with the equivalent of the following algorithm:

the echo sample, $echo_{ij}$, from the sensor i echo time history from the echo time history set associated with transmitter j for use in reconstructing the image point at (x,y,z) is:

$echo_{ij}((1/dt)(1/Ct)RTP_i+(1/Ce)RPE_j)$ where
(x,y,z) is the image point of the reflecting point at the location (x,y,z)
$echo_{ij}(sn)$ is the $(sn)^{th}$ sample in the echo time history set, $echo_{ij}$,
where the echoes resulted from the pulse transmitted by the transmitter i, and the echoes were sensed by sensor element j
dt is the time interval at which the echo samples are taken
Ct is the transmitted pulse propagation velocity
Ce is the echo energy propagation velocity which may be equal to Ct, or different from Ct
and where $RTP_i = \sqrt{[(x-xi)^2+(y-yi)^2+(z-zi)^2]}$ $RPE_j = \sqrt{[(x-xj)^2+(y-yj)^2+(z-zj)^2]}$ where also
($x_i, y_i, z_i$) is the location of transmitter element i
($x_j, y_j, z_j$) is the location of receiver element j (f) Repeating step (e) for each image point in the three dimensional volume.

4. The device of claim 1, or claim 2 wherein the energy is an electromagnetic radar pulse.

5. The device of claim 1, or claim 2 wherein the energy is an underwater acoustic sonar pulse.

6. The device of claim 1, or claim 2 wherein the energy is a short pulse of light.

7. The device of claim 1, or claim 2 wherein the energy is an acoustic pulse used for non destructive testing of a solid material.

8. The device of claim 1, or claim 2 wherein the energy is an acoustic ultrasound pulse used for 3D, real time medical imaging.

9. The device according to claim 1 or 2 wherein the energy is a low interference pulse.

10. The device according to claim 1 or 2 wherein the energy is a non interfereing pulse.

11. The device according to claim 1 or 2 wherein the three dimensional image is created in realtime, repetitively approximately very 33 milliseconds.

12. The method according to claim 3 wherein the energy is a low interference pulse.

13. The method according to claim 3 wherein the energy is a non interfering pulse.

14. The device according to claim 4 wherein a new three dimensional image is created in less than 100 milliseconds.

15. The device according to claim 1 or 2 wherein the Image Reconstruction processor is a parallel, pipelines means for combining echo samples to reconstruct the image points, said means having as input the image point coordinates, (xp,yp,zp), comprising:

(a) plural parallel means for computing simultaneously the distances from the receivers to the image point comprising:

(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

16. The device according to claim 4 wherein the Image Reconstruction Processor is a parallel, pipelined means for combining echo samples to reconstruct the image points, said means having as input the image point coordinates, (xp,yp,zp), comprising:

(a) plural parallel means for computing simultaneously the distances from the receivers to the image point comprising:

(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

17. The device according to claim 8 wherein the Image Reconstruction processor is a parallel, pipelined means for combining echo samples to reconstruct the image points, said means having as input the image point coordinates, (xp,yp,zp), comprising:

(a) plural parallel means for computing simultaneously the distances from the receivers to the image point comprising:

(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

18. The device according to claim 11 wherein the Image Reconstruction Processor is a parallel, pipelined means for combining echo samples to reconstruct the image points, said means having as input the image point coordinates, (xp,yp,zp), comprising:

(a) plural parallel means for computing simultaneously the distances from the receivers to the image point comprising:

(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represents the round trip travel distances from each receiver to the image point to the transmitters;

(b) means for using the round trip travel distances to simultaneously select echo samples to be combined whereby the image point is reconstructed.

19. The device according to claim 14 wherein the Image Reconstruction Processor is a parallel, pipelined means for combining echo samples to reconstruct the image points, said means having an input the image point coordinates, (xp,yp,zp), comprising:

(a) plural parallel means for computing simultaneously the distances from the receivers to the image point comprising:

(aa) means for computing simultaneously first distances from the receivers to (xp,yp) or (xp,zp) or (yp,zp);

(bb) means for using said first distances to compute the final distances to (xp,yp,zp);

(cc) means for simultaneously combining the distances from the receivers with the distance from the image point to each transmitter wherein the resulting combined distances represent the round trip travel distances from each receiver to the image point to the transmitters;

(b) means for using the round trip travel distances to simultaneously select echo samples to be combined whereby the image point is reconstructed.

20. The device according to claim 17 further comprising a Tomogram Processor means for generating tomographic images within the imaged three dimensional volume, said means comprising:

(a) Means for using the equation of a plane to select three dimensional voxels which will be used in the tomogram;

(b) Means or generating addresses for the tomogram pixels using the voxel coordinates and the coefficients of the equation of the plane;

(c) Means for generating write pulses for the pixels by comparing the two sides of the equation.

21. The device according to claim 20 further comprising a Shadowgraph Processor means for generating shadowgraph images of the imaged three dimensional volume, said means comprising:

(a) Means for using the equations of lines to generate addresses of the voxels to be summed to create pixels for the shadowgraph (b) Means for generating a sequence of pixel addresses for the shadowgraph and summing them with the reconstruction point coordinates to create one side of the equation (c) Means for multiplying the coefficients of the equation with a vector incrementor parameter and summing the results to generate the other side of the equation (d) Means for comparing the two sides of the equation to generate write pulses for the shadowgraph memory.

22. The device according to claims 1 or 2 wherein the array is an axicon array with elements closely spaced around the circumference of the array while being sparsely spaced in the center and further comprising multiple transmitter elements and multiple redundant transmitted pulses whereby the sidelobe levels are reduced.

23. The device according to claims or 2 wherein the transmitted pulse is a wideband pulse.

24. The device according to claims 1 or 2 wherein the transmitted pulse is a monopolar pulse.

25. The device according to claim 1 or claim 2 wherein the transmitted pulse is a pulse of particles.

26. The device according to claim 25 wherein the echo energy is electromagnetic energy and the different velocities of the transmitted pulse and the echoes are used in the image reconstruction wherein the back-projected ellipsoids are distorted.

* * * * *